United States Patent
Simolon et al.

(10) Patent No.: US 9,958,332 B2
(45) Date of Patent: May 1, 2018

(54) BOLOMETER CIRCUITRY AND METHODS FOR DIFFERENCE IMAGING

(71) Applicant: FLIR Systems, Inc., Wilsonville, OR (US)

(72) Inventors: Brian B. Simolon, Santa Barbara, CA (US); Naseem Y. Aziz, Goleta, CA (US); Nicholas Högasten, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days. days.

(21) Appl. No.: 15/483,655

(22) Filed: Apr. 10, 2017

(65) Prior Publication Data

US 2017/0211984 A1    Jul. 27, 2017

Related U.S. Application Data

(63) Continuation of application No. PCT/US2015/056110, filed on Oct. 16, 2015.
(Continued)

(51) Int. Cl.
*G01J 5/02* (2006.01)
*G01J 5/24* (2006.01)
*G01J 5/00* (2006.01)

(52) U.S. Cl.
CPC ......... *G01J 5/24* (2013.01); *G01J 2005/0077* (2013.01)

(58) Field of Classification Search
CPC ........ G01J 5/24; G01J 1/44; G01J 2005/0077; G01J 2005/202; G01J 1/4228;
(Continued)

(56) References Cited

U.S. PATENT DOCUMENTS 5,369,888 A    12/1994 Kay et al.
6,028,309 A    2/2000 Parrish et al.
(Continued)

FOREIGN PATENT DOCUMENTS

EP    2757355    7/2014

OTHER PUBLICATIONS

Tumblin et al., "Why I want a Gradient Camera", Mitsubishi Electric Research Laboratories, Jun. 20-25, 2005, 10 pages, International Conference on Computer Vision and Pattern Recognition (CVPR), IEEE, Piscataway, New Jersey.

*Primary Examiner* — Taeho Jo
(74) *Attorney, Agent, or Firm* — Haynes and Boone, LLP

(57) ABSTRACT

Various techniques are disclosed for bolometer circuits and related methods for thermal imaging in a difference domain, where each pixel value represents a difference in incident IR radiation intensity between adjacent bolometers. For example, a bolometer circuit may include an array of bolometers each configured to generate a pixel signal in response to a bias and incident infrared radiation. Each column of the bolometer array may comprise an amplifier, a first plurality of switches each configured to selectively provide a supply voltage to a respective one of bolometers of the each column, a second plurality of switches each configured to selectively route a difference of the pixel signals of a respective adjacent pair of the bolometers of the each column to an input of the amplifier, and a third plurality of switches configured to selectively provide a common voltage to a respective one of the bolometers of the each column.

20 Claims, 18 Drawing Sheets

Related U.S. Application Data

(60) Provisional application No. 62/242,941, filed on Oct. 16, 2015, provisional application No. 62/064,964, filed on Oct. 16, 2014, provisional application No. 62/064,971, filed on Oct. 16, 2014.

(58) Field of Classification Search
CPC ...... G01J 2005/345; G01J 3/2803; G01J 5/14; H01L 27/14669; H01L 27/144; H01L 27/14609; Y10T 307/383
USPC ........................................................ 250/340
See application file for complete search history.

(56) References Cited

U.S. PATENT DOCUMENTS

| | | | |
|---|---|---|---|
| 6,249,002 B1 * | 6/2001 | Butler | G01J 5/22 250/332 |
| 6,791,610 B1 * | 9/2004 | Butler | H04N 5/33 348/294 |
| 6,812,465 B2 | 11/2004 | Parrish et al. | |
| 7,417,230 B2 | 8/2008 | Anderson et al. | |
| 7,679,048 B1 * | 3/2010 | Aziz | G01J 5/02 250/252.1 |
| 7,709,793 B2 | 5/2010 | Parrish | |
| 7,948,530 B2 * | 5/2011 | Okuyama | H04N 5/365 257/72 |
| 7,994,466 B2 | 8/2011 | Kawano | |
| 8,080,779 B2 | 12/2011 | Legras et al. | |
| 8,080,794 B1 | 12/2011 | Woolaway et al. | |
| 2002/0022938 A1 * | 2/2002 | Butler | G01J 5/061 702/85 |
| 2003/0160171 A1 | 8/2003 | Parrish et al. | |
| 2014/0027642 A1 * | 1/2014 | Warashina | G01J 5/00 250/340 |

\* cited by examiner

BOLOMETER CIRCUITRY AND METHODS FOR DIFFERENCE IMAGING

CROSS-REFERENCE TO RELATED APPLICATIONS

This application is a continuation of International Patent Application No. PCT/US2015/056110 filed Oct. 16, 2015 and entitled "BOLOMETER CIRCUITRY AND METHODS FOR DIFFERENCE IMAGING," which is incorporated herein by reference in its entirety.

International Patent Application No. PCT/US2015/056110 filed Oct. 16, 2015 claims priority to and the benefit of U.S. Provisional Patent Application No. 62/242,941 filed on Oct. 16, 2015 and entitled "LOW COST AND HIGH PERFORMANCE BOLOMETER CIRCUITRY AND METHODS," which is hereby incorporated by reference in its entirety.

International Patent Application No. PCT/US2015/056110 filed Oct. 16, 2015 also claims priority to and the benefit of U.S. Provisional Patent Application No. 62/064,964 filed on Oct. 16, 2014 and entitled "LOW COST AND HIGH PERFORMANCE BOLOMETER CIRCUITRY AND METHODS," which is hereby incorporated by reference in its entirety.

International Patent Application No. PCT/US2015/056110 filed Oct. 16, 2015 also claims priority to and the benefit of U.S. Provisional Patent Application No. 62/064,971 filed on Oct. 16, 2014 and entitled "BOLOMETER CIRCUITRY AND METHODS FOR DIFFERENCE IMAGING," which is hereby incorporated by reference in its entirety.

TECHNICAL FIELD

One or more embodiments of the invention relate generally to thermal imaging devices and more particularly, for example, to bolometer circuitry and related processing.

BACKGROUND

A bolometer, which changes its resistance in response to optical heating, is often used in the art to detect the intensity of incident infrared (IR) radiation or to capture multi-pixel IR images of incident IR radiation intensity. Typically, to measure incident IR radiation, a bias (e.g., a bias voltage or current) is applied across a bolometer so that its resistance, or any change thereof, can be measured and translated into a signal indicative of the intensity of IR radiation received at the bolometer. In this regard, many conventional bolometer circuits include a significant amount of circuitry dedicated to generating and controlling the bias across bolometers at a desired level. For example, conventional bias generation and control circuits may include transistors or other control mechanisms in a bolometer conduction path, along with circuitry to drive such transistors or other control mechanisms, to generate and maintain a desired bias across bolometers in face of variations or mismatches in operating characteristics of components and changing ambient or internal conditions.

Unfortunately, such additional transistors or other control mechanisms in a bolometer conduction path not only increase the size, cost, complexity, and power consumption of conventional bolometer circuits, but also introduce noise in the sensitive bolometer conduction path. Furthermore, because such additional transistors or other control mechanisms may control the bias by limiting the current flow and/or voltage on the bolometer conduction path, the voltage and/or current available for biasing the bolometer is effectively reduced to only a portion of the supply voltage or current, which in turn reduces the sensitivity of conventional bolometer circuits. Even with such costly bias generation and control approaches, conventional bolometer circuits typically exhibit a reduced usable signal range for representing IR radiation intensity (e.g., reduced signal swing) because of the need to allow for effects on output signals due to changing ambient and internal conditions such as, for example, self-heating of bolometers (also referred to as pulsed bias heating or pulse bias heating) or other factors. Accordingly, there is a need for a high-performance bolometer circuit that generates and maintains biases across bolometers at a desired level and/or provides a large usable signal range without the cost, size, complexity, noise, and power consumption associated with conventional bolometer circuits.

SUMMARY

Various techniques are disclosed for bolometer circuits and methods to provide a desired bias across bolometers to generate an output signal. For example, in one embodiment, a bolometer circuit may include a substrate; an active bolometer configured to receive external infrared (IR) radiation and substantially thermally isolated from the substrate; a resistive load, wherein the active bolometer and the resistive load are configured to be connected in series in a bolometer conduction path from a supply voltage node to a common voltage node; an amplifier circuit comprising an operational amplifier (op-amp) having a first input coupled to a node in the bolometer conduction path between the resistive load and the active bolometer, and a variable voltage source coupled to a second input of the op-amp to provide a reference voltage level, wherein the amplifier circuit is configured to generate a current flow to the amplifier circuit in response to a resistance change of the active bolometer due to the external IR radiation by maintaining the reference voltage level at the first input of the op-amp, and wherein the amplifier circuit is further configured to convert the current flow into an output voltage at an output of the op-amp that is indicative of an intensity of the external IR radiation received at the active bolometer.

The bolometer circuit, according to one or more embodiments, may be implemented in a focal plane array (FPA) having multiple rows and columns of the active bolometers to generate an output signal representing a multi-pixel IR image using suitable time-multiplexing techniques. A sequence of such IR image frames may also be generated in some embodiments.

In some embodiments, the resistive load comprises a thermally shorted bolometer and a transistor (e.g., a MOSFET) connected in series to operate as a current source that generates a load current to the active bolometer. In some embodiments, a resistance of the thermally shorted bolometer is larger than a resistance of the active bolometer, and the supply voltage node provides a supply voltage level that is higher than a nominal voltage level applicable to generate the load current in a nominal case of the thermally shorted bolometer having a resistance similar to the resistance of the active bolometer. In other embodiments, a resistance of the resistive load is similar to a resistance of the active bolometer.

In some embodiments, the amplifier circuit comprises a resistive gain coupling the output of the op-amp to the first input of the op-amp to configure the amplifier circuit as a feedback amplifier, the resistive gain comprises a thermally shorted bolometer that is thermally shorted to the substrate to operate as a temperature-compensated gain for the amplifier circuit, and the amplifier circuit is configured to maintain, in response to the reference voltage level, a bias voltage across the active bolometer and a load bias voltage across the resistive load via the first input of the op-amp coupled to the bolometer conduction path node, and generate the output voltage in response to the current flow flowing through the resistive gain. The current flow to the amplifier circuit is generated in response to a difference between the current generated by the load bias voltage being applied to the resistive load and the current generated by the bias voltage being applied to the active bolometer that exhibits the resistance change due to the external IR radiation In other embodiments, the amplifier circuit further comprises a capacitor coupling an output of the op-amp to the first input of the op-amp to configure the amplifier circuit as an integrating amplifier, a buffer connected to the bolometer conduction path node, and a resistor connected to the first input of the op-amp, the buffer and the resister being connected in series to couple the bolometer conduction path node to the first input of the op-amp. The amplifier circuit is configured to maintain the reference voltage level at one end of the resistor connected to the first input of the op-amp, and the other end of the resistor is configured to receive, via the buffer, a voltage level at the bolometer conduction path node set in response to the load current flowing through the active bolometer that exhibits the resistance change due to the external IR radiation. The voltage difference between the two ends of the resistor generates the current flow to the amplifier, and the amplifier circuit is configured to integrate the current flow by the capacitor to generate the output voltage.

In some embodiments, the bolometer circuit is configured to operate in a normal mode or in a low-power mode based on selective opening or closing of switches associated with the bolometer conduction path and the amplifier circuit, where in the normal mode, the output of the op-amp provides the output voltage indicative of the intensity of the external IR radiation received at the active bolometer and in the low-power mode, the output of the op-amp is driven to a predetermined voltage level and the op-amp, the bolometer conduction path, or both are disconnected from power.

According to one or more embodiments, a bolometer circuit implemented in a FPA may comprise a plurality of the active bolometers arranged in a FPA having columns and rows, a plurality of column circuits each associated with a column of the bolometer FPA and each comprising the resistive load, the amplifier circuit, and the switches associated with the bolometer conduction paths and the amplifier circuit, and a control circuit configured to control the switches to operate the bolometer FPA in a normal imaging mode or a low-power detection mode, wherein in the normal imaging mode, all columns of the bolometer FPA operate in the normal mode, and wherein in the low-power detection mode, some columns of the bolometer FPA operate in the normal mode while the remainder of the columns of the bolometer FPA operate in the low-power mode. In some embodiments, the control circuit may be further configured to detect a change in the external IR radiation using those columns of the bolometer FPA that operate in the normal mode while operating the bolometer FPA in the low-power detection mode and switch from the low-power detection mode to the normal imaging mode for the bolometer FPA in response to detecting the change in the external IR radiation. In some embodiments, those columns that operate in the normal mode are selected in a round-robin manner from all columns of the bolometer FPA as each IR image frame is captured, so as to reduce a burn-in effect on the columns of the bolometer FPA.

In one embodiment, a bolometer circuit may include a substrate; an active bolometer configured to receive external infrared (IR) radiation and substantially thermally isolated from the substrate; a first resistive element, wherein the active bolometer and the first resistive element are configured to be connected in series in a conduction path from a supply voltage node to a common voltage node, and wherein the first resistive element provides a resistive load for the bolometer, an amplifier having a first input connected to a node between the first resistive element and the active bolometer in the conduction path; a second resistive element coupling an output of the amplifier to the first input to configure the amplifier as a feedback amplifier; and a variable voltage source coupled to a second input of the amplifier to provide a reference voltage level in response to which the amplifier maintains a bias across the bolometer via the first input and produces at the output an output signal indicative of an intensity of the external IR radiation received at the active bolometer.

In another embodiment, the first resistive element may be a first bolometer thermally shorted to the substrate to provide a temperature-compensated resistive load for the active bolometer. In another embodiment, the second resistive element may be a second bolometer thermally shorted to the substrate to provide a temperature-compensated resistive gain for the amplifier. The bolometer circuit may also include a low-pass filter (LPF) to reduce noise from the output signal and/or a sample-and-hold circuit to sample the output signal, depending on embodiments. For some embodiments, the variable voltage source may be implemented using a digital-to-analog converter (DAC) configured to generate the reference voltage level in response to bias adjustment bits. For some embodiments, the variable voltage source may be implemented using a reference conduction path comprising a third resistive element and a blind bolometer in a series connection mirroring the active bolometer conduction path to track resistance changes due to self-heating of the active bolometer. The bolometer circuit according to some embodiments may allow additional bias adjustment to be made via offset adjustment circuitry provided in one or more parts of the bolometer circuit. In various embodiments, the bolometer circuit may be implemented in a focal plane array comprising a readout integrated circuit (ROIC) to generate an output signal representing a multi-pixel IR image using suitable time-multiplexing techniques.

In a further embodiment, a method of generating an output signal in a bolometer circuit includes selectively connecting an active bolometer to a resistive load in series to form a bolometer conduction path from a supply voltage node to a common voltage node, wherein the active bolometer is configured to receive external infrared (IR) radiation and substantially thermally isolated from a substrate to which the active bolometer is attached; providing a reference voltage level to an operational amplifier (op-amp) that has a first input coupled to a node in the bolometer conduction path between the resistive element and the active bolometer, wherein the reference voltage level is received via a second input of the op-amp; generating a current flow to the op-amp in response to a resistance change of the active bolometer due to the external IR radiation by maintaining the reference voltage level at the first input of the op-amp; and converting the current flow into an output voltage at an output of the op-amp that is indicative of an intensity of the external IR radiation received at the active bolometer.

The method according to one or more embodiments may be performed with respect to a focal plane array (FPA) having multiple rows and columns of the active bolometers to generate an output signal representing a multi-pixel IR image using suitable time-multiplexing techniques. A sequence of such IR image frames may also be generated in some embodiments.

In some embodiments, the method further comprises selectively operating the bolometer circuit in a normal mode or in a low-power mode by selectively opening or closing switches associated with the bolometer conduction path and the op-amp, wherein in the normal mode, the output of the op-amp provides the output signal indicative of the intensity of the external IR radiation received at the active bolometer, and in the low-power mode, the output of the op-amp is driven to a predetermined voltage level and the op-amp, the bolometer conduction path, or both are disconnected from power.

According to one or more embodiments, the method performed with respect to a FPA of bolometers may further include selectively operating the bolometer FPA in a normal imaging mode or a low-power detection mode, where in the normal imaging mode, all columns of the bolometer FPA operate in the normal mode, and in the low-power detection mode, some columns of the bolometer FPA operate in the normal mode while the remainder of the columns of the bolometer FPA operate in the low-power mode. In some embodiments, the method may further include detecting a change in the external IR radiation using those columns of the bolometer FPA that operate in the normal mode while operating the bolometer FPA in the low-power detection mode, and switching from the low-power detection mode to the normal imaging mode for the bolometer FPA in response to detecting the change in the external IR radiation. In some embodiments, the method may further include capturing, using the bolometer FPA, a sequence of IR image frames representing the external IR radiation, and while operating the bolometer FPA in the low-power detection mode, selecting those columns that operate in the normal mode in a round-robin manner from all columns of the bolometer FPA as each IR image frames is captured, so as to reduce a burn-in effect on the columns of the bolometer FPA.

In some embodiments, the method may further include generating a load current to the active bolometer by the resistive load that comprises a thermally shorted bolometer (which may have a larger resistance than the active bolometer) and a transistor connected in series to operate as a current source, and supplying a supply voltage level that is higher than a nominal voltage level applicable to generate the load current in a nominal case of the resistive load having a resistance similar to the resistance of the active bolometer.

In some embodiments, the first input of the op-amp is coupled to the output of the op-amp via a resistive gain to form a feedback amplifier configuration; the resistive gain comprises a thermally shorted bolometer that is thermally shorted to the substrate; and the method further comprises maintaining, in response to the reference voltage level, a bias voltage across the active bolometer and a load bias voltage across the resistive load via the first input of the op-amp coupled to the bolometer conduction path node. In such embodiments, the generating of the current flow comprises generating the current flow in response to a difference between the current generated by the load bias voltage being applied to the resistive load and the current generated by the bias voltage being applied to the active bolometer that exhibits the resistance change due to the external IR radiation, and the converting of the current flow comprises generating the output voltage in response to the current flow flowing through the resistive gain.

In other embodiments, the first input of the op-amp is coupled to the output of the op-amp via a capacitor to form an integrating amplifier configuration; the bolometer conduction path node is coupled to the first input of the op-amp via a buffer and a resister connected in series; and the method further comprises setting a voltage level at the bolometer conduction path node in response to the load current flowing through the active bolometer that exhibits the resistance change due to the external IR radiation, receiving the voltage level by the buffer to pass the voltage level to one end of the resistor, and maintaining the reference voltage level at the other end of the resistor. In such embodiments, the generating of the current flow comprises generating the current flow in response to a difference between the voltage level at the one end and the reference voltage level at the other end of the resistor, and the converting of the current flow comprises integrating the current flow to the capacitor to generate the output voltage.

In one embodiment, a method of biasing an active bolometer to generate an output signal includes selectively connecting the active bolometer to a first resistive element in series to form a conduction path, wherein the active bolometer is configured to receive external IR radiation and substantially thermally isolated from a substrate to which the active bolometer is attached; providing a reference voltage to an amplifier having a first input connected to a node between the first resistive element and the bolometer in the conduction path, wherein the reference voltage is received via a second input of the amplifier, and wherein the first input is coupled to an output of the amplifier via a second resistive element to form a feedback amplifier configuration; biasing one end of the bolometer and one end of the first resistive element with a voltage at the node that tracks the reference voltage due to the feedback amplifier configuration; and converting a current flow through the second resistive element into the output signal at the amplifier output, wherein the current flow is generated in response to the biasing and a resistance change of the bolometer due at least in part to the external IR radiation. In yet further embodiments, the method may include various additional features, variations, or modifications in accordance with various techniques discussed herein in connection with the bolometer circuit.

Moreover, various techniques are disclosed for bolometer circuits and related methods for thermal imaging in a difference domain, where each pixel value represents a difference in incident IR radiation intensity between adjacent infrared detectors. For example, in one embodiment, a bolometer circuit may include an array of bolometers each configured to generate a pixel signal in response to a bias applied and incident infrared (IR) radiation received at the each bolometer, wherein each column of the array of bolometers comprises an amplifier having an input and an output, a first plurality of switches each configured to selectively provide a supply voltage to a respective one of bolometers of the each column, a second plurality of switches each configured to selectively route a difference of the pixel signals of a respective adjacent pair of the bolometers of the each column to the input of the amplifier, and a third plurality of switches configured to selectively provide a common voltage to a respective one of the bolometers of the each column.

The bolometer circuit may include a control circuit configured to generate control signals for the switches. For example, the control circuit may be configured to generate control signals to close one of the first plurality of switches, one of the second plurality of switches, and one of the third plurality of switches while opening the remainder of the first, second, and third pluralities of switches, such that biases are applied to a selected adjacent pair of the bolometers of each column and a difference signal representative of the difference of the pixel signals for the selected adjacent pair is generated at the output of the amplifier.

The control circuit according to various embodiments may be configured to generate control signals to selectively open or close the switches to obtain various types of difference frames (or difference image frames) that comprise rows of such difference signals. For example, in one embodiment, the control circuit may be configured to repeat generating the control signals to sequentially obtain even difference signals for a first plurality of adjacent pairs of the bolometers of each column, the even difference signals corresponding to those difference signals that are obtained by subtracting the pixel signals of odd rows from the pixel signals of corresponding even rows in the first plurality of adjacent pairs of the bolometers; and further configured to repeat generating the control signals to sequentially obtain odd difference signals for a second plurality of adjacent pairs of the bolometers of each column, the odd difference signals corresponding to those difference signals that are obtained by subtracting the pixel signals of even rows from the pixel signals of corresponding odd rows in the second plurality of adjacent pairs of the bolometers. As such, the control circuit may be configured to selectively open or close the switches according to a specified timing so that even and odd difference frames may be obtained by the bolometer circuit. In some embodiments, the control circuit may be configured to repeat generating the control signals to obtain additional even and odd rows of difference signals in an opposite direction.

In some embodiments, the bolometer circuit may comprise a processor (provided as part of a focal plane array of bolometers or provided externally, for example, in a host device in which the bolometer circuit may be implemented) configured to combine the even difference signals and the odd difference signals to generate a difference image comprising both even and odd rows of difference signals, and to reconstruct the difference image into a direct image by cumulatively adding the difference rows of the difference image. Thus, in such embodiments, signals in a difference domain may be converted into a direct IR image where each pixel value corresponds to IR radiation intensity received at each detector.

In some embodiments, the bolometer circuit may comprise one or more rows of blind bolometers substantially shielded from the incident IR radiation, where in the one or more rows of blind bolometers are selectively connectable to a corresponding one or more rows of the array of bolometers to provide a pixel signal representing a reference IR intensity level. The blind bolometer row or rows may be used to obtain reference measurement signals (or absolute measurement signals) useful for reconstructing direct images and other purposes. For example, in one embodiment, the control circuit may be further configured to generate additional control signals to selectively connect the one or more rows of blind bolometers to the corresponding one or more rows of bolometers to obtain corresponding one or more rows of reference measurement signals, the reference signals representing differences between the pixel signals of the blind bolometers providing the reference IR intensity levels and the pixels signals of the corresponding bolometers.

In some embodiments, the bolometer circuit may comprise a transimpedance feedback amplifier and associated circuits configured to set and maintain the biases across the bolometers without the complexity, cost, size, power consumptions, and noise associated with conventional bias circuitry techniques for bolometer circuits.

According to another embodiment of the disclosure, a method may include receiving an even difference image frame and an odd difference image frame, wherein the even difference image frame comprises even rows of difference data representative of infrared (IR) radiation intensity received at even rows of a bolometer array less IR radiation intensity received at respective adjacent odd rows of the bolometer array, and wherein the odd difference image frame comprises odd rows of difference data representative of IR radiation intensity received at odd rows of a bolometer array less IR radiation intensity received at respective adjacent even rows of the bolometer array; combining the even and the odd difference image frames to generate a composite difference image comprising both the even and the odd rows of difference data; and generating a direct image from the composite difference image by cumulatively adding the difference rows from top to bottom or bottom to top to generate rows of the direct image. In one embodiment, the even and the odd difference image frames may be generated by the various embodiments of the bolometer circuit disclosed herein.

In some embodiments, various column, row, and/or pixel noise reduction filters may be applied to the difference image frames and/or the composite difference image. Various other novel noise reduction techniques may be included. For example, in one embodiment, the method may further include comparing local smoothness between the composite difference image and the generated direct image to identify local areas in the generated direct image that exhibit more noise, and applying column, row, and/or pixel noise reduction filters to the generated direct image in response to the identified local areas. In another example according to one embodiment, the method may further include comparing one or more absolute measurement rows (e.g., those that contain absolute measurement signals) with corresponding one or more rows of the generated direct image to identify residual spatial noise in the generated direct image. In yet another example according to one embodiment, the method may further include comparing one or more absolute measurement rows with corresponding one or more rows of the generated direct image to determine statistical metrics relating to residual noise in the generated direct image.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
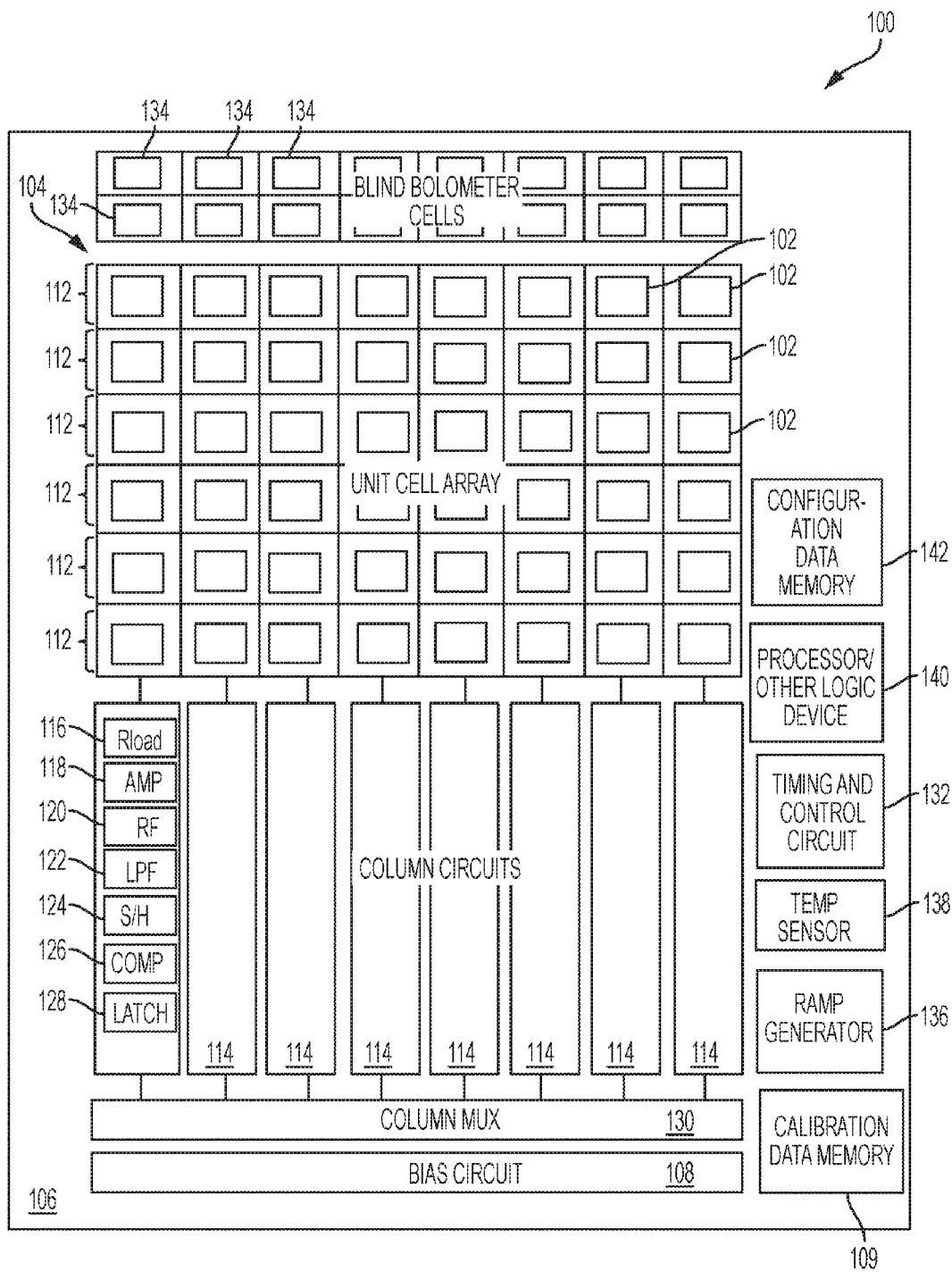
FIG. 1 illustrates a block diagram of a bolometer circuit having an array of bolometers in accordance with an embodiment of the disclosure.

FIG. 1 shows an example bolometer circuit 100 according to an embodiment of the present disclosure. Bolometer circuit 100 comprises a plurality of active bolometers 102, which may be configured as an array arranged in a rectangle, square, circle, line or other shape. In some non-limiting examples, active bolometers 102 may be provided as a rectangular array having a dimension of 80×60, 160×120, 320×240, or any other dimension desired for a particular application. Bolometer circuit 100 may comprise various components and circuits, which may be collectively referred to as a Read Out Integrated Circuit (ROIC), that interface with active bolometers 102 to generate an output as further describe herein. Bolometer circuits, such as some embodiments of bolometer circuit 100, that have an array of active bolometers and associated circuits formed together on a substrate may also be referred to as focal plane arrays (FPAs).

Some portions (e.g., switches for a particular bolometer) of the ROIC may be associated with and placed in proximity to each particular one of active bolometers 102. Each one of active bolometers 102 together with its associated portion of the ROIC may also be referred to as a unit cell. Since active bolometers 102 may be configured as an array, corresponding unit cells may form a unit cell array 104. Also, in the context of imaging, each one of active bolometers 102 may also be referred to as a pixel.

Active bolometers 102 may be provided on a substrate 106, but substantially thermally isolated from substrate 106 (e.g., released from substrate 106 such that active bolometers 102 are not substantially affected thermally by substrate 106). Active bolometers 102 may be configured to receive infrared radiation from an external scene, for example, directed onto active bolometers 102 by an optical element such as an infrared-transmissive lens. Infrared ("IR") radiation incident on active bolometers 102 changes the temperature, and therefore the resistivity, of active bolometers 102 as would be understood by one skilled in the art. The temperature and the resistivity of active bolometers 102 may also track the temperature of substrate 106, but because active bolometers 102 are thermally isolated from substrate 106, the rate of temperature change due to substrate is slower than that due to incident infrared radiation. The ROIC of bolometer circuit 100 comprises various components and circuits configured to generate an output based on the resistivity changes of active bolometers 102 due to incident infrared radiation.

In one aspect, bolometer circuit 100 may include a bias circuit 108 configured to control a bias (e.g., a bias voltage or current) across active bolometers 102 in generating such an output. In general, a bias may be applied across a bolometer so that the resistance (or any change thereof) of the bolometer can be measured. According to various embodiments of bolometer circuit 100, bias circuit 108 may be utilized to control the bias applied across active bolometers 102 to an appropriate level as further described herein, so that the nominal values of active bolometer measurements may be adjusted to fall within a desired range. In this regard, according to some embodiments, bias circuit 108 may be configured to set the bias based on calibration data (e.g., adjustment values stored as binary bits) stored in a calibration data memory 109. In other embodiments, such calibration data may be provided from a source external to bolometer circuit 100 (e.g., from an external processor and/or memory), directly to bias circuit 108 or via calibration data memory 109.

In some embodiments, bias circuit 108 may be configured to set the bias globally for all active bolometers 102. In other embodiments, bias circuit 108 may be configured to provide a particular bias level to each individual one or group of active bolometers 102. In yet other embodiments, bias circuit 108 may be configured to set a global bias level for all active bolometers 102 and to apply an adjustment particular to each one or group of active bolometers 102.

As discussed, bolometer circuit 100 includes a plurality of active bolometers 102 in an array or other arrangement. According to one or more embodiments of bolometer circuit 100, reduction of circuitry and interconnection may be achieved by appropriate multiplexing of active bolometers 102 to various components of the ROIC. For example, in one embodiment, rather than replicating similar circuitry for every row 112 of unit cell array 104, rows 112 may be multiplexed to column circuits 114 comprising common components 116 through 128 that may be utilized for all rows 112 in a time-multiplexed manner. As further discussed herein, components of column circuit 114 may include a load bolometer 116, an amplifier 118, a feedback resistor 120, a low pass filter ("LPF") 122, a sample-and-hold circuit 124, a comparator 126, a latch 128, and/or other components, according to one or more embodiments.

In the example shown in FIG. 1, each column of unit cell array 104 has a corresponding one of column circuits 114, such that all rows of unit cells in a single column may be multiplexed to a single corresponding column circuit. The plurality of column circuits 114 may in turn be multiplexed by a column multiplexer 130, for example, to generate a combined output for unit cell array 104 in a multiplexed manner. It is contemplated that in other embodiments, column circuits may be provided in numbers greater or fewer than the number of columns in unit cell array 104. It is also contemplated that unit cell array 104 may comprise appropriate ROIC components to generate an output without multiplexing. It should be noted that the terms "column" and "row" herein are used as mere labels to facilitate illustration, and thus may be used interchangeably depending on structures being described.

In one or more embodiments, bolometer circuit 100 may include a timing and control circuit 132 configured to generate control signals for multiplexing active bolometers 102 and column circuits 114. For example, timing and control circuit 132 may be configured to control switches associated with active bolometers 102 and column circuits 114 to selectively connect active bolometers 102 to appropriate column circuits 114 according to specified timing to enable timed-multiplexing of active bolometers 102 to column circuits 114. In some embodiments, timing and control circuit 132 may be further configured to provide timed control of other components of bolometer circuit 100. For example, portions of bias circuit 108, blind bolometer cells, or other components may be selectively enabled and/or connected in conjunction with the multiplexing of active bolometers 102, by way of control signals generated by timing and control circuit 132 according to appropriate timing. In another example, calibration data (e.g., adjustment bits stored in calibration data memory 109) or other data may be provided (e.g., transmitted, transferred, and/or latched) to appropriate components (e.g., bias circuit 108) of bolometer circuit 100 according to specified timing in response to control signals from timing and control circuit 132.

In some embodiments, additional switches may be provided for active bolometers 102 that allow configuration of active bolometers 102 for measuring differences in resistance changes between the adjacent ones of active bolometers 102, and timing and control circuit 132 may be configured to generate control signals for such additional switches to enable capturing of difference images (e.g., representing differences in infrared radiation incident on adjacent active bolometers 102) by bolometer circuit 100. As further described herein, bolometer circuit 100 configured to obtain difference images according to such embodiments may beneficially reduce the effects on an output signal by variations among active bolometers 102, substrate or ambient temperature changes, and self-heating (e.g., pulse bias heating) of active bolometers 102. Further, bolometer circuit 100 according to such embodiments may be utilized to obtain images with a high scene dynamic range by reconstructing scene images from local difference of adjacent pixels.

Bolometer circuit 100 according to some embodiments may include blind bolometers 134. Blind bolometers 134 are thermally isolated (e.g., released) from substrate 106, similar to active bolometers 102. However, unlike active bolometers 102, blind bolometers 134 are shielded from infrared radiation from an external scene. As such, blind bolometers 134 do not substantially change temperature in response to the incident radiation level from an external scene, but do change temperature as a result of self-heating (e.g., pulse bias heating) and temperature changes in substrate 106. Because both active bolometers 102 and blind bolometers 134 to a first order track temperature changes due to self-heating and substrate temperature changes, blind bolometers 134 may be configured as references for adjusting biases for active bolometers 102 and/or as references for reconstructing scene images from difference images according to various embodiments further discussed herein. Some example techniques to implement blind bolometers 134 may be found in International Patent Application No. PCT/US2012/049051 filed Jul. 31, 2012 and entitled "Determination of an Absolute Radiometric Value Using Blocked Infrared Sensors." Blind bolometer 134 together with its associated circuitry (e.g., associated switches) may be referred to as a blind bolometer cell.

Bolometer circuit 100 according to some embodiments may include a ramp generator 136. Ramp generator 136 may be configured to generate a ramp signal for performing a ramp-compare analog-to-digital (A/D) conversion or for other use (e.g., as a reference signal in detecting a clock rate) in bolometer circuit 100. In other embodiments of bolometer circuit 100, for example in embodiments that do not include A/D conversion circuitry, ramp generator 136 may be omitted from bolometer circuit 100. For example, A/D conversion circuitry and a ramp generator may be external to bolometer circuit 100 according to some embodiments.

Bolometer circuit 100 according to some embodiments may include a temperature sensor 138 configured to detect an ambient temperature associated with substrate 106 of bolometer circuit 100. Substrate temperature readings obtained via temperature sensor 138 may, for example, be used to obtain and apply calibration data over a range of substrate temperatures. In some embodiments, temperature sensor 138 may be disposed on substrate 106 in close proximity to active bolometers 102 and/or blind bolometers 134, so that the temperature reading obtained by temperature sensor 138 may closely track the substrate temperature effecting these components. In some embodiments, bolometer circuit 100 may be configured to output a substrate temperature reading based on the temperature detected by temperature sensor 138, so that the substrate temperature reading may be accessed by components external to bolometer circuit 100 (e.g., by a processor external to bolometer circuit 100). For example, such a substrate temperature reading may be utilized to perform various correction (e.g., non-uniformity correction) and calibration processes by a processor or other logic device.

In some embodiments, bolometer circuit 100 may include a processor or other logic device 140 configured to perform various operations associated with bolometer circuit 100, based on configuration data stored in a configuration data memory 142. For example, in one embodiment, processor or other logic device 140 may be configured to perform at least part of the various processes disclosed herein below. In other embodiments, other external components (e.g., a processor of a host device) or internal components (e.g., timing and control circuit 132) may additionally or alternatively be configured to perform at least part of the various processes disclosed herein below.

According to one or more embodiments, processor or other logic device 140 may be implemented with any appropriate combination of processing devices, such as a general-purpose central processing unit ("CPU"), a programmable logic device ("PLD") including a field programmable logic device ("FPGA"), a hardwired application-specific integrated circuit ("ASIC"), a digital signal processor (DSP), an image signal processor (ISP), or other logic device that may perform processing operations by executing instructions provided from configuration data memory 142 and/or by configuring logic circuits according configuration data (e.g., FPGA configuration data) provided from configuration data memory 142.

As discussed, FIG. 1 is a block diagram to facilitate description and explanation of bolometer circuit 100 and its various components for one or more embodiments of the disclosure. As such, the block diagram of FIG. 1 is not intended to limit the size, the number, the placement, or the orientation of the various components illustrated therein. For example, although blind bolometers are represented by rows of blind bolometers 134 above unit cell array 104 in FIG. 1, some or all of the blind bolometers represented by blind bolometers 134 may be provided as one or more columns of blind bolometers (e.g., to implement blind bolometers for bias columns, as further discussed herein) adjacent to columns of unit cell array 104 as desired for particular implementations of bolometer circuit 100 according to various embodiments.

Figure 2A:
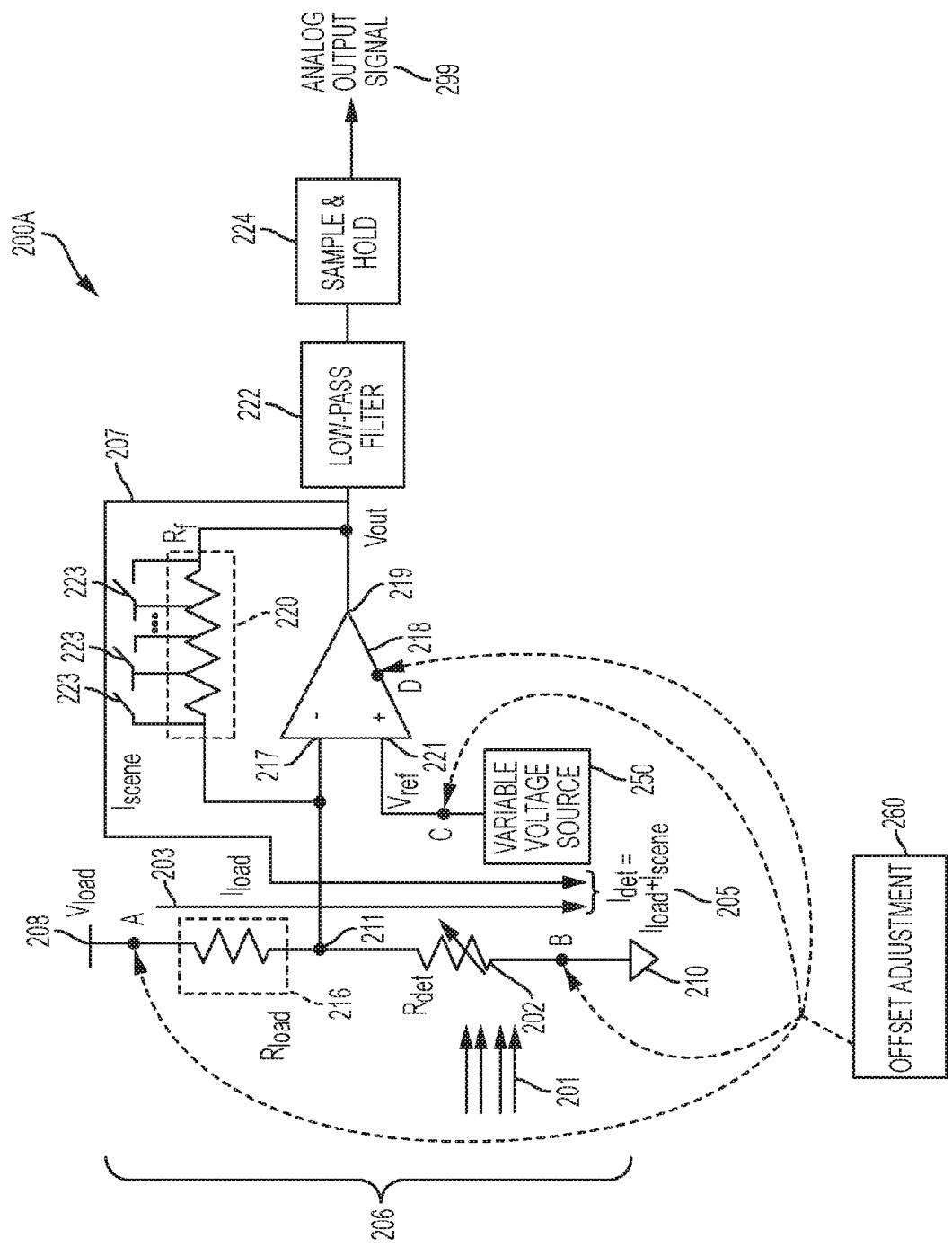
FIG. 2A illustrates a bolometer circuit to provide a desired level of bias to a bolometer in accordance with an embodiment of the disclosure.

FIG. 2A illustrates an example circuit 200A configured to provide a desired level of bias to an active bolometer 202 to generate an output 299 in accordance with an embodiment of the present disclosure. Compared with conventional bolometer circuits having bias control capabilities, circuit 200A according to various embodiments may advantageously achieve reduction in complexity, cost, and noise while providing larger amounts of bias at a desired level to achieve an increase response to incident infrared radiation as further discussed herein.

Circuit 200A may represent an implementation example of a portion of bolometer circuit 100. For example, active bolometer 202 may represent one of active bolometers 102, and other components of circuit 200A may represent components of a corresponding column circuit 114 and bias circuit 118, where the one of active bolometers 102 may be selectively coupled to the corresponding column circuit 114 (e.g., by switching according to a control signal from timing and control circuit 118) to form an embodiment of circuit 200A. However, it should be recognized that circuit 200A is not limited to bolometer circuit 100, and that techniques disclosed for circuit 200A are applicable to various types of infrared detector circuit implementations as would be understood by one skilled in the art. For example, circuit 200A may represent a unit cell of a FPA. In another example, circuit 200A may represent a circuit to implement a single element infrared detector.

Circuit 200A includes active bolometer 202 (labeled "$R_{det}$") and a bolometer 216 (also referred to as load bolometer and identified by the label "$R_{load}$") coupled in series in a conduction path 206 (also referred to as a bolometer conduction path 206) extending from a supply voltage node 208 to a common voltage node 210 (which a ground voltage or other common voltage level for circuit 200A). Active bolometer 202 is a thermally isolated bolometer configured to receive and change its resistance in response to incident infrared radiation 201, similar to active bolometers 102 discussed above. Bolometer 216 provides a resistive load for conduction path 206, and is thermally shorted (e.g., thermally shunted) to a substrate on which circuit 200A may be provided. In one example, thermally shorted bolometer 216 may be provided as a component (e.g., as load bolometer 116, also labeled "$R_{load}$" in FIG. 1) of column circuit 114 and thermally shorted to substrate 106 by applying a thermally conductive material. Thermally shorted bolometer 216 exhibits high thermal conductivity to the substrate, and thus its temperature may be dominated by the substrate temperature, whereas incident infrared radiation and self-heating have little effect on the temperature of thermally shorted bolometer 216. In addition, active bolometer 202 and thermally shorted bolometer 216 may be formed to exhibit the same or substantially same temperature coefficient of resistance (TCR), for example by using the same material or different materials having similar TCRs.

Because both active bolometer 202 and thermally shorted bolometer 216 track varying substrate temperature to a first order, and because they may be formed to exhibit similar TCRs, changes in substrate temperature should not appreciably affect the ratio of voltage drops or current flows across active bolometer 202 and thermally shorted bolometer 216. In this regard, thermally shorted bolometer 216 may act as a substrate temperature-compensated load for circuit 200A that may cancel much of the effects of substrate temperature changes on a bias applied across active bolometer 202. It should, however, be appreciated that other suitable component or circuit may be used to implement a load (e.g., including a temperature-compensated load, non-compensated load, or other variable or non-variable load) for circuit 200A, in place of or in addition to thermally shorted bolometer 216.

Circuit 200A includes an amplifier 218 (e.g., an operational amplifier) with one input 217 (e.g., inverting input) coupled to a node 211 between active bolometer 202 and thermally shorted bolometer 216 in conduction path 206. An output 219 of amplifier 218 may be coupled to its input 217 by another thermally shorted bolometer 220 (labeled "Re") that acts as a feedback resistor, thereby configuring amplifier 218 as a feedback amplifier (e.g., a transimpedance amplifier). As with thermally shorted bolometer 216, the temperature (and therefore the resistance) of thermally shorted bolometer 220 tracks the substrate temperature, but may not be appreciably affected by incident infrared radiation 201 or self-heating. Thus, thermally shorted bolometer 220 may act as a substrate temperature-compensated feedback resistor that substantially maintains a desired resistance relative to active bolometer 202 and thermally shorted bolometer 216, and therefore maintains a desired gain ratio for the feedback amplifier, over a range of substrate temperature. Amplifier 218, thermally shorted bolometer 220, and other components that may be associated with amplifier 218 and/or thermally shorted bolometer 220 may be referred to herein as belonging to an amplifier circuit for circuit 200A.

Another input 221 (e.g., non-inverting input) of amplifier 218 may be provided with a reference voltage $V_{ref}$. Due to high impedance between inputs 221 and 217 of amplifier 218 and the feedback configuration, the voltage potential at input 217 of amplifier 218 follows $V_{ref}$, the voltage provided at input 221. In other words, $V_{ref}$ provided at input 221 may set a virtual ground for the feedback amplifier configuration, which is also the voltage potential at input 217. Because input 217 is coupled to node 211, active bolometer 202 is biased by $V_{ref}$ at node 211 and by the voltage at common voltage node 210, while thermally shorted bolometer 216 is biased by the supply voltage at supply voltage node 208 and by $V_{ref}$ at node 211. That is, for example, $V_{ref}$ provided to amplifier 218 can be used to set biases across both active bolometer 202 (e.g., detector bolometer $R_{det}$) and thermally shorted bolometer 216 (e.g., load bolometer $R_{load}$) virtually, without a need for extra circuitry (e.g., CMOS transistors) in conduction path 206 to set and maintain desired bias levels.

In various embodiments, biases across active bolometer 202 and thermally shorted bolometer 216 may be set according to $V_{ref}$ such that the output voltage at amplifier 218 is in a desired range in response to the resistance changes of active bolometer 202 due to incident infrared radiation 201. For example, in some embodiments, $V_{ref}$ may be set such that a current 203 (labeled "$I_{load}$" and also referred to as a load current), which is generated through the load bolometer $R_{load}$ (e.g., thermally shorted bolometer 216), in response to the voltage potential between the supply voltage level at supply voltage node 208 and the voltage level $V_{ref}$ at node 211 applied across the load bolometer Rod, is to a first order the same or substantially same as a current 205 (labeled "$I_{det}$") through the detector bolometer $R_{det}$ (e.g., active bolometer 202) less a current 207 (labeled "$I_{scene}$") due to the resistance changes in response to incident infrared radiation 201 from an external scene. Thus, in such embodiments, the difference between current 205 ($I_{det}$) through active bolometer 202 and current 203 ($I_{load}$) through thermally shorted bolometer 216 may represent the current 207 ($I_{scene}$) that is due to the resistance change of active bolometer 202 in response to incident infrared radiation 201.

This current 207 ($I_{scene}$) due to incident infrared radiation 201 flows through thermally shorted bolometer 220 (feedback bolometer $R_f$) since thermally shorted bolometer 220 represents a low-impedance path for amplifier 218 in the feedback configuration. The voltage ($V_{out}$) at output 219 of amplifier 218 is then $V_{out}=I_{scene}\times\text{resistance}(R_f)$, where resistance($R_f$) represents the resistance value of thermally shorted bolometer 220. Thus, for example, the scene current to output voltage gain is approximately the ratio of resistance($R_f$)/resistance($R_{det}$). Advantageously, this gain ratio may remain substantially constant over a varying substrate temperature, since the temperature, and therefore the resistance change, of both thermally shorted bolometer 220 and active bolometer 202 track the substrate temperature to a first order as discussed above. It is also contemplated for other embodiments that other variable or non-variable impedance component or circuit may be utilized to implement a feedback resistor for amplifier 218, in addition to or in place of thermally shorted bolometer 220.

In various embodiments, the reference voltage $V_{ref}$ at input 221 may be supplied by a variable voltage source 250 coupled to input 221. For example, in some embodiments, variable voltage source 250 may be implemented using a digital-to-analog converter (DAC), such as a CMOS DAC or other suitable DAC that can be used to output a desired voltage level by providing corresponding digital data (e.g., binary bits). Other suitable variable voltage sources that allow their output voltage to be adjusted (e.g., by appropriate inputs or control signals) may be used in other embodiments to implement variable voltage source 250. Thus, by providing appropriate binary bits to a CMOS DAC implementing variable voltage source 250 or otherwise adjusting the output voltage of variable voltage source 250 to set the reference voltage $V_{ref}$, the biases across active bolometer 202 and thermally shorted bolometer 216 may be set as desired, for example, such that the current that flows through thermally shorted bolometer 220 to generate the output voltage $V_{out}$ is predominantly or exclusively current 207 ($I_{scene}$) associated with the resistance change at active bolometer 202 due to incident infrared radiation 201 as illustrated above.

As may be appreciated, natural variations in performance characteristics of various components may exist when a device implementing circuit 200A is fabricated. For example, small deviations from the intended design parameters may exist in the infrared radiation absorption coefficient, resistance, TCR, heat capacity, and thermal conductivity associated with bolometers 202, 216, and 220 when fabricated. According to various embodiments of circuit 200A, biases for active bolometer 202 and thermally shorted bolometer 216 may be adjusted to correct for such deviations by conveniently adjusting the reference voltage $V_{ref}$ via variable voltage source 250.

If, for example, circuit 200A is implemented in a FPA, such as in an embodiment of bolometer circuit 100, such variations resulting from fabrication processes may result in non-uniformity of responses among pixels in an FPA. As discussed above for one example, one of active bolometers 102 in an array may be selectively coupled to a corresponding one of column circuits 114, each of which comprises load bolometer 116, feedback resistor 120, and amplifier 118, to form circuit 200A, where the selected active bolometer 102, load bolometer 116, feedback resistor 120, and amplifier 118 may respectively correspond to bolometers 202, 216, 220, and amplifier 218 of circuit 200A. In such an embodiment of bolometer circuit 100, different combinations of active bolometers 102 and column circuits 114 may exhibit different response characteristics (e.g., producing different output voltages for a given incident infrared radiation), if the reference voltage $V_{ref}$, and therefore the biases for active bolometers 102 and load bolometers 116, are not adjusted for each combination to correct for fabrication variations or other variations.

In that regard, according to some embodiments, offset adjustment circuitry 260 may be provided at one or more various locations designated with labels A, B, C, and D on circuit 200A to enable additional and/or fine adjustment to the bias. For example, in some embodiments, offset adjustment circuitry 260 may comprise a variable voltage source (e.g., a DAC) at locations A, B, or both, such that the bias across active bolometer 202, thermally shorted bolometer 216, or both may be further adjusted by varying the voltage level at locations A, B, or both. Thus, for example, if circuit 200A is implemented in bolometer circuit 100, biases across active bolometers 102, load bolometers 116, or both may be further adjusted on a per-pixel basis (e.g., providing adjustment specific to each pixel) to correct for non-uniformities using offset adjustment circuitry 260 comprising one or more variable voltage sources.

In some embodiments, offset adjustment circuitry 260 may be provided at location C and configured to modify or otherwise adjust the voltage supplied by variable voltage source 250 to input 221 of amplifier 218 to provide per-pixel adjustment of the reference voltage $V_{ref}$, thereby providing per-pixel adjustment of the biases. In some embodiments, offset adjustment circuitry 260 may be provided as part of or as an addition to amplifier 218 (e.g., at location D) and configured to alter one or more characteristics of amplifier 218 in response to receiving calibration data (e.g., adjustment bits) for each pixel to provide per-pixel adjustment of the biases. Embodiments that provide offset adjustment at locations C and/or D beneficially allow offset adjustment circuitry 260 to be removed from conduction path 206. Because offset adjustment circuitry 260 may be removed from conduction path 206 in these embodiments, a larger portion of the supply voltage may advantageously be available for biasing active bolometer 202 in conduction path 206, and offset adjustment circuitry 260 may not be subject to, and thus need not be designed to operate under, large variations in the current flowing through conduction path 206.

It is also contemplated for some embodiments that variable voltage source 250 may be utilized, in addition to or in place of offset adjustment circuitry 260, to provides specific adjustment for each pixel or a group of pixels in a FPA, instead of providing a uniform reference voltage V r for an entire FPA to set a global bias.

Circuit 200A may include a low pass filter ("LPF") 222 coupled to output 219 of amplifier 218, according to some embodiments. As discussed above, the output voltage ($V_{out}$) at output 219 may represent a signal indicative of an intensity of incident infrared radiation 201 to be detected. LPF 222 coupled to output 219 may then limit a noise bandwidth in such a signal by filtering out high frequency noise components. In various embodiments, LPF 222 may be implemented as a resistor-capacitor (RC) network LPF, switched capacitor LPF, or any other suitable LPF implementation. In some embodiments, circuit 200A may include a sample-and-hold circuit 224 configured to receive the output voltage ($V_{out}$) from amplifier 218 or the filtered signal from LPF 222 and hold it (e.g., substantially maintain a same voltage level) for a predetermined time before passing it as an analog output signal (e.g., output 299) for circuit 200A. The analog output signal may then be further processed (e.g., converted into digital signals) or otherwise utilized as desired for application of circuit 200A.

Therefore, various embodiments of circuit 200A described above may be configured to set and maintain a desired level of bias to active bolometer 202 and thermally shorted bolometer 216 to generate an amplified output signal indicative of an intensity of incident infrared radiation 201 received at active bolometer 202. Whereas conventional bolometer circuits typically required a significant amount of circuitry for bias control, various embodiments of circuit 200A may advantageously achieve bias generation and control without much of the conventional bias control circuitry and the accompanying complexity, size, cost, and noise.

Specifically, for example, various circuits and components such as CMOS transistors required for conventional bias control may be removed from conduction path 206 of active bolometer 202 and thermally shorted bolometer 216 according to various embodiments of circuit 200A. In addition, associated reference bolometers and other reference circuitry required to generate reference signals (e.g., to drive the gates of CMOS transistors on conduction paths 206) for conventional bias circuitry may not be required for various embodiments of circuit 200A.

Removing components such as bias-controlling CMOS transistors from conduction path 206 not only reduces complexity, size, and cost associated with such circuitry, but also removes noise that may be introduced by CMOS transistors and other circuitry from a sensitive front-end (e.g., conduction path 206) of circuit 200A. In addition, by using a low impedance variable voltage source 250 such as a CMOS DAC to set biases, circuit 200A according to various embodiments may beneficially exhibit lower noise compared with conventional bolometer circuits with bias control capabilities. Furthermore, by removing conventional circuitry such as reference circuitry and bias-controlling CMOS transistors that limit current flow and/or voltage to control bias, a much larger portion of a supply voltage (e.g., a voltage potential between the supply voltage at supply voltage node 208 and the common or ground voltage at common voltage node 210) may be dedicated to biasing active bolometer 202. Consequently, for example, a larger bias may be provided to active bolometers 202 for an improved response.

Further in this regard, various embodiments of circuit 200A may provide a desired level of output via amplifier 218 in a feedback configuration using thermally shorted bolometer 220, without a need for an integrating amplifier (e.g., using a large capacitor) to provide a large gain as typically required in conventional bolometer circuits (e.g., required due to a smaller bias). Amplifier 218 in a feedback configuration using thermally shorted bolometer 220 may not only have a size advantage over an integrating amplifier that typically requires a large capacitor and additional buffers, but may also permit more convenient and stable control over a gain ratio. That is, a desired gain ratio may conveniently be set for circuit 200A by selecting an appropriate resistance value for thermally shorted bolometer 220, which may also act as a substrate-temperature compensated feedback resistor to provide a stable gain ratio over a varying substrate temperature as discussed above. In some embodiments, for example, one or more switches 223 (e.g., CMOS switches) may be provided that may each be turned on or off to selectively short corresponding one or more portions of thermally shorted bolometer 220, thereby adjusting the resistance value for thermally shorted bolometer 220 and in turn adjusting the gain ratio for circuit 200A. Thus, in such embodiments, appropriate ones of the one or more switches 223 may be turned on or off (e.g., by providing control bits or control signals to switches 223) to conveniently adjust the gain ratio for circuit 200A, for example, in case there is a large amount of signal such as when incident IR radiation 201 comes from a fire or a hot object. In contrast, to control the gain ratio for an integrating amplifier in conventional bolometer circuits, a complicated process of adjusting the integration time may be required.

These beneficial aspects of circuit 200A according to various embodiments may thus permit infrared sensors, FPAs for infrared imaging, or other sensor or imaging devices to be realized with lower cost, complexity, noise, and/or a smaller footprint than achievable with conventional bolometer circuits. Such reduction in complexity, size, noise, and cost may beneficially lead to infrared imaging FPAs or other imaging or sensor devices with a higher resolution (e.g., a larger number of pixels at a smaller pixel pitch) and performance (e.g., better response and low noise), yet having a lower manufacturing cost, a smaller size and a lower power requirement, for example.

Circuit 200A of FIG. 2A discussed above is an exemplary circuit to illustrate various techniques to provide a desired level of bias to detector bolometers to generate an output signal indicative of an intensity of incident infrared radiation according to various embodiments of the present disclosure. As such, it should be understood that various techniques discussed above for circuit 200A may be implemented in a wide variety of circuit devices, and that numerous modifications and variations are possible in accordance with the principles of the present disclosure. For example, circuit polarities may be inverted, such as by inverting power supplies and inverting polarities for relevant circuit components. Furthermore, various paths, nodes, and locations discussed above in connection with circuit 200A are identified for purposes of illustration, and should not be understood as limited to specific physical locations of circuit 200A. Rather, one skilled in the art may recognize corresponding paths, nodes, and locations in a circuit or device implementing the principles of the disclosure illustrated in connection with circuit 200A. In addition, the direction of current flow in connection with circuit 200A are identified for purposes of illustration, and one skilled in the art should recognize that the illustrated directions may be reversed or not depending on actual voltage potentials during operation of circuit 200A.

Figure 2B:
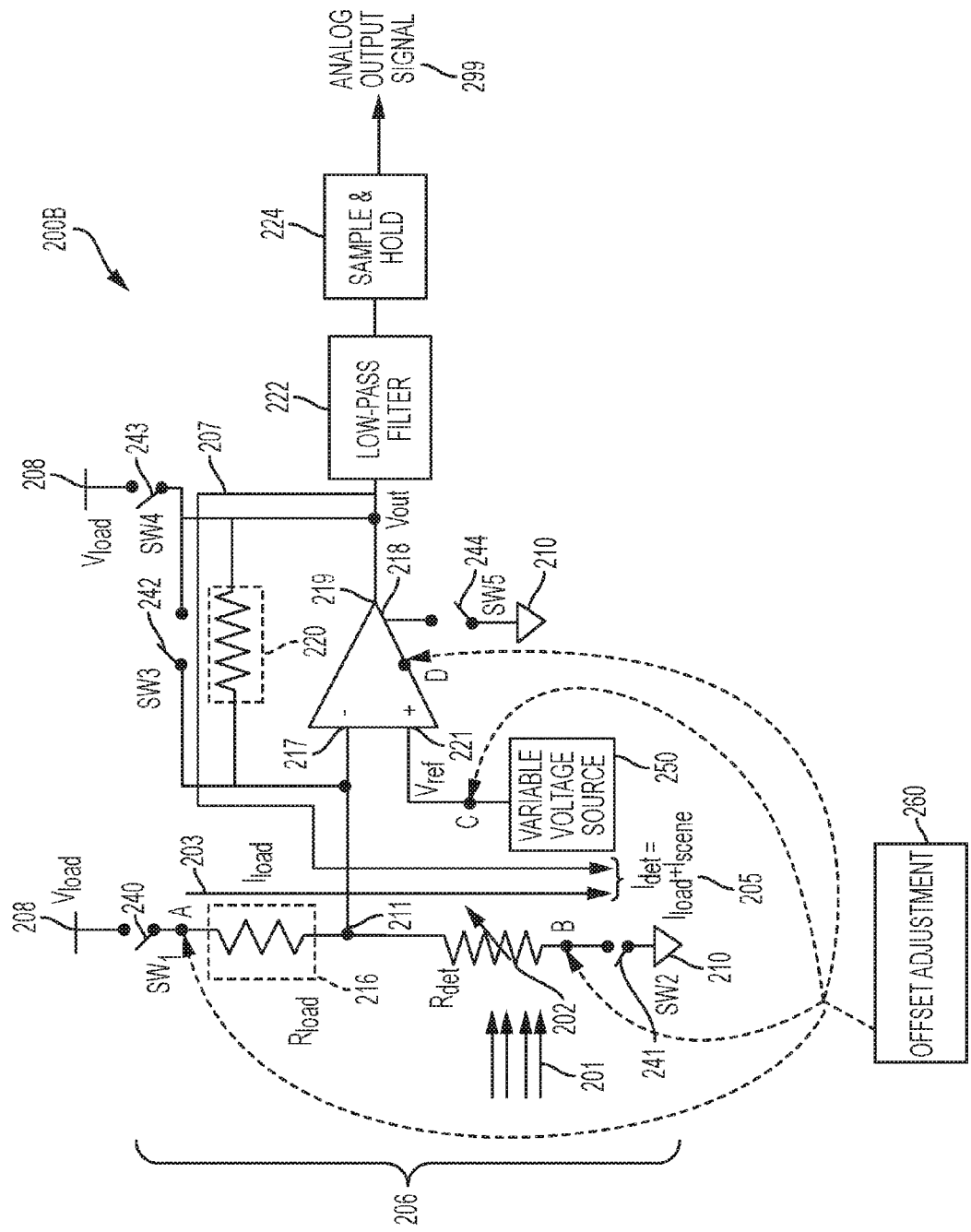
FIG. 2B illustrates a bolometer circuit to provide a desired level of bias to a bolometer and to enable a low-power mode of operation in accordance with an embodiment of the disclosure.

FIG. 2B illustrates an example of a circuit 200B similar to circuit 200A, but further configured to enable a low-power mode of operation in accordance with an embodiment of the disclosure. For example, circuit 200B may be selectively operated in a low-power mode or a normal mode. In the low-power mode according to some embodiments, amplifier 218 and/or conduction path 206 are disconnected from power while input 217 and output 219 of amplifier 218 are driven to a predetermined voltage level. In the normal mode, circuit 200B operates in the manner described above for circuit 200A to generate an output signal indicative of an intensity of incident infrared radiation 201 from an external scene at output 219 of amplifier 218.

In this regard, circuit 200B may include a plurality of switches 240-244 (also labeled "SW1" through "SW5") associated with load bolometer 216, active bolometer 202, and amplifier 218, according to one or more embodiments of the disclosure. In one or more implementation, switches 240-244 (SW1-SW5) may be implemented as CMOS switches. In the illustrated embodiment, switch 240 (SW1) is configured to selectively connect or disconnect load bolometer 216 to or from supply voltage node 208, while switch 241 (SW2) is configured to selectively connect or disconnect active bolometer 202 to or from common voltage node 210. Thus, by selective opening and closing of switches 240 and 241, bolometer conduction path 206 can be connected to or disconnected from power. In the illustrated embodiment, switch 244 (SW5) is configured to selectively connect or disconnect amplifier 216 to or from common voltage node 210, thereby selectively providing or cutting power to amplifier 216. As discussed above for circuit 200A, it should be appreciated that the polarities for relevant circuit components of circuit 200B may be reversed depending on specific implementation as would be understood by one skilled in the art. Accordingly, in other embodiments, switch 240 may be provided to selectively connect or disconnect associated load bolometer 216 to or from common voltage node 210, and switches 241 and 245 may be provided to selectively connect or disconnect the associated components to or from supply voltage node 208, for example.

In the illustrated embodiment, switch 242 (SW3) is configured to selectively connect or disconnect output 219 of amplifier 218 to or from input 217 of amplifier (e.g., selectively short output 219 of amplifier 218 to its input 217), and switch 243 (SW4) is configured to selectively connect or disconnect output 219 of amplifier to supply voltage node 208. In other embodiments, switch 243 (SW4) may be configured to selectively connect or disconnect output 219 of amplifier to a node that supplies a predetermined voltage level other than the supply voltage level at supply voltage node 208. Thus, for example, output 219 of amplifier 218 may be driven to and held a stable level (e.g., the supply voltage level at supply voltage node 208) by closing switch 243 (SW4).

Furthermore, for example, both inputs 217 and 221 and output 219 of amplifier 218 maybe be driven to and held at a stable level (e.g., a supply voltage level at supply voltage node 208) by opening switches 240 and 241 (SW1 and SW2) to disconnect conduction path 206 from power and by closing switches 243 and 244 (SW3 and SW4) to connect output 219 of amplifier 218 to supply voltage node 208 and short output 219 to input 217 of amplifier 218. With inputs 217 and 221 and output 219 of amplifier 218 held at a stable level, power can be cut from amplifier 218 by opening switch 240 (SW5) as discussed above to reduce power consumption by circuit 200B while providing a stable, predetermined level of output.

Therefore, in the illustrated embodiment, circuit 200B may be operated in a normal mode by setting switches 240, 241, and 244 (SW1, SW2, and SW5) in a closed position and switches 242 and 243 (SW3 and SW4) in an open position, and operated in a low-power mode by setting switches 240, 241, and 244 (SW1, SW2, and SW5) in an open position and switches 242 and 243 (SW3 and SW4) in a closed position. In another embodiment, circuit 200B may be operated in a low-power mode by setting switch 240 (SW1) in an open position and omitting switch 241 (e.g., the electrical path is not broken), or by setting switch 241 (SW2) in an open position and omitting switch 240 (e.g., the electrical path is not broken), thereby disconnecting bolometer conduction path 206 from power while at the same time driving node 211 and input 217 of amplifier 218 to a predetermine voltage level (e.g., based on the supply voltage level if switch 240 is omitted or on the common voltage level if switch 241 is omitted). Amplifier 218 is also disconnected from power and its output is driven to a predetermined level (e.g., the supply voltage level) by setting switch 243 in a closed position and switch 244 in an open position. Since node 211 and input 217 is driven to a predetermine voltage level through part of bolometer conduction path rather than by output 219 of amplifier 218, switch 242 (SW3) may also be omitted in this embodiment. In yet another embodiments, circuit 200B may be operated in a low-power mode by setting switches 240, 241 and 243 (SW1, SW2 and SW4) in an open position and switches 242 and 244 (SW3 and SW5) in a closed position. Such a low-power mode may also referred to as a killed-pixel mode and provide less power saving, but may allow a controlled response and current levels for a bad (opened or shorted) active bolometer while continuing to drive the reference voltage level onto node 211, for example, in preparation for the next active bolometer in the column. As may be appreciated, not all of switches 240-244 are required in those embodiments with a killed-pixel or other low-power modes. In some embodiments, a control circuit, such as for example timing and control circuit 132 and/or processor 140, may be configured to generate control signals to set switches 240-244 to operate circuit 200B in a low-power mode or a normal mode.

As discussed above, when operated in a low-power mode, bolometer conduction path 206 and amplifier 218 are disconnected from power to reduce power consumption of circuit 200B, while at the same time providing a stable, predetermined level of output for circuit 200B. As a result, when circuit 200B is implemented as part of a larger circuit or device, circuit 200B can be selectively operated in the low-power mode to save power without undesirably affecting the functionality of other parts of the larger circuit or device. For example, a plurality of circuits 200B may be implemented in a FPA, such as in an embodiment of bolometer circuit 100, which may include a circuit 200B for each column or unit cell. In such implementations, circuits 200B for some columns or unit cells may be operated in the normal mode while the remainder of columns or unit cells may be operated in the low-power mode, thereby reducing the overall power consumption by the FPA. Furthermore, the outputs of those columns or unit cells that are operated in the low-power mode will not appear as noise or random artifacts but will rather be held at a stable, predetermined value as discussed above, which may beneficially permit IR images captured by the FPA to be used for some purposes even when some columns or unit cells are in the low-power mode. Further examples of an FPA configured to use part of the FPA in the low-power mode is discussed below with reference to FIG. 4D in accordance with one or more embodiments of the disclosure. Although circuit 200B is illustrated in FIG. 2B as having circuit 200A as a base configuration, it should be appreciated that the techniques and principles described in connection with embodiments of circuit 200B are also applicable to other suitable bolometer circuits having an active bolometer, a resistive load, an amplifier, and/or other components generally found in bolometer circuits.

Figure 3:
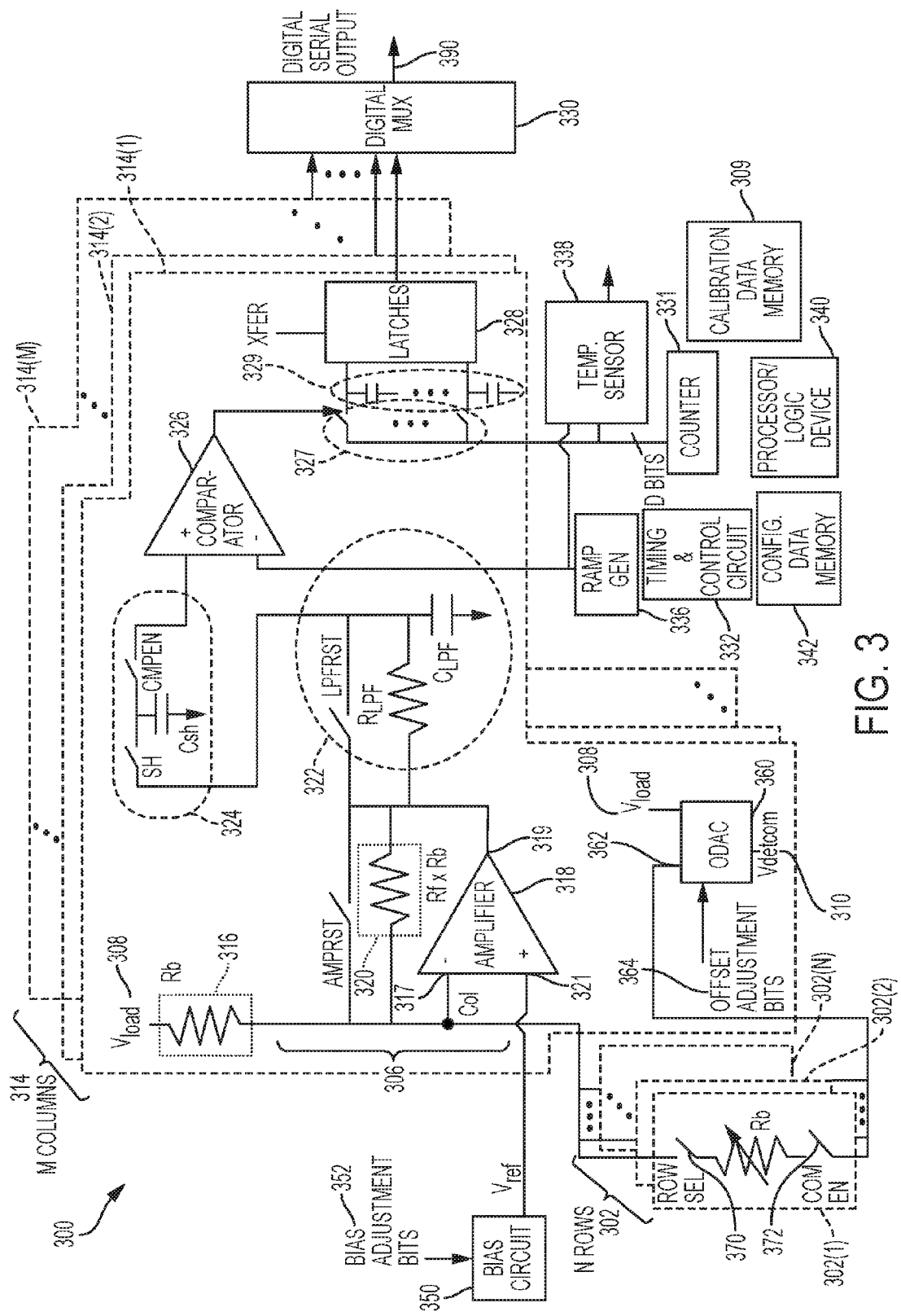
FIG. 3 illustrates a bolometer circuit to provide a desired level of bias to a plurality of bolometers in accordance with an embodiment of the disclosure.

FIG. 3 illustrates a bolometer circuit 300 comprising an embodiment of circuit 200A in accordance with an embodiment of the disclosure. Bolometer circuit 300 may include one or more column circuit blocks 314 (individually identified as column circuit block 314(1) through 314(M), where M may represent the desired number of columns in unit cell array 104). Each column circuit block 314 may be associated with one or more active bolometers 302. In FIG. 3, only those one or more active bolometers 302 (individually identified as column circuit block 302(1) through 302(N), where N may represent the desired number of rows in unit cell array 104) that are associated with column circuit block 314(1) are shown for clarity, but it will be understood that other active bolometers 302 not explicitly shown in FIG. 3 may be provided and associated with other column circuit blocks 314(2) through 314(M).

Each active bolometer 302 may be accompanied by switches 370 and 372 for selectively enabling and connecting to a corresponding one of column circuit blocks 314. In some embodiments, one or more blind bolometers (not shown in FIG. 3) may additionally be associated with each column circuit block 314. Such blind bolometers may be implemented in a same or similar manner as blind bolometer 134 discussed above for bolometer circuit 100 and configured to be selectively enabled and connected to the each column circuit block 314 via accompanying switches, for example, to provide a reference signal level for calibration and other purposes.

In some aspects, column circuit block 314 may represent one of column circuits 114, and active bolometer 302 may represent one of active bolometers 102 of bolometer circuit 100, where active bolometer 102 may be selectively coupled to a corresponding one of column circuits 114 via switches to form a circuit comprising an embodiment of circuit 200A as discussed above. In this regard, bolometer circuit 300 according to various embodiments may further include a column multiplexer 330, a calibration data memory 309, a timing and control circuit 332, a ramp generator 336, a temperature sensor 338, a processor or other logic device 340, and/or a configuration data memory 342, all of which may be implemented in a similar manner as their corresponding components of bolometer circuit 100.

According to various embodiments, each column circuit block 314 may include a thermally shorted bolometer 316, an amplifier 318 (an operational amplifier), a thermally shorted bolometer 320 (e.g., feedback bolometer), a LPF 322 (e.g., a RC LPF), and/or a sample-and-hold circuit 324, which may respectively correspond to thermally shorted bolometer 216, amplifier 218, thermally shorted bolometer 220, LPF 222, and sample-and-hold circuit 224 of circuit 200A. Amplifier 318, thermally shorted bolometer 320, and other components that may be associated with amplifier 318 and/or thermally shorted bolometer 220 may be referred to herein as belonging to an amplifier circuit for column circuit block 314.

As may be appreciated, various components of column circuit block 314 may be configured to form corresponding portions of circuit 200A discussed above. For example, as with circuit 200A, thermally shorted bolometer 320 may be coupled in parallel across an inverting input 317 and an output 319 of amplifier 318, thereby configuring amplifier 318 as a feedback amplifier. Thermally shorted bolometer 320 may be configured with a resistance to provide a desired gain. For example, thermally shorted bolometer 320 may be configured to exhibit a resistance Rf×Rb as shown in FIG. 3, where Rf may represent a gain factor and Rb may represent a resistance of active bolometer 302.

In various embodiments, thermally shorted bolometer 316 may be coupled to supply voltage node 308 at one end, and to a circuit path 306 leading to one or more associated active bolometers 302(1)-302(N) at the other end. Active bolometers 302(1)-302(N) may be implemented in a same or similar manner as active bolometer 202 of circuit 200A. In general, the resistance of thermally shorted bolometer 316 and the resistance of active bolometer 302 may be determined as desired for particular implementations of bolometer circuit 300, taking into account, for example, a supply voltage range, operating characteristics of other components of bolometer circuit 300, a desired range of bias, and other implementation parameters. For example, the ratio of the resistance of the resistance of thermally shorted bolometer 316 and the resistance of active bolometer 302 may be set to K, such as by providing a thermally shorted bolometer 316 having a resistance of K×Rb, where K may be any desired value for particular implementation parameters and need not be an integral number. In the illustrated embodiment, thermally shorted bolometers 316 and active bolometers 302 have a similar resistance (i.e., the resistance ratio of thermally shorted bolometers 316 to active bolometer is approximately 1).

In various embodiments, one of active bolometers 302 (1)-302(N) may be coupled to thermally shorted bolometer 316 via switch 370 at one end, and to an offset-adjustment DAC (ODAC) 360 via another switch 372 at the other end. For example, one or more active bolometers 302 may each be selectively enabled and electrically connected to thermally shorted bolometer 316 and ODAC 360 of a corresponding one of column circuit blocks 314 (e.g., via switches 370 and 372 being open or closed according to control signals from timing and control circuit 332) to form a bolometer conduction path and operate in a same or similar manner as active bolometer 202 discussed above for circuit 200A. Switches 370 and 372 and associated switching circuitry (e.g., implemented as part of timing and control circuit 332) may be implemented using appropriate techniques for multi-pixels bolometer circuits, including such techniques, for example, as those described in U.S. Pat. No. 6,812,465 entitled "Microbolometer Focal Plane Array Methods and Circuitry" and U.S. Pat. No. 7,679,048 entitled "Systems and Methods for Selecting Microbolometers within Microbolometer Focal Plane Arrays," which are incorporated herein by their entireties.

Thus, in one aspect, biases across a connected and enabled one of active bolometers 302 and thermally shorted bolometer 316 may be set and maintained in a manner discussed above for circuit 200A. In this regard, inverting input 317 of amplifier 318 may be coupled to a node (designated "Col") between thermally shorted bolometer 316 and active bolometers 302 on circuit path 306, whereas non-inverting input 321 of amplifier 318 may be provided with a reference voltage $V_{ref}$. Configured as such, a connected and enabled one of active bolometers 302 may be biased by an output 362 of ODAC 360 and by the reference voltage level $V_{ref}$ appearing at node Col as discussed above for circuit 200A.

In various embodiments, ODAC 360 of each column circuit block 314 may be coupled to supply voltage node 308 and common voltage node 310, and configured to generate a desired voltage level at its output 362 in response to offset adjustment bits 364 (e.g., a string of binary bits indicative of a desired offset voltage). As such, ODAC 360 according to some embodiments may implement offset adjustment circuitry 260 for bolometer circuit 300. That is, ODAC 360 of each column circuit block 314 may apply an adjustment to the bias across the active bolometer 302 that is selectively enabled and electrically connected to each column circuit block 314.

In this regard, in some embodiments, ODAC 360 may be used to adjust the active bolometer bias for the corresponding column circuit block 302. In some embodiments, ODAC 360 may be used to apply a per-pixel adjustment of the bias across active bolometers 302. In such embodiments, calibration data memory 309 may be configured to store corresponding offset adjustment bits 364 for every pixel (e.g., for each one of active bolometers 302) in bolometer circuit 300, and timing and control circuit 332 may be configured to supply corresponding offset adjustment bits 364 to ODAC 360 of a corresponding one of column circuit blocks 314 in connection with the switching and enabling of each row of active bolometers 302. In various embodiments, ODAC 360 may comprise a resistor-network DAC, a CMOS DAC, or any other suitable type of DAC for implementing offset adjustment circuitry 260.

In various embodiments, bolometer circuit 300 may include a CMOS bias circuit 350 coupled to non-inverting input 321 of amplifier 318 to provide the reference voltage $V_{ref}$. In this regard, CMOS bias circuit 350 according to one or more embodiments may comprise a CMOS DAC configured to generate a desired voltage level in response to bias adjustment bits 352 (e.g., a string of binary bits indicative of a desired reference voltage $V_{ref}$). Consequently, CMOS bias circuit 350 according to various embodiments may implement variable voltage source 250 for bolometer circuit 300. That is, in bolometer circuit 300, CMOS bias circuit 350 may be configured to provide the reference voltage $V_{ref}$ at a desired level based on bias adjustment bits 352 (e.g., stored in and supplied from calibration data memory 309) for setting and maintaining biases globally for all column circuit blocks 314 and all rows of active bolometers 302. In some embodiments, CMOS bias circuit 350 may also comprise associated circuitry to latch and/or load bias adjustment bits 352, and may correspond to bias circuit 108 of bolometer circuit 100.

With a desired level of bias applied, a resistance change due to incident infrared radiation at active bolometers 302 produces an amplified output voltage at output 319 of amplifier 318, as discussed above for circuit 200A. Output 319 of amplifier 318 is coupled to LPF 322, which in embodiments of bolometer circuit 300 is implemented as a resistor-capacitor (RC) network LPF (as illustrated for example in FIG. 3). At the other end, LPF 322 is coupled to sample-and-hold circuit 324, which may be implemented using one or more switches and one or more capacitors (as illustrated for example in FIG. 3) to substantially maintain filtered analog voltage level (e.g., filtered analog signal) indicative of an intensity of incident infrared radiation received at active bolometers 302.

In various embodiments, each column circuit block 314 may include a comparator 326, switches 327, capacitors 329, and latches 328, which may be utilized to convert the filtered analog voltage level captured at sample-and-hold circuit 324 into a digital output value (e.g., by performing a ramp-compare A/D conversion). For example, comparator 326 may be configured to receive the voltage level from sample-and-hold circuit 324 and the ramp signal from ramp generator 336, and to compare the voltage level and the ramp signal to trigger (e.g., generate a signal to close switches 327) when the ramp signal substantially matches the voltage level.

In this regard, bolometer circuit 300 may also include a counter 331 (e.g., a digital counter in some embodiments) configured to increment (or decrement depending on the implementation of counter 331) a count value (e.g., encoded in one or more count signals) in response to receiving a clock signal. The count value incremented or decremented by counter 331 may have a substantially similar period (e.g., resets to zero or a base value at substantially the same time) as the ramp signal generated by ramp generator 336. When comparator 326 triggers, the current count value may be selected and stored in latches 328 as a digital value. The output of latches 328 of each column circuit block 314 may be coupled to column multiplexer 330 configured to multiplex the digital values stored in latches 328 for each column circuit block 314 to generate a digital output signal 390 for all columns in bolometer circuit 300. In various embodiments, timing and control circuit 332, processor or other logic device 340, and/or other component of bolometer circuit 300 may be configured to repeat generation of digital output signal 390 for all rows of active bolometers 302 according to predetermined timing, such that a concatenation of digital output signal 390 may digitally represent an image frame of infrared radiation received at active bolometers 302 of bolometer circuit 300. Thus, for example, embodiments of bolometer circuit 300 may configured to capture a sequence of infrared image frames.

Therefore, various embodiments of bolometer circuit 300 discussed with respect to FIG. 3 may implement one or more embodiments of circuit 200A for multiple columns and rows of active bolometers 302 that form a FPA to generate analog and/or digital output of infrared imaging data. Other bolometer circuits that implement one or more embodiments of circuit 200A in the context of a FPA in accordance with other embodiments of the present disclosure are illustrated below with respect to FIGS. 4A through 8.

Figure 4A:
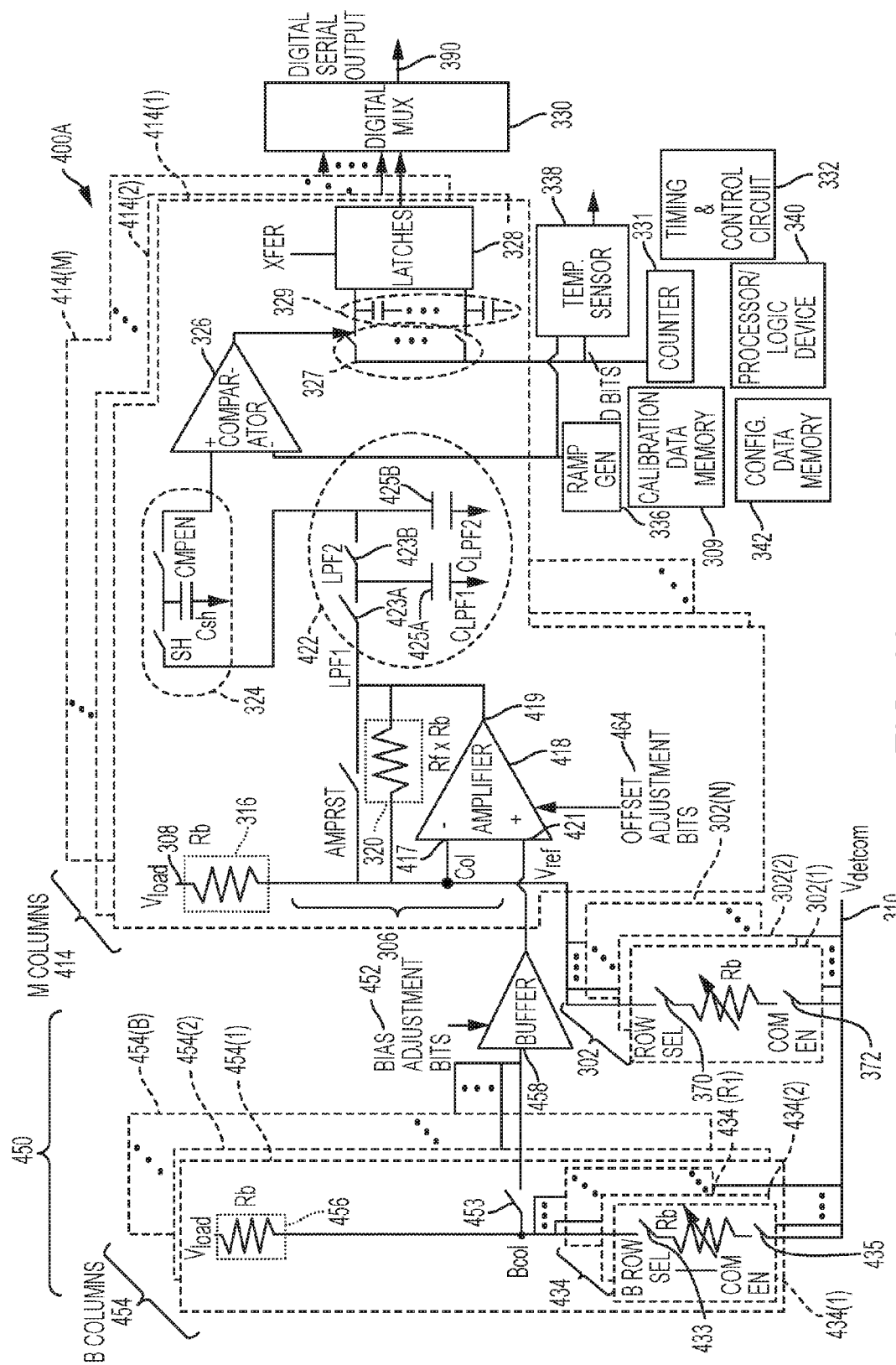
FIG. 4A illustrates a bolometer circuit to provide a desired level of bias to a plurality of bolometers and to compensate for bolometer self-heating, in accordance with an embodiment of the disclosure.

FIG. 4A illustrates a bolometer circuit 400A comprising an embodiment of circuit 200A in accordance with another embodiment of the disclosure. In one aspect, for example, implementations of variable voltage source 250 for various embodiments of bolometer circuit 400A may advantageously vary the reference voltage $V_{ref}$ to compensate for self-heating of active bolometers.

Self-heating of active bolometers generally occurs due to the current flow (e.g., $I_{det}$ illustrated in FIG. 2) and resulting power dissipation through active bolometers while they are biased to obtained a measurement of incident infrared radiation. In that sense, self-heating of active bolometers may also be referred to as bias heating or pulse bias heating, for example in cases where active bolometers of a FPA are periodically connected to a column circuit and biased for some duration as discussed above for FIGS. 1 and 3, which results in pulses of active bolometer heating and cooling. As briefly discussed above, the temperature, and therefore the resistance, of active bolometers is affected by self-heating since active bolometers are isolated (e.g., released) from a substrate, whereas the temperature of thermally shorted bolometers are not appreciably affected by self-heating because of the thermal shorting to the substrate acting as a heat sink.

As may be appreciated, temperature changes of an active bolometer due to self-heating may limit the usable output signal range (or output signal swing) for measuring incident infrared radiation received at the active bolometer, even when a thermally shorted bolometer is used as a temperature-compensated load, and even when biases for the active bolometer and the thermally shorted bolometer are set and maintained at a predetermined level. To reduce such undesirable effects of active bolometer self-heating, various embodiments of bolometer circuit 400A may vary the bias-setting reference voltage $V_{ref}$ in response to self-heating of active bolometers to correct for the resistance changes of active bolometers due to self-heating.

More specifically, in various embodiments, a bias circuit 450 implementing variable voltage source 250 for bolometer circuit 400A may comprise one or more bias columns 454 each providing (e.g., at a node labeled "BCol" in FIG. 4A) a voltage level that varies in response to self-heating of one or more associated blind bolometers 434 that track self-heating of active bolometers 302. For example, in FIG. 4A, bias columns 454(1) through 454(B) are individually identified where "B" denotes the desired number of bias columns in bias circuit 450, and blind bolometers 434(1) through 434($R_1$) are individually identified where "$R_1$" denotes the number of blind bolometers associated with bias column 454(1). Other bias columns 454(2) through 454(B) may each be associated with a corresponding number (denoted $R_2, R_3, \ldots, R_B$) of blind bolometers (not explicitly shown in FIG. 4A), where $R_1, R_2, R_3, \ldots, R_B$ may be same or different depending on embodiments.

Blind bolometers 434 may be implemented in a similar manner as blind bolometers 134 discussed above in connection with FIG. 1. That is, blind bolometers 434 are thermally isolated (e.g., released) from a substrate while being substantially shielded (e.g., shielded to the extent allowed by a typical fabrication process) from incident infrared radiation, and thus their temperatures change due to self-heating and substrate temperature changes but not incident infrared radiation. In one or more embodiments, blind bolometers 434 may be implemented to exhibit a similar TCR and resistance value as active bolometers 302.

Each bias column 454 comprises a thermally shorted bolometer 456 that may be implemented in a similar manner as thermally shorted bolometer 316 and act as a temperature-compensated load. Thermally shorted bolometer 456 may be selectively coupled to one of blind bolometers 434 in series in a conduction path extending from supply voltage node 308 to common voltage node 310, thereby mirroring the conduction path comprising thermally shorted bolometer 316 and active bolometer 302 for measuring incident IR radiation. Because of such mirroring of active bolometers 302 using blind bolometers 434 that track resistance changes at active bolometers 302 due to self-heating, each bias column 454 may act as a voltage divider that provides a varying voltage level (e.g., when taken from the node labeled BCol) indicative of at what level the bias-setting reference voltage $V_{ref}$ should be in order for the output voltage (e.g., output signal) of an amplifier 418 of column circuit block 414 to represent predominantly or exclusively incident infrared radiation from a scene given the temperature variations attributable to self-heating at active bolometer 302. In this sense, bias columns 454 may also be referred to as reference conduction paths.

In this regard, node BCol between thermally shorted bolometer 456 and a connected and enabled one of blind bolometers 434 may be coupled to an input 421 (e.g., a non-inverting input) of amplifier 418 to supply a voltage level at node BCol as the reference voltage $V_{ref}$ to amplifier 418. In one or more embodiments, node BCol of each bias column 454 and input 421 of amplifier 418 may be coupled via a buffer 458 configured to adjust an input voltage from BCol in response to bias adjustment bits 452 and to output the adjusted input voltage. In such embodiments, bias adjustment bits 452 (e.g., stored in calibration data memory 309) may be applied to make a global fine adjustment to the varying, self-heating-compensating voltage level provided by one or more bias columns 454, for example. If two or more bias columns 454 are provided (e.g., B>=2), the voltage levels at nodes BCol of bias columns 454(1) through 454(B) are averaged by virtue of parallel paths respectively connecting nodes BCol of columns 454(1) through 454(B) to buffer 458, thereby providing a more accurate reference voltage $V_{ref}$ to amplifier 418, for example. In this regard, some embodiments may include a column switch 453 for each bias column 454, which may be opened or closed (e.g., by a control bit) to selectively disconnect a corresponding bias column 454, in case a particular bias column 454 is not providing an accurate reference voltage $V_{ref}$, for example.

As discussed above, each bias column 454 may comprise one or more associated blind bolometers 434. In some embodiments, a plurality of associated blind bolometers 434 may be provided for each bias column 454 and selectively enabled and connected to thermally shorted bolometer 456 to form the voltage divider discussed above. More specifically for some embodiments, switches 433 and 435 may be provided for each blind bolometer 434, and selectively closed or opened according to appropriate timing based on signals from timing and control circuit 332. For example, timing and control circuit 332 may be configured to control switches 433 and 435 for blind bolometers 434 and switches 370 and 372 for active bolometers 302, such that each blind bolometer 434 may be selectively enabled and connected to produce a voltage level at node BCol in connection with (e.g., synchronous with) the selection and enabling of a corresponding one of active bolometers 302, thereby allowing the enabled and connected one of blind bolometers 434 to track self-heating of the corresponding one of active bolometers 302 while being biased (e.g., during its bias period or bias pulse).

Such switching among a plurality of blind bolometers 434 synchronous with or otherwise consistent with switching of active bolometers 302 may not only enable tracking of the pulse-bias heating pattern of active bolometers 302, but may also allow sufficient time for blind bolometers 434 to cool down to similar temperatures as corresponding active bolometers 302 prior to being biased again. In some embodiments, each bias column 454 may comprise the same number of blind bolometers 434 as the number of rows of active bolometers 302 in bolometer circuit 400A (e.g., $R_1=R_2=\ldots=R_B=N$). That is, for each row of active bolometer 302, there is provided a corresponding blind bolometer 434 in each bias column 454 according to such embodiments. Such embodiments may allow blind bolometers 434 to mirror the pulse bias heating and cooling timing of corresponding active bolometers 302.

In one example, bias columns 454 together with buffer 458 may be represented by bias circuit 108 in FIG. 1. In another example, blind bolometers 434 and associated switches 433 and 435 may be represented by cells (e.g., as columns next to unit cell array 104 rather than rows shown above unit cell array 104) of blind bolometers 134 in FIG. 1, while the remaining portion of bias columns 454 together with buffer 458 may be represented by bias circuit 108 in FIG. 1.

Remaining portions of bolometer circuit 400A may be implemented in accordance with various embodiments and alternatives described above in connection with FIGS. 1 through 3. For example, in embodiments of bolometer circuit 400A, a LPF 422 may be implemented with a switched capacitor circuit comprising one or more capacitors 425A-B and one or more associated switches 423A-B as briefly discussed with respect to LPF 222 of FIG. 2. In the example shown in FIG. 4A, the switched capacitor circuit is configured to open or close switches 423A and 423B according to desired timing (e.g., based on a clock signal) to achieve a desired analog signal filtering properties. For other embodiments, however, LPF 422 for bolometer circuit 400A may alternatively be implemented using a RC network as shown for LPF 322 of bolometer circuit 300, or using other components and techniques described herein. Conversely, other bolometer circuit embodiments (e.g., bolometer circuit 300) described herein may utilize a switch capacitor circuit to implement a LPF.

In addition, in the embodiments of bolometer circuit 400A illustrated by FIG. 4A, offset adjustment circuitry 260 of circuit 200A may be implemented as part of or in conjunction with amplifier 418 as briefly discussed above in connection with FIG. 2. In particular, amplifier 418 according to various embodiments may be configured to make adjustments to the voltage levels at its inputs 417 and/or 421 and/or other operating characteristics of amplifier 418 in response to offset adjustment bits 464 received from calibration data memory 309 for a corresponding column circuit block 414 or a pixel therein. Amplifier 418 for the various embodiments illustrated by FIG. 4A may thus allow per-column or per-pixel fine adjustment of biases across active bolometers 302, for example.

As discussed above in connection with offset adjustment circuitry 260, embodiments of bolometer circuit that provide offset adjustment circuitry 260 as part of or in conjunction with amplifier 418 may beneficially allow a larger portion of the supply voltage to be available for biasing active bolometer 302. For other embodiments, offset adjustment circuitry 260 for bolometer circuit 400A may alternatively be implemented using ODAC 360 or other components and techniques described herein. Conversely, other bolometer circuit embodiments described herein may utilize techniques described for amplifier 418 to implement offset adjustment circuitry 260.

As may be appreciated from the foregoing discussion, various embodiments of bolometer circuit 400A described above may not only provide appropriate biases to active bolometers 302 with reduced complexity, size, cost, and noise compared with conventional bolometer circuits, but also vary the biases in response to self-heating of active bolometers 302 to correct for undesirable effects of the self-heating, thereby advantageously increasing the usable range (or signal swing) of an output signal indicative of incident IR radiation at active bolometers 302.

Figure 4B:
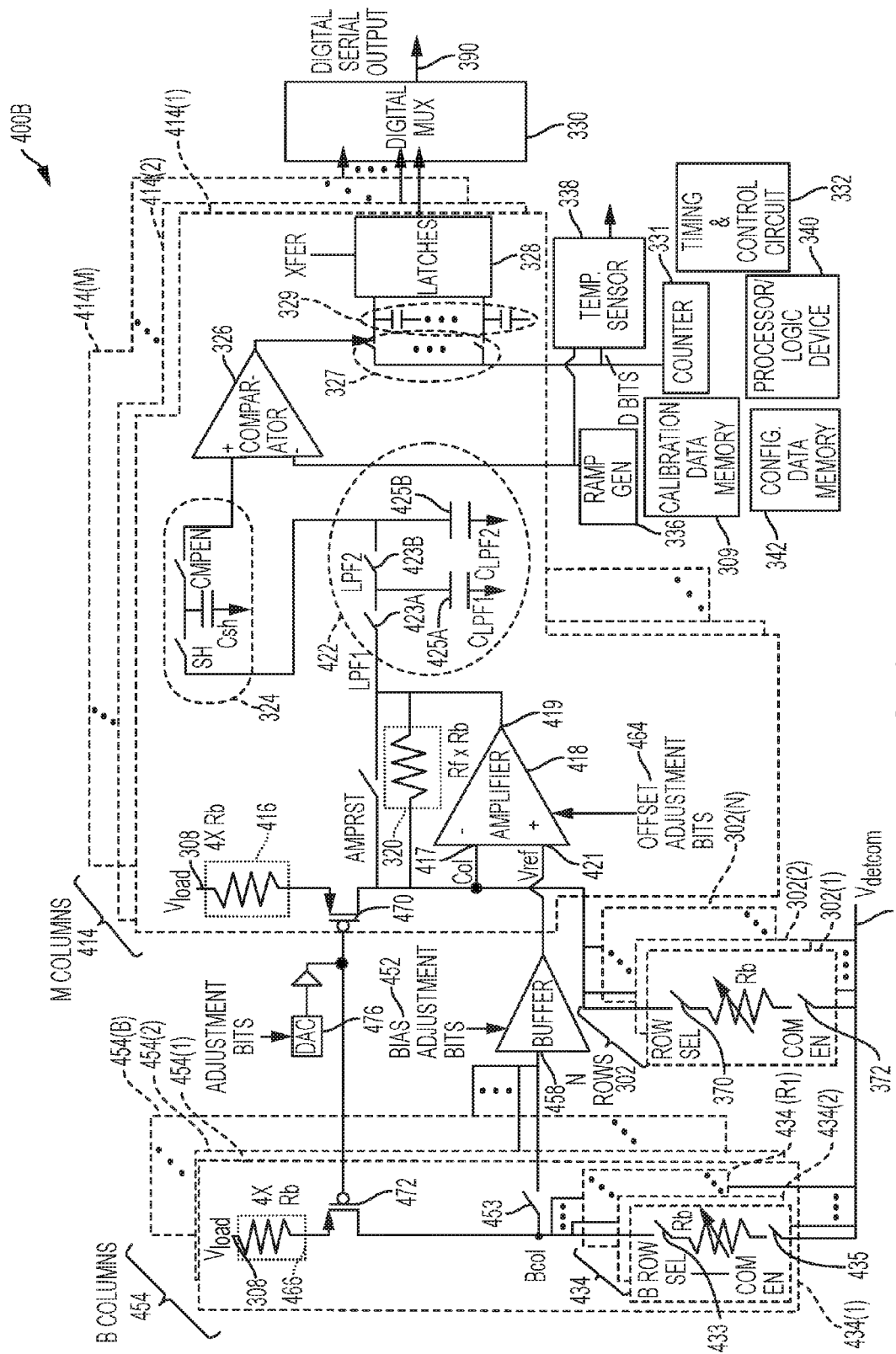
FIG. 4B illustrates a bolometer circuit to provide a desired level of bias to a plurality of bolometers and to compensate for bolometer self-heating in accordance with another embodiment of the disclosure.

FIG. 4B illustrates a bolometer circuit 400B having multiple columns and rows of active bolometers 302 (e.g., arranged in a FPA) in accordance with another embodiment of the disclosure. Bolometer circuit 400B is similar to bolometer circuit 400A, but is configured to reduce noise relative to bolometer circuit 400A. In particular, bolometer circuit 400B includes a transistor 470 (e.g., a MOSFET 470 according to some embodiments) between thermally shorted bolometer 416 and a node (e.g., node labeled "Col" in FIG. 4B) that is coupled to input 417 of amplifier 418. Thermally shorted bolometer 416 and transistor 470 connected in series in this manner according to one or more embodiments may also be referred to herein as a resistive load for each column circuit block 414.

The source of transistor 470 (e.g., the source of MOSFET 470) is set to a voltage level relative to its gate, thereby producing a voltage difference from supply voltage node 308 across thermally shorted bolometer 416. This voltage difference across the thermally shorted bolometer 416 generates a load current through active bolometer 302. In this regard, thermally shorted bolometer 416 and transistor 470 connected in series may essentially operate as a current source that generates the load current. Similarly, in one or more embodiments, bolometer circuit 400B may include a transistor 472 (e.g., a MOSFET 472 according to some embodiments) between thermally shorted bolometer 466 and a node (e.g., node labeled "BCol" in FIG. 4B) that is coupled to input 421 of amplifier 418. Thermally shorted bolometer 466 and transistor 472 connected in series may similarly operate as a current source that generates a similar load current to blind bolometers 434 for each bias column. By providing transistors 470 and 472, thermally shorted bolometer 416 and 466 are isolated from nodes Col and BCol, respectively, thereby reducing noise from thermally shorted bolometers 416 and 466.

The voltage across active bolometer 302 is defined by the resistance of active bolometer 302 and the load current generated by thermally shorted bolometer 416 and transistor 470. Similarly, the voltage across blind bolometer 434 is defined by the resistance of blind bolometer 434 and the load current generated by thermally shorted bolometer 466 and transistor 472. Thus, as these load currents are increased, the biases across active bolometer 302 and blind bolometer 434 may also be increased. With the load current providing a desired bias level (e.g., a bias current) across active bolometer 302, a voltage level may be determined (e.g., at node Col) in response to the load current flowing through active bolometer 302 that exhibits a resistance change due to the external IR radiation. With the load current providing a desired bias level (e.g., a bias current) across blind bolometer 434, a reference voltage level to input 421 of amplifier 418 may be determined (e.g., at node BCol) in response to the load current flowing through blind bolometer 434 that tracks self-heating of active bolometer 302. MOSFETs 470 and 472 may be implemented as pMOS transistors according to one or more embodiments In the illustrated embodiment, the gates of MOSFETs 470 and 472 may be connected to a variable voltage source, such as a DAC 476, that provides a variable voltage level to the gates in response to adjustment bits. Thus, by controlling the variable voltage level provided by the variable voltage source to the gates of MOSFETs 470 and 472, coarse or fine adjustments to the load currents, and thus to the active bolometer bias and gain, may be made. In addition, by having the transistors (e.g., MOSFETs 470 and 472), the gain from the voltage at input 421 to the current at input 417 of amplifier 418 may be reduced, which in turn beneficially reduces noise from amplifier 418. Therefore, bolometer circuit 400B according to one or more embodiments may reduce noise from amplifier 418 as well as from thermally shorted bolometers 416 and 466.

In one or more embodiments, thermally shorted bolometers 416 and 466 may have an increased resistance and a commensurate increase in a supply voltage level (e.g., a voltage level at supply voltage node 308) to reduce noise relative to bolometer circuit 400A, in addition to the noise reduction benefit by isolating thermally shorted bolometers 416 and 466 with transistors 470 and 472. In general, according to various embodiments, the ratio of the resistance of thermally shorted bolometers 416 to active bolometers 302 in column circuit blocks 414 may be larger than that for bolometer circuit 400A, such that the supply voltage level for bolometer circuit 400B may be increased over the nominal supply voltage level used in bolometer circuit 400A (in which thermally shorted bolometers 316 and active bolometers 302 have a smaller resistance ratio as discussed above) while maintaining a similar load current to active bolometers 302 as in bolometer circuit 400A. For example, if the resistance ratio of thermally shorted bolometers 316 to active bolometers 302 in the nominal case of bolometer circuit 400A is K (e.g., the resistance of thermally shorted bolometer 316 is K×Rb where Rb denotes the resistance of active bolometer 302 as discussed above for FIG. 3), the resistance ratio of thermally shorted bolometers 416 to active bolometers 302 in bolometer circuit 400B may be L, where L>K (e.g., the resistance of thermally shorted bolometer 416 is L×Rb).

In the non-limiting, illustrated embodiment of FIG. 4B, the resistance of thermally shorted bolometers 416 is larger than the resistance of active bolometer 302 (i.e., the resistance ratio of thermally shorted bolometers 416 to active bolometer 302 is larger than 1), as opposed to bolometer circuit 400A where thermally shorted bolometers 316 and active bolometers 302 have a similar resistance (i.e., the resistance ratio of thermally shorted bolometers 316 to active bolometer 302 is approximately 1). Similarly, the increased supply voltage level for bolometer circuit 400B allows the resistance of thermally shorted bolometers 466 for bias columns 454 to be larger than the resistance of blind bolometers 434 while providing a similar load current to blind bolometers 434 as in bolometer circuit 400A. In some embodiments, bolometer circuit 400B may include thermally shorted bolometers 416 and 466 having a resistance that is two to four times that of active bolometers 302 and blind bolometers 434. In the illustrated embodiment, the resistance of thermally shorted bolometers 416 and 466 are approximately four times (indicated in FIG. 4B as "4×Rb") the resistance of active bolometers 302 and blind bolometers 434. With an appropriate increase in the supply voltage level, the load current flowing from the resistive loads (e.g., thermally shorted bolometers 416 and 466) to active bolometers 302 and blind bolometers 434 may be substantially similar to the nominal load current in bolometer circuit 400A. At the same time, because of the resistance increase of the resistive loads (e.g., thermally shorted bolometers 416 and 466), the current noise from the resistive loads will be decreased, thereby obtaining a noise reduction benefit.

Figure 4C:
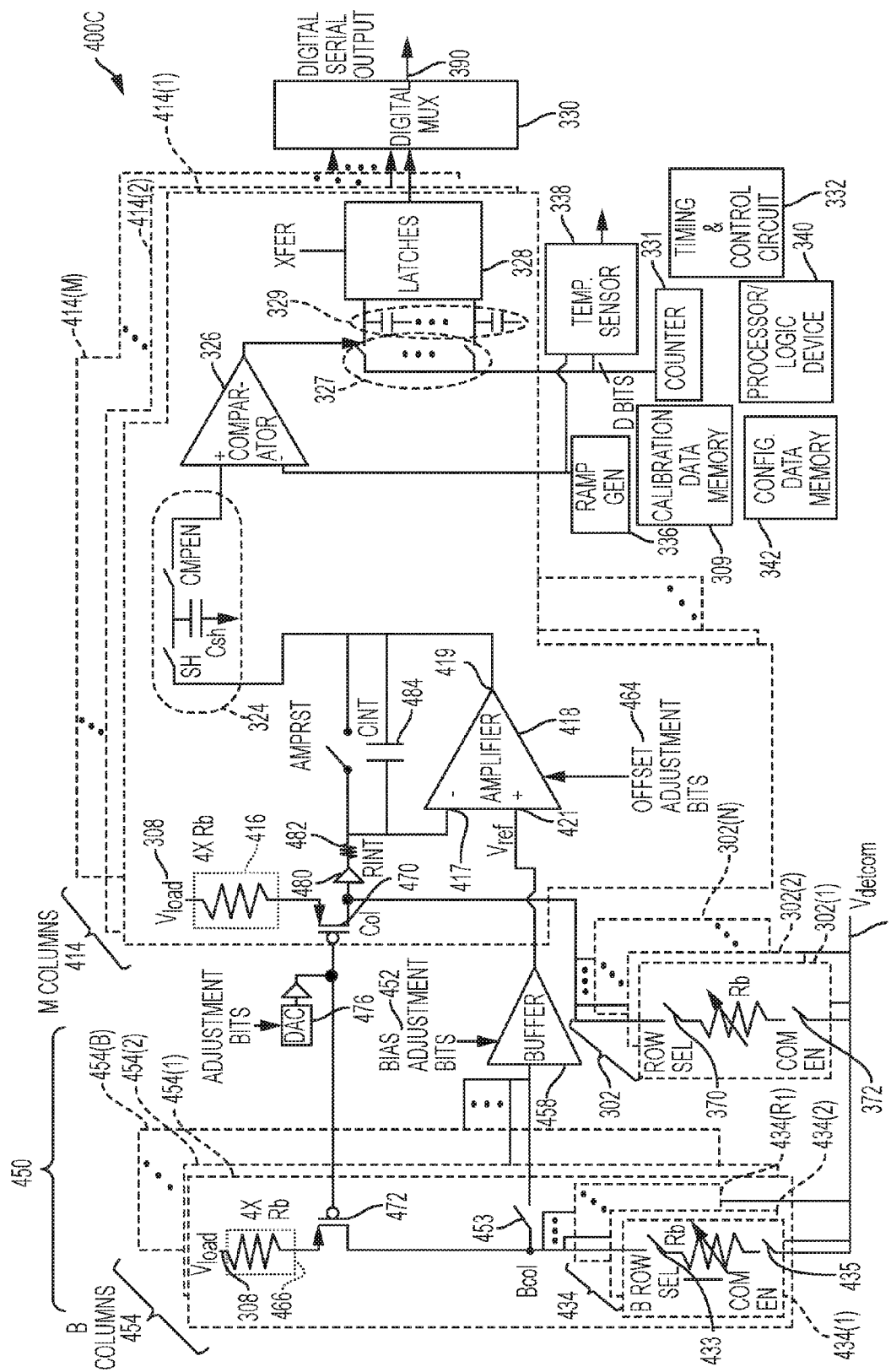
FIG. 4C illustrates a bolometer circuit to provide a desired level of bias to a plurality of bolometers and to compensate for bolometer self-heating in accordance with another embodiment of the disclosure.

FIG. 4C illustrates a bolometer circuit 400C having multiple columns and rows of active bolometers 302 (e.g., arranged in a FPA) in accordance with yet another embodiment of the disclosure. Bolometer circuit 400C is similar to bolometer circuit 400B, but has a reduced number of bolometer structures relative to bolometer circuit 400B by configuring amplifiers 418 as integrating amplifiers in place of the feedback amplifier configuration of bolometer circuit 400B. In particular, bolometer circuit 400C includes, for each column circuit block 414, a capacitor 484, which connects output 419 to input 417 of amplifier 418, and a buffer 480 and a resistor 482 (also labeled "Rint" in FIG. 4C) in series, which together couple a node (labeled "Col" in FIG. 4C) in the bolometer conduction path between MOSFET 470 and active bolometer 302 to input 417 of amplifier 418, so that the difference in current through resistor 482 is integrated onto capacitor 484. More specifically, based on the load current created with the combination of MOSFET 470 and thermally shorted resistor 416, a voltage is generated across the active bolometer 302 based on the nominal active bolometer resistance as well as external IR radiation incident on active bolometer 302 as discussed above. Similarly, blind bolometers 434 creates a reference voltage level on Bcol as a similar load current from MOSFET 472 and thermally shorted resistor 466 is passed through blind bolometers 434 as also discussed above. The voltage level set in response to the load current flowing through active bolometer 302 (which exhibits the resistance change due to the external IR radiation) is received by and passed through buffer 480 to one end of resistor 482, while the reference voltage level (e.g., at Bcol) from bias columns 434 is received by and passed through buffer 458 to input 421 and maintained at input 417 of amplifier 418, and hence at the other end of resistor 482, by the use of a virtual ground as discussed above. The difference in these two voltage levels placed across resistor 482 generate a current flow that is dependent on the external IR radiation incident on active bolometer 302, and that current flow is integrated by amplifier 418 and capacitor 484.

Thus, in embodiments of bolometer circuit 400C, capacitor 484 replaces thermally shorted bolometer 320 operating as a resistive gain in the feedback amplifier configuration of bolometer circuit 400B. This potentially increases yield, since bolometers, which are in general complex structures to fabricate on silicon, are removed. Furthermore, removal of thermally shorted bolometers 320 may facilitate optimization of the size and/or layout for bolometer circuit 400B on a silicon die for fabrication, since thermally shorted bolometers 320 for the feedback amplifier configuration generally take up a large part of a particular location of a die to fabricate.

In the illustrated embodiment, resistor 482 is provided and connected to input 417 of amplifier 418, thereby forming an RC integrator amplifier configuration to provide a desired gain, reduce noise bandwidth, and reduce the effects of pulse bias heating on the output signal. In the illustrated embodiment, buffer 480 is provided between resistor 482 (Rint) and the Col node in order to replicate the voltage on the Col node without corrupting the current through the bolometer conduction path. However, in other embodiments, buffer 480 and/or resistor 482 may be omitted to reduce the size of the die further. These additional components, namely buffer 480, and resistor 482, may introduce additional noise. However, as discussed above for bolometer circuit 400B and also applicable to bolometer circuit 400C, the noise reduction benefit from having a high resistance thermally shorted bolometer 416 and a high supply voltage may largely offset the additional noise by the additional components.

For example, calculations carried out by the inventors in connection with the present disclosure suggest only some insignificant increase in overall noise relative to bolometer circuit 400A of FIG. 4A. In another aspect, the additional areas taken up by MOSFET 478, buffer 480, resistor 482, and capacitor 484 may also be offset by the areas freed up and the layout flexibility gained by removing thermally shorted bolometers 320 of bolometer circuit 400A/400B. Therefore, any of the embodiments described with reference to FIGS. 4A-4C that meets the desired design goals, constraints, and tradeoffs may be utilized to provide a low cost, high performance bolometer circuit. Amplifier 418, capacitor 484, resistor 482, and/or buffer 480 may be referred to herein as belonging to an amplifier circuit for each column circuit block 414 of bolometer circuit 400C.

Figure 4D:
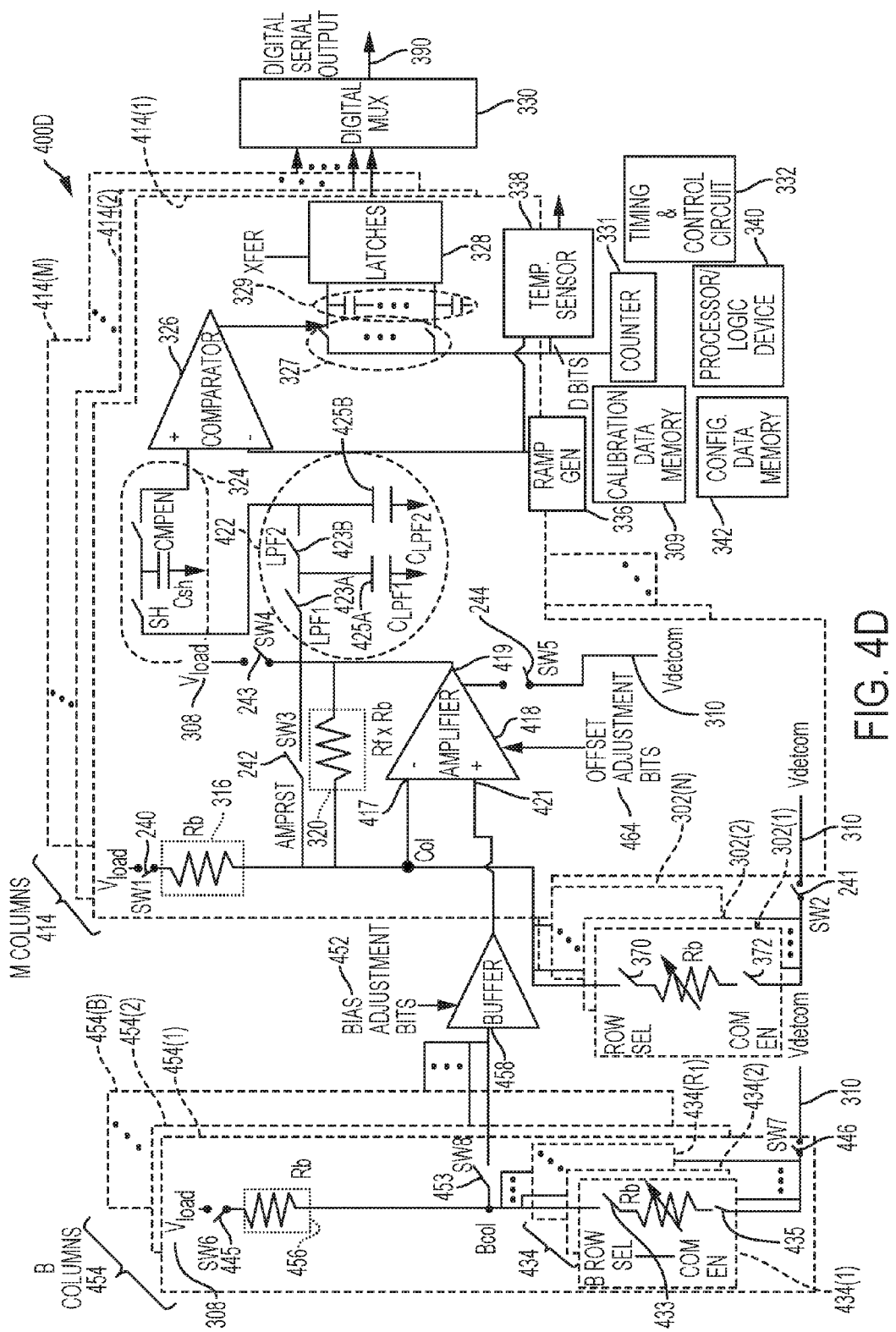
FIG. 4D illustrates a bolometer circuit comprising the bolometer circuit of FIG. 2B and enabling a low-power detection mode of operation using a plurality of bolometers in accordance with an embodiment of the disclosure.

FIG. 4D illustrates a bolometer circuit 400D comprising circuit 200B of FIG. 2B for multiple columns and rows of active bolometers 302 (e.g., arranged in a FPA) to enable a low-power detection mode of operation in accordance with an embodiment of the disclosure. As shown, in bolometer circuit 400D according to one or more embodiments, each column circuit block 414 (e.g., for each column of a bolometer FPA) includes switches 240-244 (SW1-SW5) discussed above for circuit 200B, which are associated with thermally shorted bolometer 316, amplifier 418, and active bolometers 302 for the column. Thus, in embodiments of bolometer circuit 400D, each column circuit block 414 can individually be operated in the low-power mode or the normal mode discussed above for circuit 200B.

In addition, in embodiments in which one or more bias columns 454 are provided to implement variable voltage source 250 to compensate for bolometer self-heating, each bias column 454 may individually be operated in the low-power mode or the normal mode. In this regard, each bias column 454 includes switches 445, 446, and 453 (also labeled "SW6" through "SW8" in FIG. 4D) associated with the reference conduction path. In the illustrated embodiment, switch 445 (SW6) is configured to selectively connect or disconnect thermally shorted bolometer 456 (which operates as a resistive load for the reference conduction path) to or from supply voltage node 308, while switch 446 (SW7) is configured to selectively connect or disconnect blind bolometer 434 to or from common voltage node 310. Thus, by selective opening and closing of switches 445 and 446, the reference conduction path (e.g., including thermally shorted bolometer 456 and blind bolometer 434) can be connected to or disconnected from power. As discussed above for FIG. 4A, switch 453 (also referred to as column switch 453) is configured to selectively connect or disconnect a corresponding bias column 454 to or from inputs 421 of amplifiers 418 (e.g., via buffer 458) in bolometer circuit 400D.

In one embodiment, each bias column 454 may be operated in a low-power mode by setting switches 445 and 446 (SW6 and SW7) in an open position to disconnect the bias column 454 (the reference conduction path) from power. In another embodiment, switch 453 (SW8) may be opened to disconnect the bias column 454 from inputs 421 of amplifiers 418 (e.g., via buffer 458) to operate in a low-power mode, in addition to disconnecting the bias column 454 from power by opening switches 445 and 446.

In various embodiments, timing and control circuit 332 and/or processor or other logic device 340 of bolometer circuit 400D may be configured to generate control signals to selectively open or close switches 240-244, 445, 446, and 453 to operate each column circuit block 414 and bias column 454 in a normal mode or a low-power mode. In one embodiment, timing and control circuit 332 and/or processor or other logic device 340 may be configured to operate a few selected columns (e.g., one or more selected column circuit blocks 414) of bolometer circuit 400D in a normal mode while operating the remainder of columns in a low-power mode to capture an infrared image frame. Similarly, in case one or more bias columns 454 are provided in bolometer circuit 400D, a few selected bias columns 454 may be operated in a normal mode while the remainder of bias columns 454 may be operated in a low-power mode to provide a reference voltage level. In one non-limiting example, only 10% of column circuit blocks 414 and bias columns 454 (e.g., 16 out of 160 columns in a FPA and 1 out of 10 bias columns) may be operated in a normal mode while the rest are operated in a low-power mode to save power.

Such a mode of operation may also be referred to herein as a low-power detection mode, which reduces the power consumed by bolometer circuit 400D but at the same time permits bolometer circuit 400D to be used to detect changes in the scene (e.g., changes in external infrared radiation from the scene) using those columns of bolometer circuit 400D that operate in a normal mode. For example, in one embodiment, timing and control circuit 332 and/or processor or other logic device 340 may be configured to "wake up" bolometer circuit 400D in response to detecting a change in the scene while in low-power detection mode, by switching from a low-power detection mode to a "normal imaging mode" that operates all columns of bolometer circuit 400D in a normal mode to capture full infrared image frames. Thus, bolometer circuit 400D may be operated in a low-power detection mode to save power while there is no activity of interest in the scene being imaged (e.g., no or little change in the infrared radiation emitted from the scene), but switched to a normal imaging mode to capture infrared image frames of the scene upon detection of an activity (e.g., changes in the infrared radiation emitted from the scene).

In some embodiments, when operating bolometer circuit 400D in a low-power detection mode to capture a series of infrared image frames, timing and control circuit 332 and/or processor or other logic device 340 may be configured to cycle through column circuit blocks 414 and bias columns 454 to select the few column circuit blocks 414 and bias columns 454 to operate in a normal mode. That is, those column circuit blocks 414 and bias columns 454 that operate in the normal mode are selected in a round-robin manner from all column circuit blocks 414 and bias columns 454 of bolometer circuit 400D as each IR image frame is captured. In a non-limiting example given for purposes of illustration, a bolometer circuit may have 160 active columns (e.g., column circuit blocks 414 with active bolometers 302) and 10 bias columns and use 10% of the active and bias columns in a low-power detection mode, where bias column 1 and active columns 1 through 16 (column numbers are given for purposes of identification only) may be operated in a normal mode in the first image frame captured, bias column 2 and active columns 17-32 in the second image frame, bias column 3 and active columns 33-48 and so on until the 11th image frame when the cycle restarts. Cycling through column circuit blocks 414 and bias columns 454 in such a manner may beneficially prevent a "burn-in effect" of having components of some column circuit blocks 414 (e.g., active bolometers 302 associated with each column circuit block 414) and bias columns 454 (e.g., blind bolometers 434 associated with each bias column 454) being used more than those of others, if bolometer circuit 400D is frequently or regularly operated in a low-power detection mode. This cycling through column circuit blocks 414 and bias column 454 in a round-robin manner also allows all bolometers to keep approximately the same temperature due to pulse-biased heating, so that when a switch from low-power mode to normal operation occurs, there is minimal time needed to get all bolometers in the array back to the same temperature to obtain a uniform image.

Therefore, embodiments of bolometer circuit 400D may be operated in a low-power detection mode to provide advantageous power saving while waking up to capture full infrared image frames when needed. Although bolometer circuit 400D is illustrated in FIG. 4D as having bolometer circuit 400A as the base architecture, it should be appreciated that the techniques and principles described in connection with embodiments of bolometer circuit 400D are also applicable to other bolometer circuits having an active bolometer, a resistive load, an amplifier, and/or other components generally found in bolometer circuits. For example, a bolometer circuit, which enables a low power mode and/or a low-power detection mode of operation according to the principles and techniques discussed for various embodiments of circuit 200B and bolometer circuit 400D, may be provided with respect to bolometer circuits 300, 400B, and 400C discussed above, bolometer circuits 500 and 800 discussed herein below, or any other suitable bolometer circuit. Furthermore, although a low-power detection mode is illustrated above as operating an entire column (e.g., including all active bolometers 302 in a column circuit block 302) in a low-power mode, it is also contemplated for other embodiments that a low-power detection mode may be operated in a per-pixel basis, where only one or more selected active bolometers 302 of a column are operated in a low-power mode instead of the entire column.

Other techniques to reduce the effects of active bolometer self-heating or pulse bias heating are also contemplated. For example, FIG. 5A illustrates a bolometer circuit 500 in which two adjacent rows of active bolometers may be enabled and similarly biased to generate an output signal with reduction in undesirable effects of self-heating, in accordance with an embodiment of the disclosure.

According to various embodiments, bolometer circuit 500 may comprise one or more column circuit blocks 514(1) through 514(M) each associated with a plurality of active bolometers 502. In FIG. 5A, only those active bolometers 502(1) through 502(N) associated with column circuit block 502(1) is shown for clarity, but it will be understood that other active bolometers 502 not shown in FIG. 5A may be provided and associated with other column circuit blocks 514(2)-514(M). For example, there may be provided M×N active bolometers 502 in bolometer circuit 500, with N rows of active bolometers 502 per each of M column circuit blocks 514, according to some embodiments.

Figure 5A:
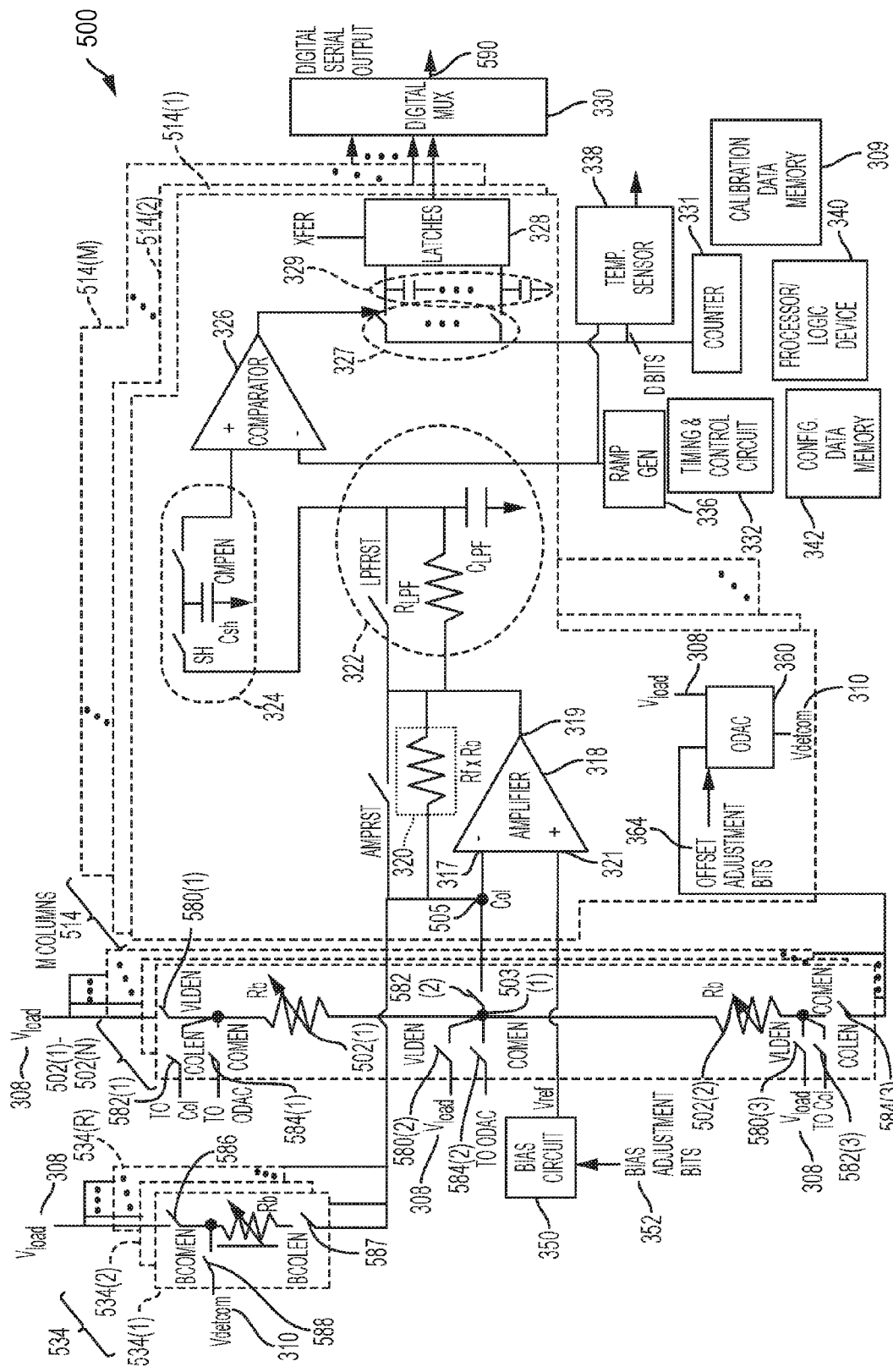
FIG. 5A illustrates a bolometer circuit to obtain difference images in accordance with an embodiment of the disclosure.

According to various embodiments, two adjacent ones of active bolometers 502 (e.g., active bolometers 502(1) and 502(2) and associated circuitry shown in detail in FIG. 5A) may be selectively connected and enabled such that the two adjacent active bolometers may form a circuit path coupled to supply voltage node 308 at one end and to ODAC 360 at the other end, while coupling a node between the two adjacent active bolometers (e.g., a node 503(1) identified in FIG. 5A between active bolometers 502(1) and 502(2)) to an input (e.g., inverting input 317) of amplifier 318. In this regard, a plurality of switches 580, 582, and 584 (e.g., switches 580(1)-580(3), 582(1)-582(3), and 584(1)-584(3) shown in detail in FIG. 5A) may be provided and selectively opened and closed according to control signals from timing and control circuit 332 as further described herein.

For example, when switch 580(1), 582(2), and 584(3) are closed with the remaining ones of switches 580, 582, and 584 open, active bolometer 502(1) may be coupled to supply voltage node 308 and active bolometer 502(2) may be coupled to ODAC 360 with node 503(1) coupled to inverting input 317 of amplifier 318 (e.g., via a node 505 designated "Col" in FIG. 5A to route a difference of pixel signals between active bolometers 502(1) and 502(2), as further discussed below). In a similar manner, pairs of active bolometers 502(3) and 502(4) through 502(N−1) and 502(N) may be selectively enabled and connected to column circuit block 502(1) according to specified timing by control signals from timing and control circuit 332. In some contexts, active bolometer coupled to supply voltage node 308 (e.g., as in active bolometer 502(1) in this example) may be referred to as a top detector of the pair, and active bolometer coupled to common voltage node 310 directly or via ODAC 360 (e.g., as in active bolometer 502(2) in this example) may be referred to as a bottom detector in the pair.

Thus, in various embodiments of bolometer circuit 500, a top detector (which is an active bolometer receiving incident IR radiation) of a selected pair of adjacent active bolometers 502 may take the place of thermally shorted bolometer 216 or 316 that operates as a non-active load (e.g., non-responsive to incident IR radiation) in bolometer circuit 200A-B, 300, or 400A-B. In other aspects, except for a lack of thermally shorted bolometer 316, each of the column circuit blocks 514(1)-514(M) may comprise similar components as column circuit blocks 314 or 414. Consequently, with appropriate biases applied across active bolometers 502(1) and 502(2), an amplified output voltage at output 319 of amplifier 318 for bolometer circuit 500 may correspond to a difference in the intensity of incident IR radiation (e.g., a difference in pixel signals) between the bottom detector (e.g., active bolometer 502(2)) and the top detector (e.g., active bolometer 502(1)) in a pair of adjacent active bolometers 502, rather than corresponding to some absolute level of incident IR radiation received at each active bolometer 202, 302, or 402 as provided by embodiments of bolometer circuit 200A-B, 300, or 400A-D. In this sense, bolometer circuit 500 may be referred to as implementing a differencing architecture or difference imaging architecture, whose output signals may represent images in a difference domain (e.g., where each pixel value represents a difference in incident IR radiation intensity between adjacent detectors) as opposed to a direct image domain (e.g., where each pixel value is indicative of the intensity of IR radiation received at each detector), for example.

Advantageously, using a pair of adjacent active bolometers 502 in an arrangement according to various embodiments of bolometer circuit 500 reduces the undesirable effects of self-heating or pulse bias heating on output signals, because both of the active bolometers in a selected pair (e.g., active bolometers 502(1) and 502(2)) exhibit similar self-heating or pulse bias heating such that the effects of self-heating of the pair are naturally canceled. Further, effects of ambient temperature variations are well compensated for in embodiments of bolometer circuit 500, because adjacent active bolometers 502 in a pair are typically in a close physical proximity to each other in an FPA and thus exposed to similar ambient temperature conditions. Yet another advantage is that adjacent ones of active bolometers 502 typically exhibit little variation in operating characteristics such as their resistance, TCR, heat capacity, and thermal conductivity, and thus require little or no adjustment to compensate for variations in bolometer operating characteristics, whereas such adjustments may be needed when separate thermally shorted bolometers 216 or 316 are used as a load.

Various embodiments of bolometer circuit 500 may therefore beneficially permit removal or reduction of various components and circuitry conventionally required to compensate for self-heating, bolometer variations, and/or ambient temperature variations, thereby allowing further reduction in complexity, size, and cost. Furthermore, because various embodiments of bolometer circuit 500 obtains a local difference, rather than a direct measurement, of IR radiation intensity, a high scene dynamic range can be achieved. In other words, a difference imaging architecture implemented according to one or more embodiments of bolometer circuit 500 may beneficially allow an image of a scene having a wider range of IR radiation intensity to be captured. In this regard, the intensities of incident IR radiation received at adjacent ones of active bolometers 502 are often similar (e.g., due to the diffraction limit of long wavelength IR radiation through optical elements and other factors that smear or blur incident IR radiation onto neighboring ones of active bolometers 502), which further facilitates capturing of high scene dynamic range by differencing architectures.

As further described herein below, images in a difference domain obtained with one or more embodiments of bolometer circuit 500 may be reconstructed into images in a direct image domain, if desired for particular applications of bolometer circuit 500. For example, if IR radiation from a scene captured by embodiments of bolometer circuit 500 is to be presented for viewing and easy understanding by a human user, difference images obtained using bolometer circuit 500 may be reconstructed (e.g., converted) into images (e.g., thermograms) in a direct image domain where each pixel value corresponds to IR radiation intensity received at each detector. On the other hand, for video/image analytics or other image processing applications, for example, difference images may be sufficient or even beneficial, and thus would not need to be reconstructed into direct images.

In this regard, for some embodiments, bolometer circuit 500 may include one or more reference rows for facilitating accurate and efficient reconstruction of difference images into direct images. For example, in one or more embodiments, bolometer circuit 500 may include one or more thermally shorted bolometers, blind bolometers, thermopiles, and/or other temperature sensing components to provide ambient temperatures or ambient IR intensity levels that can be used as reference points in reconstruction (e.g., conversion) of difference images into direct images.

In embodiments illustrated by FIG. 5A, one or more blind bolometers 534 may be provided for each column circuit block 502 (in FIG. 5A, only those blind bolometers 534(1) through 534(R) associated with one column circuit block 502(1), where R may represent the desired number of blind bolometer rows in bolometer circuit 500, are shown for clarity), and configured to be selectively enabled and connected via associated switches 586, 587, and 588 to input 317 of amplifier 318 and to one of active bolometers 502 associated with the each column circuit block 514. For example, blind bolometer 534(1) may be connected to supply voltage node 308 and to node 505 (labeled "Col" in FIG. 5A) by closing switches 586 and 587 (e.g., based on control signals from timing and control circuit 332) while active bolometer 502(1) may be connected to common voltage node 310 (via ODAC 360) and to node 505 (Col) by closing of switches 584(1) and 582(2). When selectively enabled and connected as in this example, a difference between a current flow through active bolometer 502(1) due to incident IR radiation and a current flow through blind bolometer 534(1) due to ambient temperature (since blind bolometers are shielded from incident IR radiation) may be amplified and converted into an output voltage level at output 319 of amplifier 318 according to the principles described above with respect to FIGS. 2 and 3, thereby providing an output signal indicative of incident IR radiation intensity received at active bolometer 502(1) over a reference level.

Figure 5D:
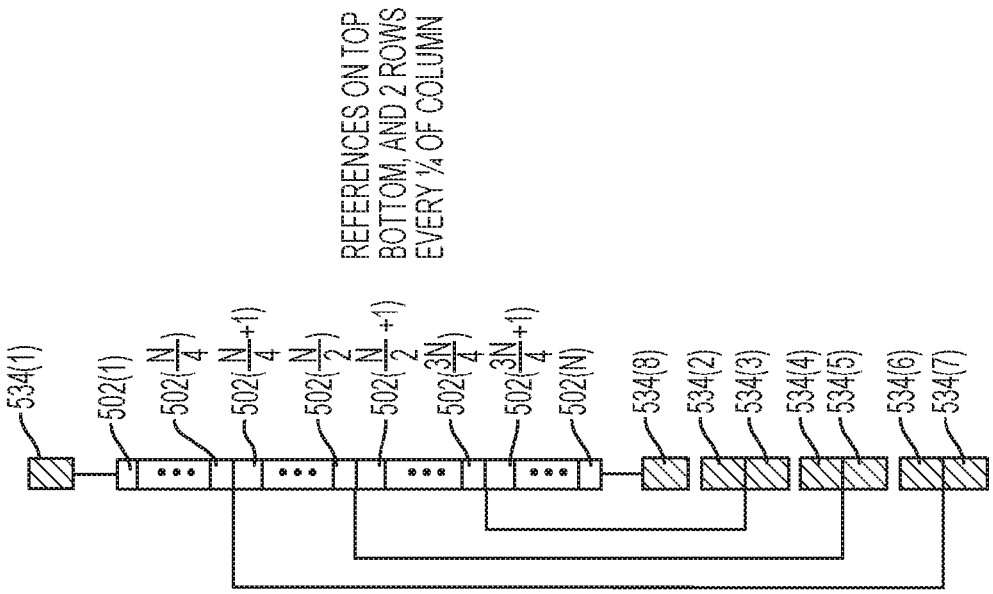
FIGS. 5B through 5D show block diagrams illustrating various blind bolometer arrangements for the bolometer circuit of FIG. 5A, in accordance with various embodiments of the disclosure.
Figure 5C:
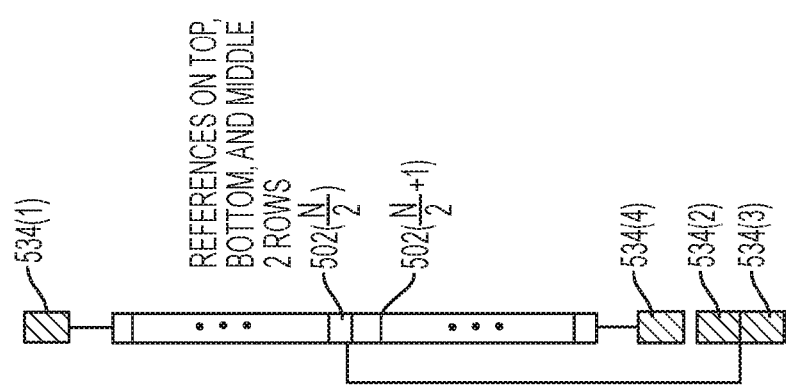
Figure 5B:
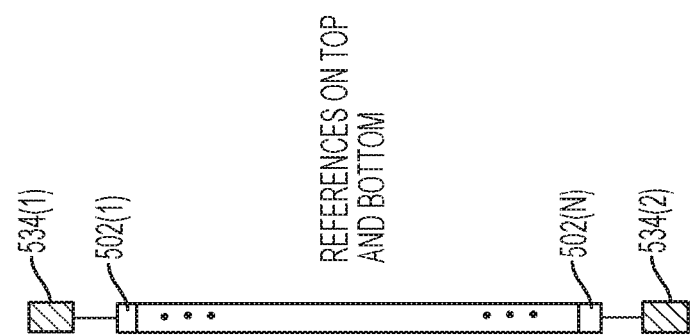

In a similar manner, blind bolometers 534 may be selectively enabled and connected as references for one or more other active bolometers 502, depending on embodiments. In one specific example according to one or more embodiments, there may be provided two blind bolometers 534 per column, one to provide a reference for an active bolometer on the top row (e.g., active bolometer 502(1)) and the other for an active bolometer on the bottom row (e.g., active bolometer 502(N)), as illustrated by FIG. 5B. In another specific example according to one or more embodiments, there may be provided four blind bolometers 534(1) through 534(4) per column, two for the top and bottom rows of active bolometers 502 as in the previous example and the other two for two middle rows of active bolometers 502, as illustrated by FIG. 5C. In another specific example according to one or more embodiments, there may be provided blind bolometers 534 for every two rows in the quartiles of all active bolometers 502 provided per column, in addition to the two for top and bottom rows of active bolometers 502, as illustrated by FIG. 5D. That is, if assuming the number of active bolometers 502 per column is 16 (e.g., N=16), there may be provided eight blind bolometers 534(1) through 534(8) respectively associated with active bolometers 502(1), 502(4), 502(5), 502(8), 502(9), 502(12), 502(13), and 502(16), for example.

Figure 6A:
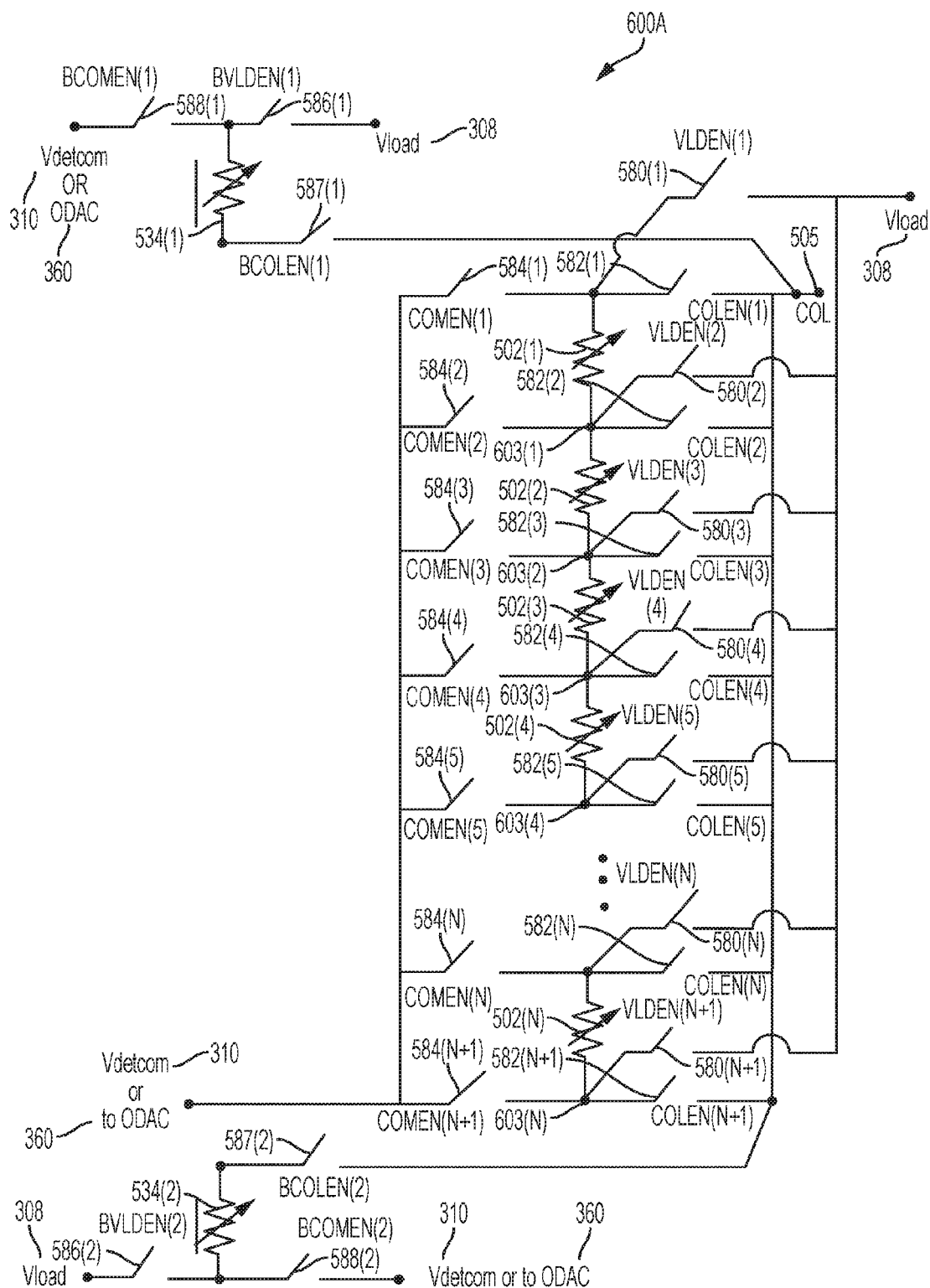
FIG. 6A illustrates a portion of a bolometer circuit to obtain difference images in accordance with an embodiment of the disclosure.

Further details of active bolometers 502, blind bolometers 534, and associated switching logic according to one or more embodiments of the disclosure are discussed with reference to FIGS. 6A and 7A-7D. FIG. 6A illustrates a circuit portion 600A, which may represents a portion of bolometer circuit 500, comprising rows of active bolometers 502, rows of blind bolometers 534, and accompanying sets of switches 580, 582, 584, 586, 587, and 588 that may be associated with any one of column circuit blocks 514, in accordance with an embodiment of the disclosure. FIGS. 7A-7D illustrate how difference image frames may be obtained with embodiments of bolometer circuit 500, in accordance with an embodiment of the disclosure.

As shown in FIG. 6A, portion 600A of bolometer circuit 500 may comprise a first set of switches 580(1) through 580(N+1), a second set of switches 582(1) through 582(N+1), and a third set of switches 584(1) through 584(N+1) for selectively enabling and connecting active bolometers 502(1) through 502(N) to obtain an output signal indicative of a difference in IR radiation intensity between to two adjacent (e.g., neighboring or adjoining) ones of active bolometers 502(1) through 502(N), according to one or more embodiments. The first set of switches 580 may be closed to connect a corresponding one of active bolometers 502 to supply voltage node 308. In this sense, the first set of switches 580 may also be referred to as "Vload Enable" switches (labeled in FIG. 6A as VLDEN(1) through VLDEN(N+1)). The second set of switches 582 may be closed to connect a corresponding one of active bolometers 502 to input 317 of amplifier 318 via node 505 (labeled as "Col" in FIGS. 5A and 6A) of column circuit block 514. In this sense, the second set of switches 582 may also be referred to as "Column Enable" switches (labeled in FIG. 6A as COLEN(1) through COLEN(N+1)). The third set of switches 584 may be closed to connect a corresponding one of active bolometers 502 to common voltage node 310, via ODAC 360 or not depending on embodiments. In this sense, the third set of switches 584 may also be referred to as "Common Enable" switches (labeled in FIG. 6A as COMEN(1) through COMEN(N+1)).

As discussed above with reference to FIG. 5A, switch 580(1) (or VLDEN(1)), switch 582(2) (or COLEN(2)), and switch 584(3) (or COMEN(3)) may be closed while the remaining ones of switches 580, 582, and 584 may be opened in response to control signals from timing and control circuit 332 to obtain a difference signal (e.g., an output signal indicative of the intensity of incident IR radiation received at active bolometer 502(2) over that received at active bolometer 502(1)). According to one or more embodiments, timing and control circuit 332 and/or processor or other logic device 340 of bolometer circuit 500 may be configured to generate control signals to repeat such selective enabling and connection for obtaining a difference signal for every even row in each column of active bolometers 502 in a sequential manner. In this way, a frame (e.g., an image frame having columns and rows) may be obtained which comprises difference signals (e.g., digital or analog signals or data values) indicative of incident IR radiation intensity levels at row i minus those at row i−1, where i=2, 4, 6, . . . , N. Such a frame may also be referred to herein as an "even-down" difference frame, since it contains signals indicative of incident IR radiation intensity at even numbered rows over the respective odd numbered rows that precede them.

Figure 7A:
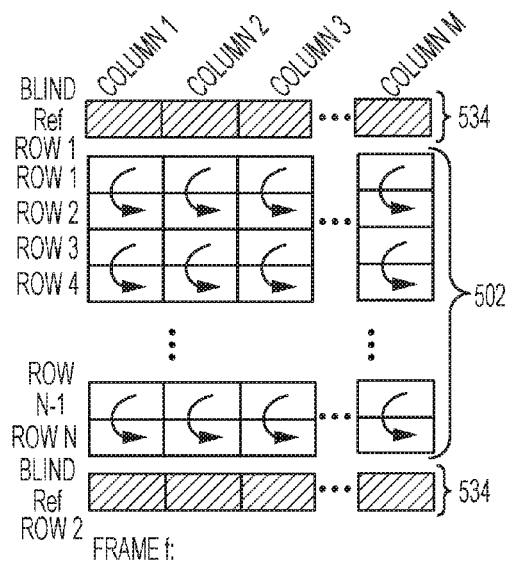
FIGS. 7A through 7D show block diagrams illustrating how various difference frames are captured using the bolometer circuit of FIG. 5A, in accordance with an embodiment of the disclosure.

An example of how such an even-down difference frame may be obtained (e.g., sampled and/or read out by embodiments of bolometer circuit 500) is illustrated in FIG. 7A, in accordance with an embodiment of the disclosure. In FIG. 7A, an array of active bolometers 502 and two rows of blind bolometers 534 are represented by blocks, while curved arrows indicate which rows of active bolometers 502 or blind bolometers 534 are being compared to generate difference signals and the direction (e.g., direction from the top detector to the bottom detector in a pair) of the comparison. Thus, as indicated in FIG. 7A, an even-down difference frame may be obtained by selectively enabling and connecting active bolometers 502 via sets of switches 580, 582, and 584 to generate difference rows comprising signals indicative of incident IR radiation intensity at each even row minus that at a corresponding odd row that precedes it.

In various embodiments, timing and control circuit 332 and/or processor or other logic device 340 of bolometer circuit 500 may be configured to generate further control signals for sets of switches 580, 582, and 584 to selectively enable and connect active bolometers 502 to obtain an odd-down difference frame which comprises difference signals indicative of incident IR radiation intensity at odd numbered rows over the respective even numbered rows that precede them. An example of how such an odd-down difference frame may be obtained is illustrated in FIG. 7B, in accordance with an embodiment of the disclosure.

Figure 7B:
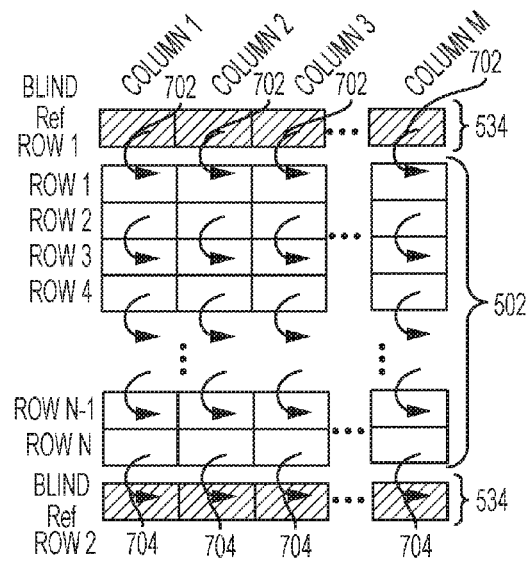

As illustrated in FIG. 7B, the first difference row in an odd-down difference frame may be obtained by selectively enabling and connecting a row of blind bolometers 534 (e.g., Blind Reference Row 1 in FIG. 7B) for comparison 702 with the first row (e.g., Row 1 in FIG. 7B) of active bolometers 502. As further discussed herein, the first difference row may thus comprise signals indicative of incident IR radiation intensity at the first row of active bolometers 502 in some absolute terms (e.g., over a reference temperature level provided by the row of blind bolometers 534), which may beneficially be used, for example, to accurately reconstruct difference image frames into direct images. In this sense, the first difference row, as well as other difference rows that may represent incident IR radiation intensity in absolute terms, may also be referred to as an absolute measurement row.

In some embodiments, an odd-down difference frame may include an extra difference row (e.g., as the last difference row) based on comparisons 704 between another row of blind bolometers 534 (e.g., Blind Reference Row 2 in FIG. 7B) and the last row (e.g., Row N in FIG. 7B) of active bolometers 502. The extra difference row may thus comprise signals indicative of incident IR radiation intensity at the last row of active bolometers 502 in absolute terms. As further discussed herein, signals in absolute terms provided by the extra difference row (or the extra absolute measurement row) may be used to estimate and/or reduce various types of noise in reconstructed direct images.

For the remaining rows i=3, 5, 7, . . . , N−1 of active bolometers 502, corresponding difference rows are obtained which comprise difference signals indicative of incident IR radiation intensity at row i minus that at row i−1. Thus, an odd-down difference frame and an even-down difference frame may together comprise difference rows obtained for all adjacent rows of active bolometers 502, with the first and the last difference rows being absolute measurement rows comprising signals measured in absolute terms. In this regard, in one or more embodiments, an odd-down difference frame may be obtained immediately following an even-down difference image, or vice versa, to capture difference signals between all adjacent rows of active bolometers 502 in an interlaced manner. In one aspect, such interlaced capturing may beneficially allow for better matching of self-heating between two adjacent rows of active bolometers 502. For example, adjacent rows of active bolometers 502, when they are to be selectively connected and biased to obtain odd-down (or even-down) difference signals, will have had similar time to cool down (e.g., only differing by one row-time) after having been biased and self-heated in a previous even-down (or odd-down) difference frame, and thus exhibit similar self-heating characteristics (e.g., starting temperatures and/or heat-up rate). In comparison, adjacent rows of active bolometers 502 will not have had similar time to cool down if difference signals for all adjacent rows were captured in one frame in a progressive manner.

In some embodiments, additional or alternative difference frames may be obtained in which comparisons between rows of active bolometers 502 are made in opposite directions to those made in even-down and odd-down difference frames. For example, an even-up and an odd-up difference frame may be obtained. According to one or more embodiments, an even-up difference frame may be obtained by selectively enabling and connecting active bolometers 502 via sets of switches 580, 582, and 584 to generate difference rows comprising signals indicative of incident IR radiation intensity at each even row minus that at a corresponding odd row that follows it. According to one or more embodiments, an odd-up difference frame may be obtained by selectively enabling and connecting active bolometers 502 via sets of switches 580, 582, and 584 to generate difference rows comprising signals indicative of incident IR radiation intensity at each odd row minus that at a corresponding even row that follows it.

Figure 7C:
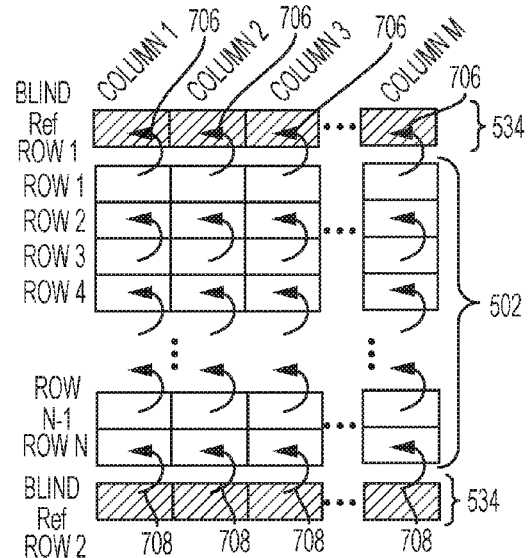

More specifically, as illustrated by the example of FIG. 7C, for rows i=2, 4, . . . , N−2 of active bolometers 502, corresponding difference rows in an even-up difference frame are obtained which comprise difference signals indicative of incident IR radiation intensity at row i minus that at row i+1. The first and the last difference rows in an even-up difference frame may be based on comparisons 706 and 708, respectively, with corresponding rows of blind bolometers 534, and thus is similar to the first and the last difference rows obtained in an odd-down difference frame as illustrated in FIG. 7B except that comparisons 706 and 708 are made in opposite directions to comparisons 702 and 704.

Figure 7D:
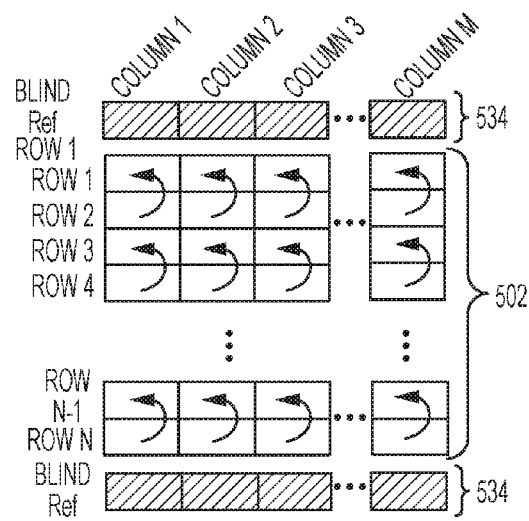

Also, as illustrated by the example of FIG. 7D, an odd-up difference frame may be obtained that comprises difference rows of signals indicative of incident IR radiation intensity levels at row i minus those at row i+1, where i=1, 3, 5, . . . , N−1. As further described herein, an even-up difference frame and an odd-up difference frame additionally obtained in some embodiments may be used together with an even-down difference and an odd-down difference images to identify and reduce certain types of noise, such as spatial column noise, in difference images and/or reconstructed direct images.

Table 1 summarizes an example switching sequence to obtain even-down, odd-down, even-up, and odd-up difference frames, in accordance with an embodiment of the disclosure. As discussed above, timing and control circuit 332 and/or processor or other logic device 340 of bolometer circuit 500 may be configured to generate control signals to selectively open or close switches 580, 582, 584, 586, 587, and 588 (e.g., also labeled as switches VLDEN, COLEN, COMEN, BVLDEN, BCOLEN, and BCOMEN in FIG. 6A) to generate difference signals in a sequential manner to obtain difference frames. It should be noted that the sequence of switching in the example is not limiting, and can be carried out in other appropriate sequences provided that appropriate switches are selectively closed and opened as indicated in Table 1 to obtain difference signals for each pair of adjacent active bolometer rows according to desired timing.

TABLE 1

| FRAME TYPE | SWITCHING SEQUENCE |
|---|---|
| Even-Down Difference Frame | For i = 2, 4, 6, . . . , N, close VLDEN(i−1), COLEN(i), COMEN(i+1) while opening remaining switches (other switches of VLDEN, COLEN, COMEN, BVLDEN, BCOLEN, BCOLEN). |
| Odd-Down Difference Frame | Close BVLDEN(1), BCOLEN(1), COLEN(1), COMEN(2) while opening remaining switches; For i = 3, 5, 7, . . . , N−1, close VLDEN(i−1), COLEN(i), COMEN(i+1) while opening remaining switches; and Close VLDEN(N), COLEN(N+1), BCOLEN(2), BCOMEN(2) while opening reaming switches. |
| Even-Up Difference Frame | Close VLDEN(2), COLEN(1), BCOLEN(1), BCOMEN(1) while opening remaining switches; For i = 2, 4, 6, . . . , N−2, close VLDEN(i+2), COLEN(i+1), COMEN(i) while opening remaining switches; and Close BVLDEN(2), BCOLEN(2), COLEN(N+1), COMEN(N) while opening reaming switches. |

TABLE 1-continued

| FRAME TYPE | SWITCHING SEQUENCE |
|---|---|
| Odd-Up Difference Frame | For i = 1, 3, 5, . . . , N−1, close VLDEN(i+2), COLEN(i+1), COMEN(i) while opening remaining switches. |

Therefore, in one or more embodiments, even-down, odd-down, even-up, and odd-up difference frames comprising difference signals for pairs of adjacent rows of active bolometers 502 may be obtained with bolometer circuit 500, in accordance with the switching techniques described above in connection with FIGS. 6A and 7A-7D and Table 1. The difference frames may be provided as digital output signal 590 containing difference values in digital form for all applicable difference rows (e.g., even or odd) for all columns in each difference frame, in a manner similar to converting and multiplexing digital output signal 390 described above for bolometer circuit 300.

It should be noted that not all four types of difference frames are needed for some embodiments. As discussed herein, an even-down difference frame and an odd-down difference frame together, or an even-up difference frame and an odd-up difference frame together, may capture a full set of difference rows in an interlaced manner, and thus may be sufficient in some embodiments to produce difference images and/or reconstructed direct images. Other embodiments may utilize three or four of the four types of difference images to identify and reduce certain types of noise, as discussed herein.

It should also be noted that while embodiments that obtain even and odd difference rows in an interlaced manner are illustrated by FIGS. 6A and 7A-7D, the principles of the switching techniques discussed above may be applied to obtain progressive difference frames that comprise within each frame all difference rows for all pairs of adjacent active bolometer rows. For example, a down-progressive difference frame, and additionally or alternatively an up-progressive difference frame, may be obtained using embodiments of bolometer circuit 500 having switching circuitry illustrated by circuit portion 600A. It should furthermore be noted that the four types of difference frames may be obtained in any desired order and not limited to the order indicated in FIGS. 7A-7D.

As discussed above in connection with FIGS. 5A-5D, bolometer circuit 500 for some embodiments may comprise more than or less than two rows of blind bolometers 534 for reference rows. For such embodiments, the switching sequence and the corresponding difference frames may be modified appropriately in accordance with the principles of the switching techniques disclose herein to compare the more or less than two blind bolometer rows with respective corresponding active bolometer rows (e.g., middle two rows of active bolometers or quartile rows of active bolometers for some embodiments) to obtain difference frames. Moreover, although in FIG. 6A the example switching circuitry is illustrated as having shared contacts 603(1)-603(N) between adjacent active bolometers 502, the principles of the switching techniques described above may be modified (e.g., by repeating appropriate switches, nodes, and/or circuit paths) for other embodiments that do not have shared contacts between adjacent bolometers (e.g., where active bolometers 502 may have isolated contacts).

Figure 6B:
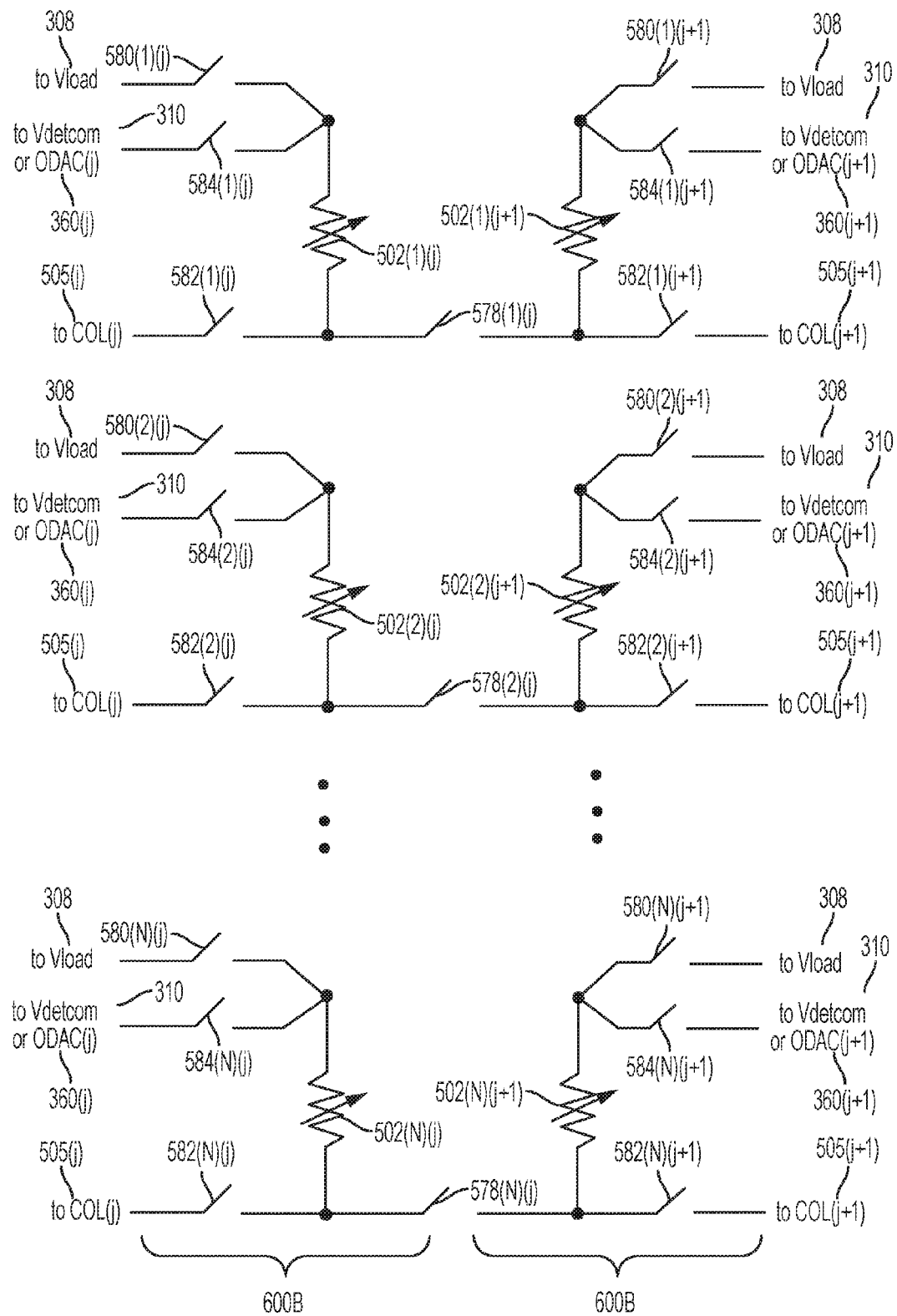
FIG. 6B illustrates a portion of a bolometer circuit to obtain difference signals between adjacent columns in accordance with an embodiment of the disclosure.

It is contemplated difference signals between adjacent columns of active bolometers 502 (also referred herein as column difference signals), in addition to or in place of difference signals between adjacent rows, may be captured for some embodiments. For example, a set of switches may be provided for bolometer circuit 500 to selectively connect active bolometers 502 of adjacent columns for obtaining differences in incident IR radiation between adjacent columns of active bolometers 502. FIG. 6B illustrates switching circuitry associated with two adjacent columns of active bolometers 502 of bolometer circuit 500, in accordance with an embodiment of the disclosure. In FIG. 6B, circuit portions 600B each represent at least a portion of active bolometers 502 and switching circuitry that may be associated with one column circuit block 514 of bolometer circuit 500. In that respect, circuit portion 600B is similar to circuit 600A of FIG. 6A, but adjacent rows of active bolometers 502 in circuit portion 600B do not have shared contacts as do active bolometers 502 illustrated in circuit portion 600A.

FIG. 6B shows two such circuit portions 600B for two adjacent columns j and j+1 (i.e., any two neighboring columns) of active bolometers 502 of bolometer circuit 500, with a set of switches 578 (individually identified as switches 578(1)(j) through 578(N)(j), where N may represent the desired number of rows in the unit cell array of bolometer circuit 500) configured to selectively connect corresponding pairs of active bolometers 502 in adjacent columns j and j+1, in accordance with an embodiment of the disclosure. Active bolometers 502 and switches 580, 582, 584 are also individually identified in FIG. 6B as active bolometers 502(1)(j) through 502(N)(j) and switches 580(1)(j) through 580(N)(j), 582(1)(j) through 582(N)(j), 584(1)(j) through 584(N)(j) for column j, and active bolometers 502(1)(j+1) through 502(N)(j+1) and switches 580(1)(j+1) through 580(N)(j+1), 582(1)(j+1) through 582(N)(j+1), 584(1)(j+1) through 584(N)(j+1) for column j+1, but blind bolometers 534 and conduction paths to ODAC 360 and nodes 308, 310, 505 are not repeated from FIG. 6A to avoid clutter.

In embodiments having switches 578 configured to selectively connect active bolometers 502 of adjacent columns, timing and control circuit 332 and/or other logic device/circuitry may be configured to generate control signals to selectively open or close appropriate ones of switches 578, 580, 582, and 584 to obtain a difference signal indicative of a difference in the intensity of incident IR radiation received at active bolometers 502 of adjacent columns (e.g., between active bolometer 502(i)(j) and 502(i)(j+1)). In one example sequence of such control signals, switches 578(1)(j), 580(1)(j), 584(1)(j+1), and either switch 582(1)(j) or 582(1)(j+1) may be closed while remaining ones of switches 578, 580, 582, and 584 may be opened to obtain a difference signal indicative of the intensity of incident IR radiation received at active bolometer 502(1)(j+1) over that received at active bolometer 502(1)(j).

Continuing in a similar manner for this example, switches 578(i)(j), 580(i)(j), 584(i)(j+1), and either switch 582(i)(j) or 582(i)(j+1) may be selectively closed while remaining switches are selectively opened to obtain a difference signal of active bolometer 502(i)(j+1) over active bolometer 502(i)(j), where i=2, 3, . . . , N. Similar to even-down and odd-down difference frames, column difference signals between columns j and j+1 may be obtained for j=1, 3, 5, . . . , M−1 (or for j=1, 3, 5, . . . , M−2 if M is an odd number) in parallel row-by-row in one frame, and for j=2, 4, 6, . . . , M (or for j=2, 4, 6, . . . , M−1 if M is an odd number) in a following frame, where M may represent the desired number of columns in the unit cell array of bolometer circuit 500, for example.

As may be appreciated, in embodiments where column difference signals, but not row difference signals, are to be obtained, bolometer circuit 500 may comprise fewer column circuit blocks 514 than there are columns (e.g., one column circuit block 514 for every two columns may be sufficient). It is also contemplated that blind reference columns may be provided in a similar manner as blind reference rows illustrated in FIGS. 7A-7D but modified for column-to-column comparison. For embodiments having blind reference columns, the switching sequence to obtain column difference signals may be modified to obtain one or more absolute measurement columns, in accordance with the techniques discussed above in connection with FIGS. 6A-6B and 7A-7D. Further, in some embodiments, difference signals between columns may be obtained in an opposite direction (e.g., where active bolometers 502(i)(j+1) in column j+1 are top detectors provided with the supply voltage). For example, switches 578(i)(j), 580(i)(j+1), 584(i)(j), and either switch 582 (i)(j) or 582(i)(j+1) may be selectively closed while remaining switches are selectively opened to obtain a difference signal of active bolometer 502(i)(j) over active bolometer 502(i)(j+1), where i=1, 2, . . . , N.

It should be appreciated that switches 578 and the switching sequences discussed above in connection with FIG. 6B are mere examples for one or more embodiments to illustrate the principles of techniques to obtain column difference signals between two adjacent columns in accordance with the present disclosure, and that various modifications are possible and within the scope and spirit of the disclosure. For example, additional switches may be provided (e.g., by repeating one or more sets of switches at other nodes for simplification of timing and control, for improved routing and signal quality, due to specific bolometer FPA fabrication requirements, or otherwise as desired for particular implementations) and/or switching sequences may comprise different orders or combinations (e.g., to selectively close two or more switches instead of one from a set while opening the remaining switches from the set due to additional/repeated switches), without departing from the scope of the disclosure. In another example, instead directly connecting active bolometers 502(i)(j) and 502(i)(j+1) in adjacent columns j and j+1 when closed as shown in FIG. 6B, switches 578 may be configured to selectively connect active bolometer 502 (i)(j) in one column j to node 505(j+1) (node Col(j+1)) of the other column j+1 of the adjacent columns, or vice versa, thereby indirectly connecting active bolometers 502(i)(j) and 502(i)(j+1) in the adjacent columns when closed. As further discussed herein below, column difference signals obtained between two adjacent columns of active bolometers 502 may facilitate reduction of noise in images reconstructed from difference frames.

Figure 8:
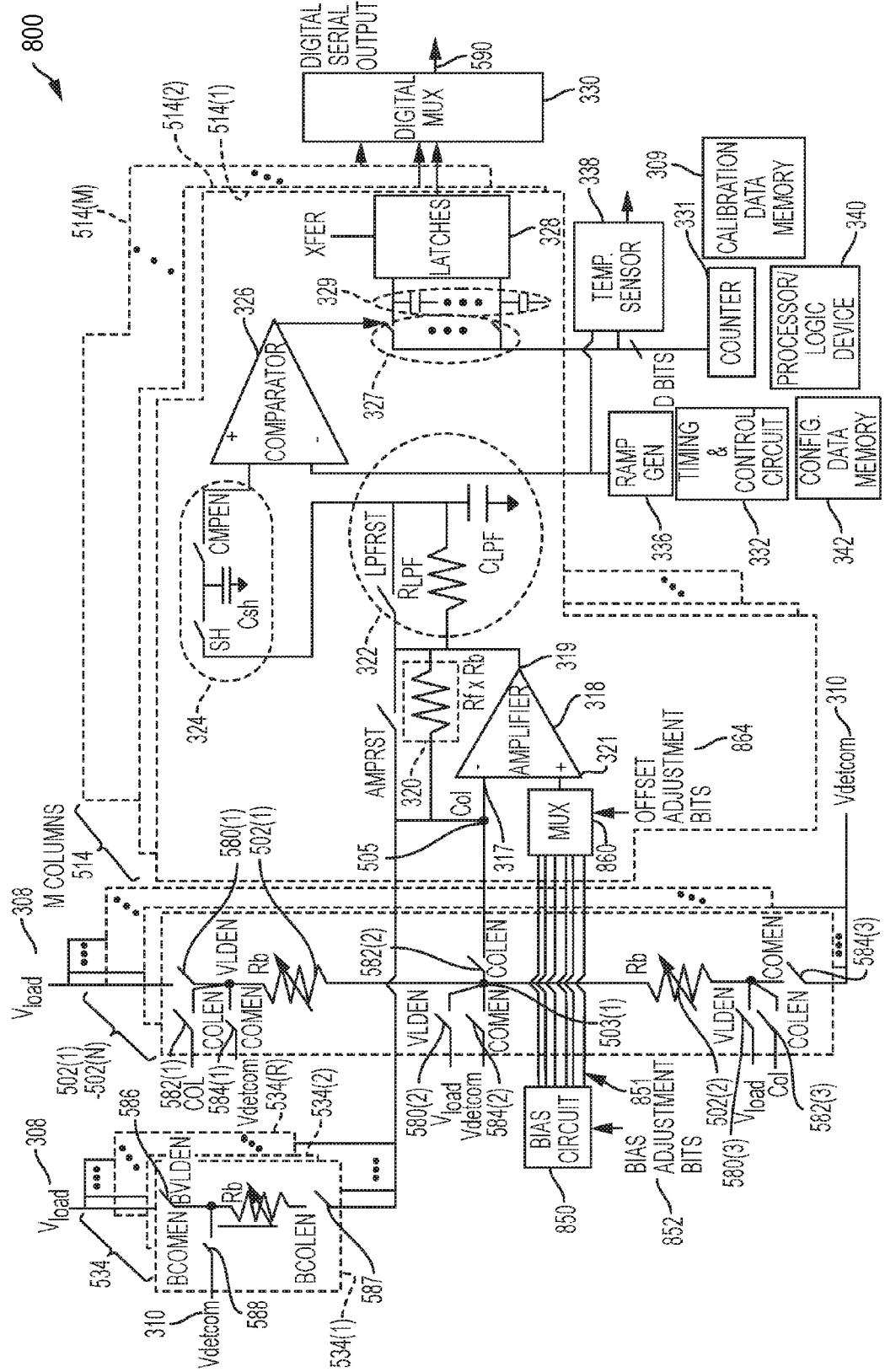
FIG. 8 illustrates a bolometer circuit to obtain difference images in accordance with another embodiment of the disclosure.

FIG. 8 illustrates a bolometer circuit 800 implementing a differencing architecture, in accordance with another embodiment of the disclosure. As illustrated in FIG. 8, offset adjustment circuitry 260 of circuit 200A may be implemented with a multiplexer 860 together with a bias circuit 850 configured to provide a desired range of reference voltage levels over a plurality of connections 851 in response to bias adjustment bits 852, in place of ODAC 360 implementing offset adjustment circuitry 260 and CMOS bias circuit 350 implementing variable voltage source 250 for bolometer circuits 300 and 500. Bolometer circuit 800 may otherwise be similar to bolometer circuit 500.

According to various embodiments, multiplexer 860 (e.g., implemented with a transmission gate multiplexer in one embodiment) may be configured to pass a voltage level provided at a selected one of the plurality of connections 851 to input 321 of amplifier 318 in response to offset adjustment bits 864. For example, bias circuit 850 may be set by bias adjustment bits 852 to provide voltage levels between $V_{ref}$-0.2 volt and $V_{ref}$+0.2 volt in 0.05 volt increments on corresponding connections 851, while multiplexer 860 may selectively pass one of the voltage levels (e.g., $V_{ref}$+0.15 volt) based on offset adjustment bits 864. In this way, bias adjustment bits 852 may be used to provide a coarse global bias adjustment by setting a plurality of reference voltage levels via connections 851, one of which may be selected using offset adjustment bits 864 to provide a fine adjustment to biases across active bolometer 502 on a per pixel pair or per column basis.

Furthermore, as discussed above in connection with offset adjustment circuitry 260, because multiplexer 860 is outside of the conduction path of active bolometers 502 and thus does not have to operate under large current variations, offset adjustment provided by multiplexer 860 may be more stable and accurate over temperature and a larger portion of the supply voltage may be available for biasing active bolometers 502 than implementations using DACs (e.g., ODAC 360) in the conduction path of active bolometers 502 to provide offset adjustment. It should be noted that bias circuit 850 and multiplexer 860 are illustrated for bolometer circuit 800 as an example, and that other bolometer circuits (e.g., bolometer circuit 300 or 400A-D) disclosed herein may also utilize bias circuit 850 and multiplexer 860 to implement variable voltage source 250 and offset adjustment circuitry 260 in place of CMOS bias circuit 350, ODAC 360, and/or offset-adjustable amplifier 418. While embodiments having bias circuit 350/850, amplifier 318, and other associated components configured to set and maintain biases for active bolometers 502 are shown above to illustrate the principles of the differencing architecture of the present disclosure, it should also be noted that other embodiments are also contemplated that implement the principles of the differencing architecture with bolometer circuits having other bias control mechanisms and/or other amplifier configurations (e.g., an integrating amplifier).

Figure 9:
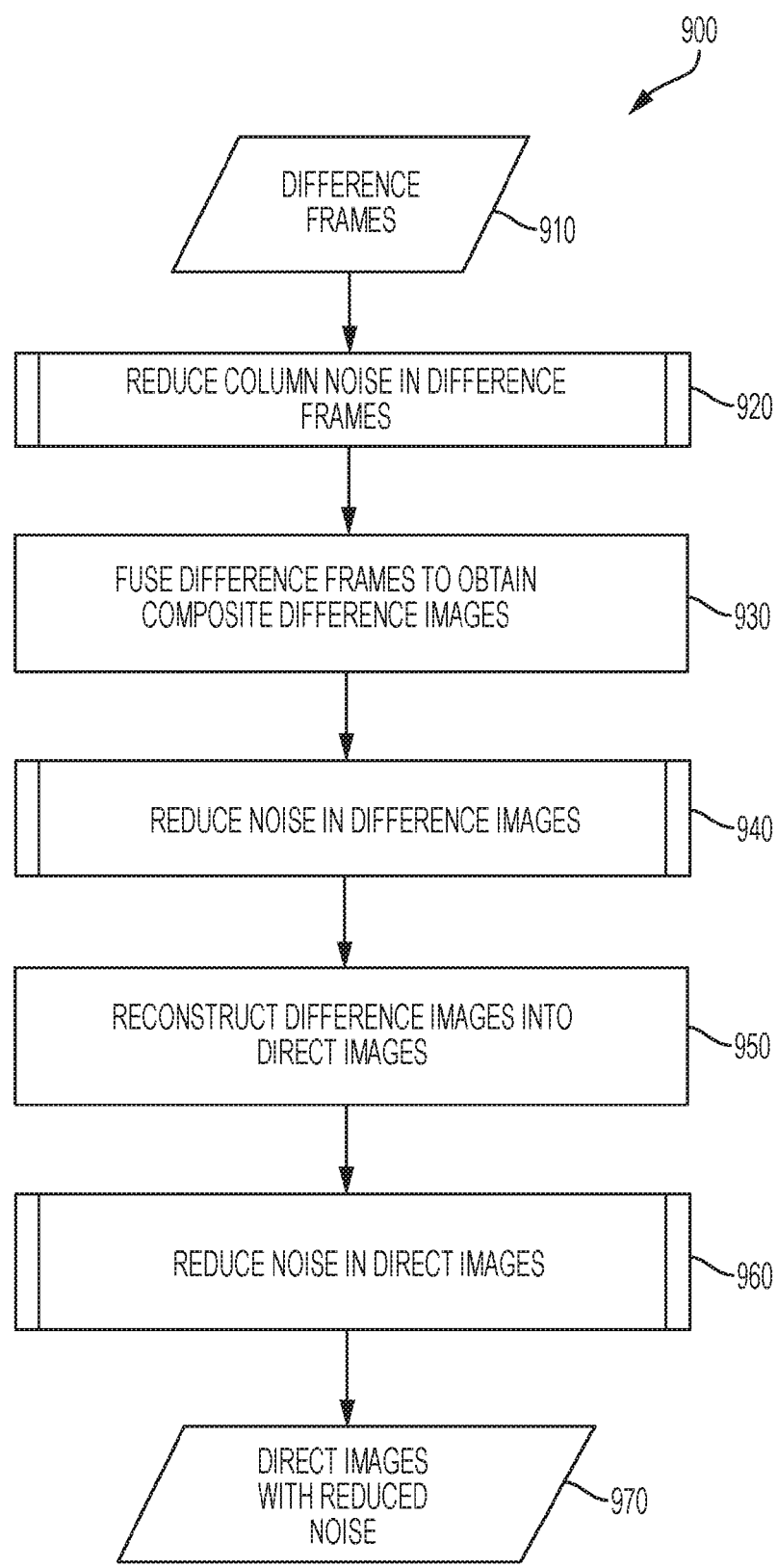
FIG. 9 illustrates a flowchart of a process to generate direct images from difference frames captured by the bolometer circuit of FIG. 5A or FIG. 8, in accordance with an embodiment of the disclosure.

Turning now to FIG. 9, a process 900 is illustrated for processing difference frames in accordance with an embodiment of the disclosure. For example, embodiments of process 900 may be performed on difference frames 910 captured using various embodiments of bolometer circuit 500 or 800 described above to generate images (e.g., reconstructed from difference frames) in a direct image domain where each pixel of the images contain data indicative of the intensity of IR radiation received at each detector. In some embodiments, process 900 may also reduce various types of noise that may be present in difference frames and/or reconstructed direct images.

Depending on embodiments, process 900 may be performed on difference frames 920 that include an even-down difference frame and an odd-down difference frame consecutively obtained in an interlaced manner, an even-up difference frame and an odd-up difference frame consecutively obtained in an interlaced manner, or three or four of all four types of difference frames consecutively obtained with bolometer circuit 500 or 800. As discussed above, in one or more embodiments, difference frames 910 may be provided in a digital format representing difference values digitally for all corresponding difference rows (e.g., even or odd) for all columns in each difference frame.

In some embodiments, various operations to reduce column noise in difference frames 910 may be performed at block 920. In this regard, the inventors of the present disclosure have recognized, through various experiments performed in connection with the disclosure, that noise in difference frames exhibits similar properties as those exhibited by noise in direct images captured by non-differencing bolometer circuits (e.g., bolometer circuits 300 or 400A-D), but that additional types of noise may be introduced or otherwise present after difference frames are reconstructed into direct images. Thus, the inventors have devised certain noise reduction operations that may be performed in a difference domain prior to reconstruction into direct images, as well as certain other noise reduction operations that may be performed in a direct domain after reconstruction to reduce additional types of noise introduced or otherwise present in reconstructed direct images.

Figure 10:
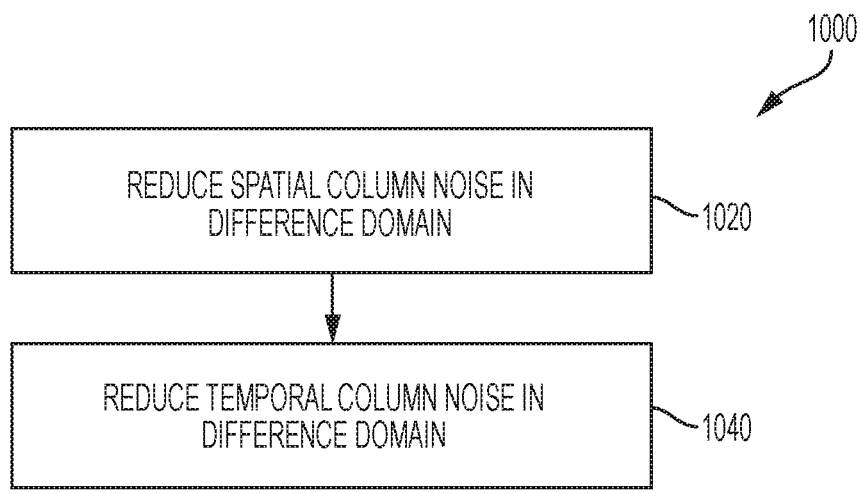
FIG. 10 illustrates a flowchart of a noise reduction process that may be performed on difference frames, in accordance with an embodiment of the disclosure.

Further in this regard, the inventors have recognized, through various experiments, that column noise in difference frames may be at least partly uncorrelated among different types of difference frames 910. Thus, at block 920, column noise reduction may be performed separately for each type of difference frame so as to avoid blending of any uncorrelated column noise among different types of difference frames 910. An example column noise reduction process 1000 that may be performed at block 920 is illustrated according to an embodiment of the disclosure, with reference also to FIG. 10.

As understood in the art, column noise is a type of noise that may be explained by variations in per-column circuitry and manifest as vertical stripes (e.g., effecting an entire column) in images. Further, some portion of column noise may be spatial (e.g., not substantially varying over time) or 1/f (e.g., slowly varying over time) noise, while other portion of column noise may be temporal noise. Column noise reduction process 1000 according to various embodiments may handle spatial and 1/f noise separately from temporal noise.

Thus, at block 1020, spatial and 1/f column noise may be reduced in each type of difference frame. For example, if difference frames 910 include four types (e.g., even-down, odd-down, even-up, and odd-up) of difference frames, operations to reduce spatial column noise may be performed separately on the four types of difference frames so that each of the four types may have a respective corresponding spatial column noise correction terms associated with it. In various embodiments, spatial column noise may be estimated and appropriate correction terms may be obtained using appropriate spatial column noise reduction techniques. For example, in one or more embodiments, spatial column noise may be estimated and reduced in difference frames according to the techniques disclosed in U.S. Pat. No. 8,208,026 entitled "Systems and Methods for Processing Infrared Images" and U.S. patent application Ser. No. 14/029,716 entitled "Row and Column Noise Reduction in Thermal Images," which are incorporated herein by reference.

At block 1040, temporal column noise may be reduced for each type of difference frame. In some embodiments, temporal column noise in each type of difference frame may be estimated by comparing temporal changes in a particular column with temporal changes in neighboring columns. Temporal changes may be measured by determining changes in signal level between a current and a previous difference frame of same type in a sequence of difference frames 910. In some specific examples, temporal changes in a particular column may be compared with temporal changes in two (one on each side) or four (two on each side) neighboring columns.

In this regard, the inventors of the present disclosure have observed that temporal changes in difference frames due to an actual scene highly likely affects neighboring columns (e.g., temporal changes are correlated among neighboring columns). Thus, in one or more embodiments, temporal changes in an average signal level of a column is estimated as temporal column noise (e.g., not due to temporal changes in the actual scene) if it is uncorrelated with those of neighboring columns. In one or more embodiments, temporal column noise estimated for a particular column in such a way may be reduced by applying an infinite impulse response ("IIR") filter having a damping factor that is inversely proportional to the degree of correlation with neighboring columns in terms of temporal changes. In other embodiments, other appropriate filters may be used that have their filtering strengths adjusted in response to the degree of correlation with neighboring columns in terms of temporal changes.

Thus, by performing process 1000 according to one or more embodiments at block 920, spatial, 1/f, and/or temporal noise may be estimated and reduced in difference frames 910. It should be noted that operations of process 1000 may be performed in any desired order. That is, temporal column noise may be reduced before spatial column noise, or vice versa, depending on embodiments.

Returning to process 900, at block 930, the even and the odd difference frames may be fused or combined into a difference image having difference rows for all pairs of adjacent active bolometer rows. As discussed above in connection with FIGS. 6A and 7A-7D, an even-down difference frame and an odd-down difference frame, or an even-up difference frame and an odd-up difference frame, may each capture even difference rows and odd difference rows, respectively, consecutively in an interlaced manner. Thus, for embodiments in which two types of difference frames (e.g., an even-down difference frame and an odd-down difference frame together, or an even-up difference frame and an odd-up difference frame together) are captured, the even and the odd difference frames may be combined or fused by taking even difference rows from an even difference frame and taking odd difference rows from an odd difference frame.

For embodiments in which three or four types of difference frames are captured, difference rows in the combined or fused (e.g., composite) difference images may be obtained by averaging or accumulating corresponding difference rows from different types of difference frames. For example, even difference rows from an even-down difference frame may be averaged or accumulated with corresponding even difference rows from a corresponding even-up difference image frame, and/or odd difference rows from an odd-down difference frame may be averaged or accumulated with corresponding odd difference rows from a corresponding odd-up difference image frame. Similarly, for embodiments in which progressive difference frames are captured by bolometer circuit 500 or 800, corresponding difference rows may be averaged or accumulated.

In some embodiments, different types of consecutively captured difference frames 910 may be aligned or registered prior to combining or fusing, depending on the amount of motion between 910 different frames and/or the thermal time constant (e.g., an inherent response time) of active bolometers 502. For example, if there is too much motion between consecutive difference frames 910 and/or if active bolometer 502 is fast to respond to scene changes, consecutive difference frames 910 may be aligned or registered according to conventional image registration techniques, so that difference frames 910 may be more accurately fused or combined with a consistent field-of-view.

Figure 11:
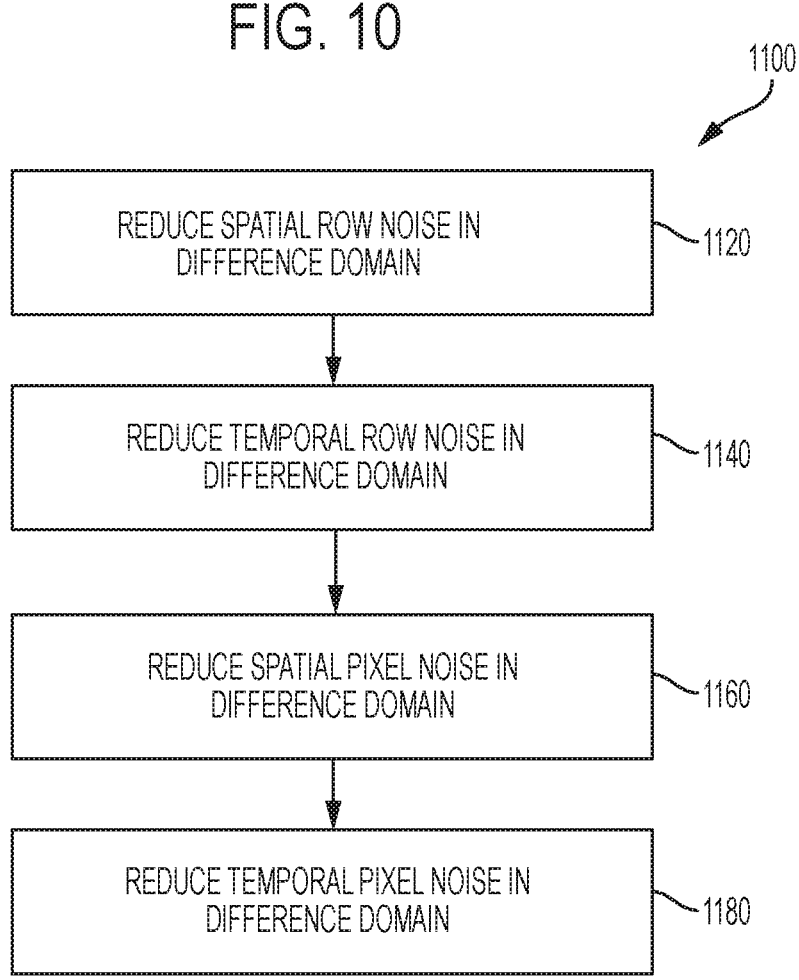
FIG. 11 illustrates a flowchart of a noise reduction process that may be performed on composite difference images, in accordance with an embodiment of the disclosure.

Thus, after block 930, difference frames 910 are fused or combined into composite difference images that comprise all difference rows (e.g., both even and odd rows) for all pairs of adjacent active bolometer rows. In some embodiments, at block 940, further noise reduction operations may be performed on such composite difference images in a difference domain. An example noise reduction process 1100 that may be performed at block 940 is illustrated according to an embodiment of the disclosure, with reference also to FIG. 11.

At block 1120, spatial and 1/f row noise may be reduced in such composite difference images. As understood in the art, row noise is a type of noise that may be explained by variations in per-row circuitry and manifest as horizontal stripes (e.g., effecting an entire row) in images, and may include spatial, 1/f, and/or temporal components. Row noise may be handled in composite difference images, rather than separately on each type of difference frame, since all difference signals in each difference row are effectively affected by same noise for the row. In various embodiments, spatial row noise may be estimated and appropriate correction terms may be obtained using appropriate spatial row noise reduction techniques. For example, in one or more embodiments, spatial row column noise may be estimated and reduced in composite difference images according to the techniques disclosed in U.S. Pat. No. 8,208,026 and U.S. patent application Ser. No. 14/029,716 previously reference herein.

At block 1140, temporal row noise may be reduced in the composite difference images. Temporal row noise may be estimated and filtered by comparing temporal changes in each row with those of its neighbors, in a manner similar to estimating filtering temporal column noise discussed above, but appropriately modified to handle rows rather than columns.

At block 1160, spatial per-pixel noise may be reduced in the composite difference images. As understood in the art, per-pixel noise may comprise spatially correlated or structured noise (also referred to as fixed-pattern noise) due to variations in active bolometers 502, optical elements, mechanical elements, or other variations that affect response characteristics of each active bolometer 502. In various embodiments, such spatial per-pixel noise may be estimated and appropriate correction terms may be obtained using appropriate spatial column noise reduction techniques. For example, in one or more embodiments, spatial column noise may be estimated and reduced in difference frames according to the techniques disclosed in U.S. Pat. No. 8,208,026 entitled "Systems and Methods for Processing Infrared Images" and U.S. patent application Ser. No. 14/029,716 entitled "Row and Column Noise Reduction in Thermal Images," which are incorporated herein by reference.

Per-pixel noise may also comprise spatially uncorrelated temporal noise that randomly occurs in images (e.g., as white noise). Thus, at block 1180, temporal per-pixel noise may be estimated and reduced using appropriate temporal per-pixel noise (or random noise) reduction techniques. For example, in one or more embodiments, temporal per-pixel noise may be reduced by applying the techniques disclosed in U.S. patent application Ser. No. 13/943,035 entitled "Methods and Systems for Suppressing Noise in Images," which is incorporated herein by reference. It should be noted that operations of process 1100 may be performed in any desired order. That is, temporal noise may be reduced before spatial noise, and/or per-pixel noise may be reduced before row noise, depending on embodiments.

Returning to process 900, after optionally reducing various types of noise in a difference domain at blocks 920 and/or 940, composite difference images may be reconstructed into images in a direct image domain at block 950. As discussed above, in direct images, each pixel value may be indicative of the intensity of IR radiation received at each detector, rather than a difference of intensity levels between adjacent rows. Thus, for example, direct images can be presented (e.g., on a display) as user-viewable thermal images (e.g., thermograms) for viewing and easy understanding by a human user, with or without further processing. For applications such as video/image analytics or other image processing applications where viewing by a human user's is not needed, process 900 may end prior to block 950.

In various embodiments, difference images may be reconstructed into direct images by integrating all difference rows from top to bottom, or alternatively from bottom to top. In one or more embodiments, integrating all difference rows from top to bottom, or vice versa, may involve obtaining a cumulative sum of the difference rows from top to bottom or from bottom to top. For embodiments in which the first and/or the last difference rows may be absolute measurement rows comprising signals measured in absolute terms (e.g., via comparison with a reference provided by blind bolometer 534 as discussed above with respect to FIGS. 5A-5D, 6A, and 7A-7D), storing a cumulative sum as each new row in a reconstructed image from the top or from the bottom difference row produces a direct image where all pixels are indicative of incident IR intensity relative to a reference provided by a corresponding row of blind bolometers 534.

In other embodiments without absolute measurement rows, reconstructing direct images from difference images may involve statistical methods to correct column offsets. For example, in one embodiment, a mean value of offsets in a reconstructed image may be calculated, and the offset of each column of the reconstructed image may be corrected based on the mean offset value to approximate a direct image. In another embodiment, vertical gradients of columns (e.g., in a difference image or reconstructed image) may be obtained and compared between neighboring columns to correct column offsets. More specifically, rows that exhibit similar vertical gradients in the neighboring columns likely correspond to a same scene feature (e.g., road, sky, building, or other substantially uniform features in a scene captured by active bolometers), and therefore the neighboring columns may be normalized to approximate true signal levels by adjusting the column offsets of the neighboring columns such that column to column differences are minimized for such rows corresponding to a same scene feature. In this sense, the adjustment of column offsets according to such an embodiment may be viewed as maximizing smoothness between neighboring columns for areas with similar gradients. In embodiments where column difference signals can be obtained as discussed above in connection with FIG. 6B, pixel or column offsets between neighboring columns in a reconstructed image (whether absolute measurement rows were used or not) may be normalized or otherwise adjusted based on the actual measured differences in incident IR radiation intensity between the neighboring columns as represented by the column difference signals for more accurate reconstruction.

Figure 12:
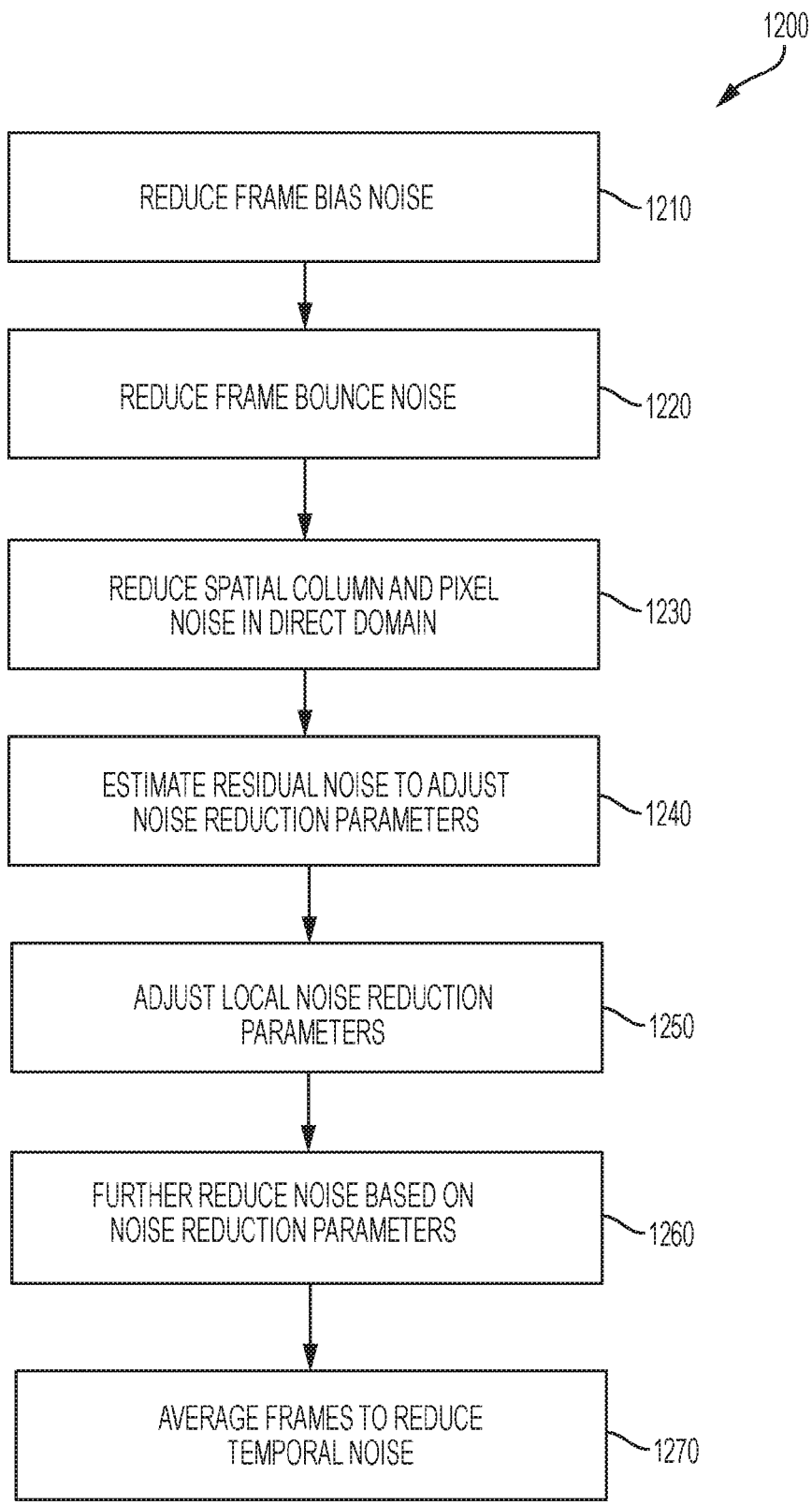
FIG. 12 illustrates a flowchart of a noise reduction process that may be performed on reconstructed direct images, in accordance with an embodiment of the disclosure.

In some embodiments, after reconstruction of difference images into direct images, various operations to reduce one or more types of noise introduced or otherwise present in the direct images may be reduced at block 960. FIG. 12 illustrates a noise reduction process 1200 that may be performed on the reconstructed direct images at block 960 to reduce one or more types of noise, in accordance with an embodiment of the disclosure.

At block 1210, frame bias noise may be estimated and reduced in direct images reconstructed from difference images. Conventionally, frame bias noise is exhibited as a fixed offset that is uniform or substantially uniform over an entire image plane (e.g., over an entire frame of image) due to characteristics of a bolometer circuit. Such a uniform offset may be ignored in difference images or in directed images that are captured directly with a bolometer circuit without differencing, since it simply shifts an entire image plane (e.g., increases or decreases signal levels of an entire image) by some uniform amount. However, for direct images that are reconstructed from difference images, such a uniform offset in difference images may result in tilting of the reconstructed direct images (e.g., signals gradually increasing or decreasing from top to bottom rows) because of the integration or cumulative summation of difference rows in the reconstruction of the direct images.

In various embodiments, frame bias noise in direct images reconstructed from difference images may be estimated by comparing an extra absolute measurement row (e.g., an absolute measurement row that is not a starting row in the reconstruction) of the difference images with a corresponding end row of the direct images. Since the end row of a reconstructed direct image should comprise substantially same signals (e.g., same data values) as the extra absolute measurement row without frame bias noise, an average difference of the signals between the end row of the reconstructed direct image and the extra absolute measurement row over all columns may be used as an estimate of a frame tilt for the current direct image. According to one or more embodiments, the average differences between the end row of the reconstructed direct image and the extra absolute measurement row may be obtained and further averaged for multiple direct images to provide an estimate of a fixed (e.g., static or slowly varying) tilt, in other words, frame bias noise, in direct images.

In some embodiments, frame bias noise may be reduced in reconstructed direct images by subtracting a per-pixel contribution of the estimated frame bias noise (e.g., obtained by dividing the estimated frame bias noise by the number of rows per column) from all pixels of the difference images. In other embodiments, frame bias noise may be reduced in reconstructed direct images by subtracting a vertical ramp that is based on the estimated frame tilt from the reconstructed direct images. For example, the vertical ramp may be based on a time averaged mean of the estimated frame tilt to generate varying signal levels depending on the row position.

Depending on embodiments, frame bias noise may be reduced in the direct images that are used to estimate the frame bias noise, subsequently obtained direct images, or both. For example, the estimated frame bias noise may be stored in memory and applied to reduce frame bias noise in subsequently obtained reconstructed direct image, according to some embodiments.

At block 1220, frame bounce noise may be estimated and reduced in direct images reconstructed from difference images, in some embodiments. Frame bounce noise is a time-varying offset (if in difference images) or tilt (if in reconstructed direct images) that may vary from image to image (e.g., image frame to image frame), whereas frame bias noise is static or slowly varying offset or tilt as discussed above. Thus, in one or more embodiments, frame bounce noise may be obtained as a per-frame residual frame tilt in each of the multiple direct images after estimating and subtracting frame bias noise from the multiple direct images. The per-frame residual frame tilt may then be removed in a difference domain (e.g., by subtracting a per-pixel offset) or in a direct image domain (e.g., by subtracting a vertical ramp) to reduce frame bounce noise for each corresponding direct image, in a similar fashion as reducing frame bias noise discussed above for block 1210.

At block 1230, spatial column and pixel noise (fixed pattern noise) may be estimated and reduced in in direct images reconstructed from difference images, according to one or more embodiments. As discussed above with processes 1000 and 1100, spatial column and pixel noise may be reduced in a difference domain prior to reconstruction. However, there may be some residual spatial column and pixel noise (residual fixed pattern noise) in difference images, which in the corresponding reconstructed direct images may be exhibited as erroneous column tilts.

Thus, in one or more embodiments, such erroneous tilts due to residual spatial (or fixed pattern) noise may be identified by comparing one or more extra absolute measurement rows for each column with corresponding one or more reconstructed (e.g., integrated or cumulatively summed) rows of the each column. An erroneous tilt of the column may be detected if the one or more extra absolute measurement rows differ from the corresponding one or more reconstructed rows, and residual spatial (or fixed pattern) noise may be detected if the difference averaged over multiple images is substantially non-zero (e.g., larger than a specified threshold), according to one or more embodiments. If residual spatial (or fixed pattern) noise is detected in this way, it may be reduced by adjusting each column in difference images or by subtracting an appropriate vertical ramp from each column in reconstructed direct images.

At block 1240, residual noise in direct images may be estimated to adjust various noise reduction parameters, according to one or more embodiments. Residual noise may be estimated from direct images with or without one or more of the noise reduction operations discussed above for blocks 1210-1230 applied thereto, depending on embodiments. In various embodiments, residual noise may be estimated by comparing the signals (e.g., data values) at one or more extra absolute measurement rows of difference images with the signals at corresponding one or more rows of corresponding reconstructed direct images. For example, in one embodiment, differences between one or more extra absolute measurement rows and corresponding reconstructed rows may be determined for all columns, and the standard deviation of such differences may be used as a metric for the amount of residual noise still present.

In one or more embodiments, the standard deviation of the differences or other metric determined based on the comparison with the one or more extra absolute measurement rows may be used to adjust noise reduction parameters. For example, if the standard deviation is large or other metrics indicate that a large amount of residual noise is still present, various parameters for one or more of the further noise reduction operations on reconstructed direct images discussed below for blocks 1260 and 1270, and/or various parameters for one or more of the noise reduction operations in a difference domain discussed above for processes 1000 and 1100, may be adjusted (e.g., by increasing filter strengths) so that more aggressive noise reduction may be applied to difference frames, difference images, and/or reconstructed direct images.

At block 1250, noise reduction parameters may be adjusted for one or more portions (e.g., local areas) of reconstructed direct images, according to one or more embodiments. In this regard, the inventors of the present disclosure have observed, through various experiments conducted in connection with the disclosure, that some local areas (e.g., middle rows of reconstructed direct images when absolute measurement rows corresponding to top and bottom rows are provided) of reconstructed direct images exhibit more noise than other areas. Thus, in one or more embodiments, such noisy local areas may be identified and noise reduction parameters for the identified local areas may be further tuned to reduce noise.

For example, in one embodiment, local smoothness (e.g., variation in signal levels for a local area) may be determined and compared between difference images and corresponding reconstructed direct images. If an area in a difference domain is smooth (e.g., small variations in sampled differences) but the corresponding area in a direct image domain is not smooth, it may be determined that the specific area needs further filtering, and more aggressive filtering may be applied to the specific area in reconstructed direct images by adjusting noise reduction parameters.

At block 1260, further noise reduction operations may be performed on direct images reconstructed from difference images, according to one or more embodiments. For example, various spatial and temporal, column/row and per-pixel noise reduction techniques previously referenced herein in connection with processes 1000 and 1100 may be appropriately modified and performed on reconstructed direct images. As discussed above, the various noise reduction operations may be tuned for more effective noise reduction by applying the noise reduction parameters as adjusted through operations of blocks 1240 and 1250.

At block 1270, multiple reconstructed direct images may be combined using an IIR or finite impulse response ("FIR") filter to further reduce temporal noise in reconstructed direct images. Filter strengths and other parameters for the IIR or FIR filter may be based on the parameters adjusted through operations of blocks 1240 and/or 1250.

Returning to FIG. 9, after performing noise reduction on and using reconstructed direct images at block 960 according to example noise reduction process 1200 of FIG. 12, reconstructed direct images 970 may be provided with noise therein further reduced. Therefore, according to embodiments of the disclosure discussed above with reference to FIGS. 5A-5D, 6A-6B, 7A-7D, and 8-12, difference images may be obtained using bolometer circuit 500 or 800 with various beneficial features, and reconstructed into direct images having various types of noise effectively removed therefrom. More specifically, for example, bolometer circuit 500 or 800 advantageously provides high scene dynamics while reducing the ill effects of self-heating and variations in component characteristics without the added complexity, size, and cost of conventional bolometer circuits as discussed above, while processes 900 through 1200 advantageously utilizes absolute measuring rows to accurately reconstruct difference images into direct images, to effectively reduce various types of noise (e.g., frame bias noise, frame bounce noise, and residual fixed pattern noise), and to adjust various noise reduction parameters. Furthermore, processes 900 through 1200 advantageously identify and apply noise reduction operations that are effective for difference frames, difference images, and reconstructed direct images, respectively.

Figure 13:
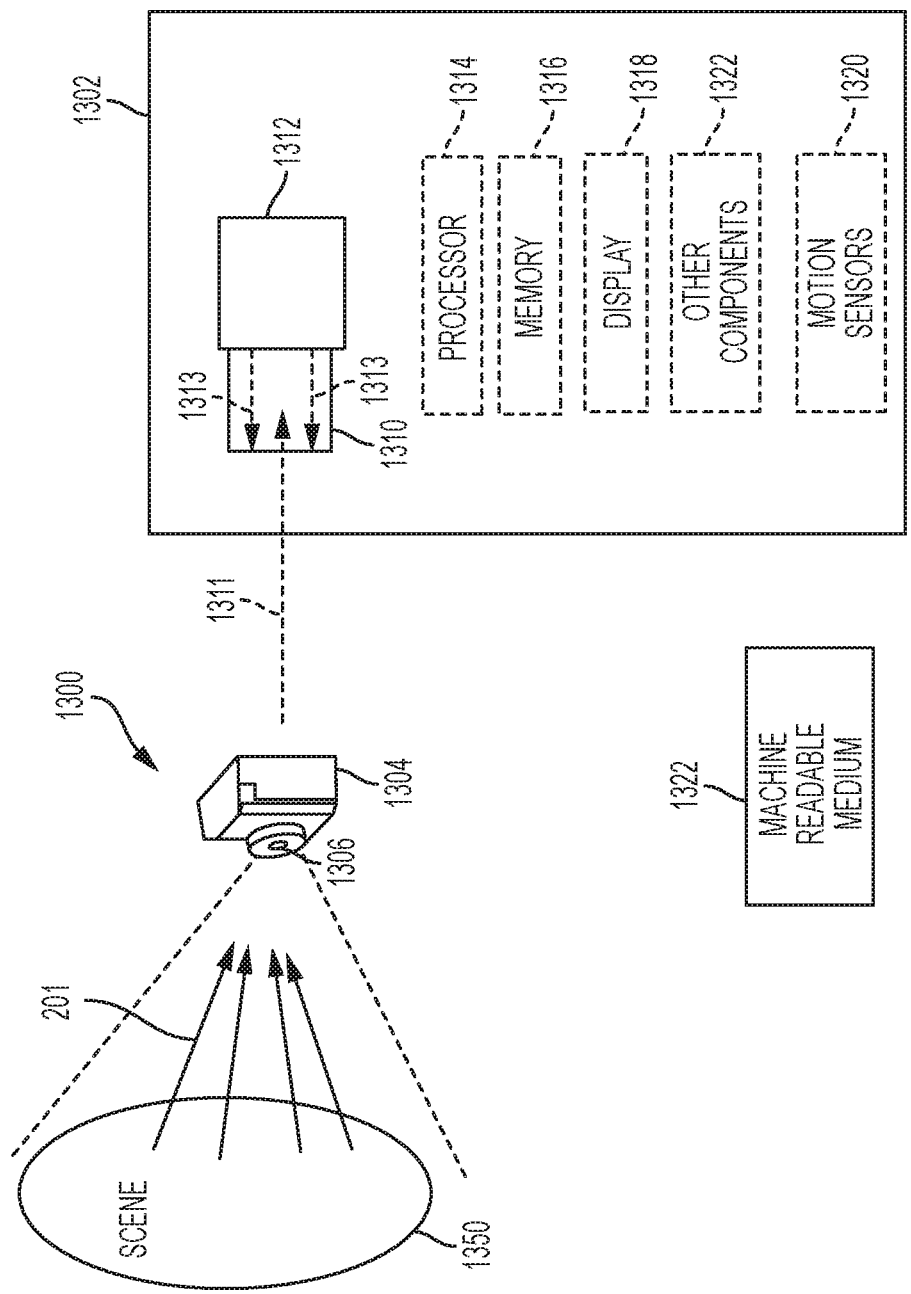
FIG. 13 illustrates a thermal imaging module configured to be implemented in a host device in accordance with an embodiment of the disclosure.

Turning to FIG. 13, a thermal imaging module 1300 that may comprise embodiments of bolometer circuit 300, 400A-D, 500, or 800 is illustrated in accordance with an embodiment of the disclosure. Also illustrated in FIG. 13 is a host device 1302 in which thermal imaging module 1300 may be configured to be implemented, in accordance with an embodiment of the disclosure.

Thermal imaging module 1300 may be implemented, for one or more embodiments, with a small form factor and in accordance with wafer level packaging techniques or other packaging techniques. In this regard, thermal image module 1300 may comprise a housing 1304 that encloses bolometer circuit 300, 400A-D, 500, or 800 and other components for generating (e.g., capturing) thermal image data representing incident IR radiation 201 from a scene 1350, according to one or more embodiments. Further in this regard, thermal image module 1300 may comprise an optical element 1306 such as an IR-transmissive lens configured to transmit and focus incident IR radiation 201 on a FPA of bolometer circuit 300, 400A-D, 500, or 800. In some embodiments, these and other aspects of thermal imaging module 1300 may be implemented according to various techniques for providing small form factor infrared imaging module disclosed for example in U.S. patent application Ser. No. 14/101,258 entitled "Infrared Camera System Architectures," which is incorporated herein by reference in its entirety.

In one embodiment, host device 1302 may be a small portable device, such as a mobile telephone, a tablet computing device, a laptop computing device, a personal digital assistant, a visible light camera, a music player, or any other appropriate portable device. In this regard, thermal imaging module 130 may be used to provide thermal imaging features to host device 1302. For example, thermal imaging module 1300 may be configured to capture, process, and/or otherwise manage thermal images and provide such thermal images to host device 1302 for use in any desired fashion (e.g., for further processing, to store in memory, to display, to use by various applications running on host device 1302, to export to other devices, or other uses).

In other embodiments, host device 1302 may be other types of electronic devices configured to receive thermal imaging module 1300 and to utilize thermal images provided by thermal imaging module 1300 for particular applications. For example, host device 1302 may represent a fixedly or adjustably mounted (e.g., to provide pan-tilt-zoom features) surveillance camera, vehicle electronics (e.g., in sensor systems for automobiles, aircrafts, and water vessels), or other non-portable electronic devices. In another example, host device 1302 may include a device attachment configured to receive thermal imaging module 1300 to provide thermal imaging capabilities, and implemented according to various techniques disclosed in International Patent Application No. PCT/US2013/062433 entitled "Device Attachment with Infrared Imaging Sensor," which is incorporated herein by reference in its entirety.

In various embodiments, host device 1302 may include a socket 1310, a shutter 1312, a processor 1314, a memory 1316, a display 1318, motions sensors 1320 and/or other components 1322. Socket 1310 may be configured to receive thermal imaging module 1300 as identified by arrow 1311, and shutter 1312 may be selectively positioned over socket 1310 (e.g., as identified by arrows 1313) while thermal imaging module 1300 is installed therein.

Processor 1314 may be implemented as any appropriate processing device (e.g., logic device, microcontroller, processor, application specific integrated circuit (ASIC), or other device) that may be used by host device 1302 to execute appropriate instructions, such as software instructions provided in memory 1316 (e.g., transferred or downloaded from a machine readable medium 1322 storing non-transitory software instructions). As discussed above, in some embodiments, processor 1314 may be configured to perform at least part of the various operations of processes 900 through 1200, which may be encoded as software instruction provided in memory 1316. For example, depending on embodiments, processor 1314 may be configured perform at least part of processes 900 through 1200 independent of or in conjunction with processor or logic device 340 of bolometer circuit 500 or 800.

Motion sensors 1320 may be implemented by one or more accelerometers, gyroscopes, or other appropriate devices that may be used to detect movement of host device 1302. Motion sensors 1320 may be monitored by and provide information to processor 1314 or processor/logic device 340 to detect motion.

Display 1318 may be used to display captured and/or processed thermal images and/or other images, data, and information. Motion sensors 1320 may be implemented by one or more accelerometers, gyroscopes, or other appropriate devices that may be used to detect movement of host device 1302. Motion sensors 1320 may be monitored by and provide information to processor 1314 or processor/logic device 340 to detect motion. Other components 1322 may be used to implement any features of host device 1302 as may be desired for various applications (e.g., a visible light camera or other components).

Therefore, bolometer circuit 300, 400A-D, 500, or 800 that advantageously permits low cost, small footprint, and high performance thermal imaging as discussed above may be provided in a small form factor thermal imaging module 1300 and integrated into various types of host devices 1302 for thermal imaging applications.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A bolometer circuit, comprising:
an array of bolometers each configured to generate a pixel signal in response to a bias applied and incident infrared (IR) radiation received at the each bolometer, wherein each column of the array of bolometers comprises:

an amplifier having an input and an output,
a first plurality of switches each configured to selectively provide a supply voltage to a respective one of the bolometers of the each column,
a second plurality of switches each configured to selectively route a difference of the pixel signals of a respective adjacent pair of the bolometers of the each column to the input of the amplifier, and
a third plurality of switches each configured to selectively provide a common voltage to a respective one of the bolometers of the each column; and
a control circuit configured to generate control signals for the first, second, and third pluralities of switches to obtain, at the output of the amplifier of each column, a difference signal representative of the difference of the pixel signals for a selected adjacent pair of the bolometers of each column.

2. The bolometer circuit of claim 1, wherein the control circuit is configured to generate the control signals to close one of the first plurality of switches, one of the second plurality of switches, and one of the third plurality of switches while opening the remainder of the first, second, and third pluralities of switches, such that biases are applied to the selected adjacent pair of the bolometers of each column and the difference signal for the selected adjacent pair is obtained at the output of the amplifier.

3. The bolometer circuit of claim 2, wherein:
the control circuit is configured to repeat generating the control signals to sequentially obtain even difference signals for a first plurality of adjacent pairs of the bolometers of each column, the even difference signals corresponding to those difference signals that are obtained by subtracting the pixel signals of odd rows from the pixel signals of corresponding even rows in the first plurality of adjacent pairs of the bolometers; and
the control circuit is further configured to repeat generating the control signals to sequentially obtain odd difference signals for a second plurality of adjacent pairs of the bolometers of each column, the odd difference signals corresponding to those difference signals that are obtained by subtracting the pixel signals of even rows from the pixel signals of corresponding odd rows in the second plurality of adjacent pairs of the bolometers.

4. The bolometer circuit of claim 3, wherein:
the control circuit is further configured to repeat generating the control signals to sequentially obtain additional even difference signals for the second plurality of adjacent pairs of the bolometers, the additional even difference signals corresponding to those difference signals that are obtained by subtracting the pixel signals of odd rows from the pixel signals of corresponding even rows in the second plurality of adjacent pairs of the bolometers; and
the control circuit is further configured to repeat generating the control signals to sequentially obtain additional odd difference signals for the first plurality of adjacent pairs of the bolometers, the additional odd difference signals corresponding to those difference signals that are obtained by subtracting the pixel signals of even rows from the pixel signals of corresponding odd rows in the first plurality of adjacent pairs of the bolometers.

5. The bolometer circuit of claim 3, further comprising a processor configured to combine the even difference signals and the odd difference signals to generate a difference image comprising both even and odd rows of difference signals.

6. The bolometer circuit of claim 5, wherein the processor is further configured to reconstruct the difference image into a direct image by cumulatively adding the difference rows of the difference image.

7. The bolometer circuit of claim 1, wherein:
the input of the amplifier is a first input of the amplifier,
the output of the amplifier is coupled to the first input via a thermally shorted bolometer providing a temperature-compensated feedback resistance, thereby configuring the amplifier as a transimpedance feedback amplifier;
the bolometer circuit further comprises a variable voltage source configured to provide a reference voltage level to a second input of the amplifier; and
the biases applied to the bolometers are set in response to the reference voltage level.

8. The bolometer circuit of claim 7, wherein the variable voltage source comprises a digital-to-analog converter (DAC) configured to generate the reference voltage level in response to bias adjustment bits.

9. The bolometer circuit of claim 7, wherein:
the variable voltage source is configured to provide a plurality of voltage levels on corresponding plurality of output lines in response to bias adjustment bits; and
each column of the array of bolometers further comprises a multiplexer connected to the plurality of output lines of the variable voltage source and to the second input of the amplifier of the each column, the multiplexer being configured to pass a selected one of the plurality of voltage levels as the reference voltage level to the second input of the amplifier of the each column in response to offset adjustment bits.

10. The bolometer circuit of claim 1, further comprising one or more rows of blind bolometers substantially shielded from the incident IR radiation, wherein:
the one or more rows of blind bolometers are selectively connectable to a corresponding one or more rows of the array of bolometers to provide a pixel signal representing a reference IR intensity level; and
the control circuit is further configured to generate additional control signals to selectively connect the one or more rows of blind bolometers to the corresponding one or more rows of bolometers to obtain corresponding one or more rows of reference measurement signals, the reference measurement signals representing differences between the pixel signals of the blind bolometers providing the reference IR intensity levels and the pixels signals of the corresponding bolometers.

11. The bolometer circuit of claim 1, wherein:
a contact between the bolometers of each adjacent pairs of each column is shared; and
the second plurality of switches are configured to route the difference of the pixel signals from the shared contact to the input of the amplifier.

12. A bolometer circuit, comprising:
an array of bolometers each configured to generate a pixel signal in response to a bias applied and incident infrared (IR) radiation received at the each bolometer, wherein the array of bolometers comprises:
a plurality of amplifiers each having an input and an output,
a first plurality of switches each configured to selectively provide a supply voltage to a respective bolometer of the array of bolometers, a second plurality of switches each configured to selectively connect a respective pair of bolometers in adjacent columns of the array, a third plurality of switches each configured to selectively route a difference of the pixel signals of a respective pair of bolometers in adjacent columns of the array to the input of a corresponding one of the plurality of amplifiers, and a fourth plurality of switches each configured to selectively provide a common voltage to a respective bolometer of the array of bolometers; and a control circuit configured to generate control signals for the first, second, third, and the fourth pluralities of switches to obtain, at the outputs of the amplifiers, column difference signals representative of the differences of the pixel signals for selected pairs of bolometers in adjacent columns of the array.

13. A method comprising:

receiving an even difference image frame and an odd difference image frame, wherein the even difference image frame comprises even rows of difference data representative of infrared (IR) radiation intensity received at even rows of a bolometer array less IR radiation intensity received at respective adjacent odd rows of the bolometer array, and wherein the odd difference image frame comprises odd rows of difference data representative of IR radiation intensity received at odd rows of a bolometer array less IR radiation intensity received at respective adjacent even rows of the bolometer array;

combining the even and the odd difference image frames to generate a composite difference image comprising both the even and the odd rows of difference data; and generating a direct image from the composite difference image by cumulatively adding the difference rows from top to bottom or bottom to top to generate rows of the direct image.

14. The method of claim 13, wherein the receiving the even and the odd difference image frames comprises generating the even and the odd difference image frames by a bolometer circuit comprising:

the bolometer array comprising bolometers each configured to generate a pixel signal in response to a bias applied and IR radiation received at the each bolometer, wherein each column of the bolometer array comprises:

an amplifier having an input and an output, a first plurality of switches each configured to selectively provide a supply voltage to a respective one of the bolometers of the each column, a second plurality of switches each configured to selectively route a difference of the pixel signals of a respective adjacent pair of the bolometers of the each column to the input of the amplifier, and a third plurality of switches each configured to selectively provide a common voltage to a respective one of the bolometers of the each column; and a control circuit configured to generate control signals for the first, second, and third pluralities of switches to obtain, at the output of the amplifier of each column, a difference signal representative of the difference of the pixel signals for a selected adjacent pair of the bolometers of each column.

15. The method of claim 13, further comprising receiving an additional even difference image frame and an additional odd difference image frame, wherein:

the additional even difference image frame comprises even rows of difference data obtained by comparisons in an opposite direction relative to the even rows of the even difference image frame;

the additional odd difference image frame comprises odd rows of difference data obtained by comparisons in an opposite direction relative to the odd rows of the odd difference image frame; and the combining the even and the odd difference image frames comprises further combining the additional even and the additional odd difference image frames to generate the composite difference image.

16. The method of claim 13, further comprising, prior to the generating of the direct image, applying column, row, and/or pixel noise reduction filters to the difference image frames and/or the composite difference image.

17. The method of claim 13, further comprising:

comparing local smoothness between the composite difference image and the generated direct image to identify local areas in the generated direct image that exhibit more noise; and applying column, row, and/or pixel noise reduction filters to the generated direct image in response to the identified local areas.

18. The method of claim 13, wherein the composite difference image comprises one or more absolute measurement rows comprising data representative of IR intensity relative to reference levels for one or more corresponding rows of the bolometer array.

19. The method of claim 18, wherein:

at least one of the one or more absolute measurement rows is associated with a top row or a bottom row of the bolometer array; and the generating the direct image comprises cumulatively adding from the at least one absolute measurement row associated with the top or the bottom row of the bolometer array.

20. The method of claim 19, wherein:

the one or more absolute measurement rows comprises two absolute measurement rows each associated with a top row and a bottom row of the bolometer array; and the method further comprise comparing the absolute measurement row associated with the bottom row of the bolometer array with a bottom row of the generated direct image, or the absolute measurement row associated with the top row of the bolometer array with a top row of the generated direct image, to identify residual spatial noise in the generated direct image and/or to determine statistical metrics relating to residual noise in the generated direct image.

* * * * *

UNITED STATES PATENT AND TRADEMARK OFFICE
CERTIFICATE OF CORRECTION

PATENT NO. : 9,958,332 B2
APPLICATION NO. : 15/483655
DATED : May 1, 2018
INVENTOR(S) : Brian B. Simolon, Naseem Y. Aziz and Nicholas Högasten It is certified that error appears in the above-identified patent and that said Letters Patent is hereby corrected as shown below:

In the Specification

In the Detailed Description:

In Column 14, Line 53, change "(labeled "Re")" to --(labeled "$R_f$")--.

In Column 15, Line 32, change "bolometer Rod" to --bolometer $R_{load}$--.

Signed and Sealed this
Third Day of July, 2018

Andrei Iancu
*Director of the United States Patent and Trademark Office*